(12) United States Patent
Laroia et al.

(10) Patent No.: US 9,264,907 B2
(45) Date of Patent: Feb. 16, 2016

(54) METHOD AND APPARATUS FOR INTERFERENCE MANAGEMENT BETWEEN NETWORKS SHARING A FREQUENCY SPECTRUM

(75) Inventors: Rajiv Laroia, Far Hills, NJ (US); Junyi Li, Bedminster, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 946 days.

(21) Appl. No.: 12/123,266

(22) Filed: May 19, 2008

(65) Prior Publication Data

US 2009/0017829 A1 Jan. 15, 2009

Related U.S. Application Data

(60) Provisional application No. 60/948,977, filed on Jul. 10, 2007.

(51) Int. Cl.
*H04B 7/15* (2006.01)
*H04W 16/12* (2009.01)
*H04W 16/14* (2009.01)

(52) U.S. Cl.
CPC .............. *H04W 16/12* (2013.01); *H04W 16/14* (2013.01)

(58) Field of Classification Search
USPC ............. 455/11.1, 15, 552.1–553.1; 370/246, 370/274, 334–340
See application file for complete search history.

(56) References Cited

U.S. PATENT DOCUMENTS 6,141,533 A * 10/2000 Wilson et al. ............... 455/11.1
6,690,917 B2 2/2004 Soliman et al.
6,895,253 B1 * 5/2005 Carloni et al. ............... 455/506
(Continued)

FOREIGN PATENT DOCUMENTS

CN 1434991 A 8/2003
EP 1207654 A2 5/2002
(Continued)

OTHER PUBLICATIONS

International Search Report and Written Opinion—PCT/US2008/067382—ISAEPO—Dec. 23, 2008.
(Continued)

*Primary Examiner* — Dai A Phuong
(74) *Attorney, Agent, or Firm* — James K. O'Hare

(57) ABSTRACT

A method and system are provided that allows a wireless terminal to share an allocated frequency spectrum for communications over two different networks while mitigating cross interference. For wireless terminals equipped with a single antenna, interference mitigation may be achieved by allocating first communication channels to a first network and allocating second communication channels to a second network, wherein the second communication channels are allocated within one or more of the first communication channels. For wireless terminals having multiple antennas, interference mitigation may be achieved with two orthogonally polarized antennas, where each antenna is used for communications with a different network. Consequently, a wireless terminal having a channel allocation for communicating over the first wireless network may reuse the same channel allocation to establish a communication link with a second wireless terminal via a second wireless network using at least part of the channel allocation for the first wireless network.

77 Claims, 45 Drawing Sheets

(56) References Cited

U.S. PATENT DOCUMENTS

| | | |
|---|---|---|
| 7,039,358 B1 | 5/2006 | Shellhammer et al. |
| 8,199,701 B2* | 6/2012 | Kobayashi .................... 370/328 |
| 2003/0008647 A1* | 1/2003 | Takatori et al. ............... 455/420 |
| 2003/0108016 A1* | 6/2003 | Bonta ........................... 370/338 |
| 2003/0129985 A1* | 7/2003 | Naden et al. .................. 455/447 |
| 2003/0199270 A1* | 10/2003 | Hamalainen et al. ......... 455/424 |
| 2004/0023652 A1* | 2/2004 | Shah et al. ................. 455/426.2 |
| 2004/0043736 A1* | 3/2004 | Hamalainen ................ 455/234.1 |
| 2004/0203342 A1* | 10/2004 | Sibecas et al. ................ 455/11.1 |
| 2004/0203538 A1* | 10/2004 | Leppanen et al. ............. 455/101 |
| 2004/0240404 A1 | 12/2004 | Ibrahim et al. |
| 2005/0130589 A1* | 6/2005 | Weissman ............ H04B 7/2606 455/11.1 |
| 2006/0292986 A1 | 12/2006 | Bitran et al. |
| 2007/0058579 A1* | 3/2007 | Xu et al. ...................... 370/328 |
| 2007/0135050 A1* | 6/2007 | Schiff ............................ 455/62 |
| 2007/0202803 A1* | 8/2007 | Miyoshi ....................... 455/11.1 |
| 2008/0075033 A1* | 3/2008 | Shattil .......................... 370/328 |
| 2008/0122706 A1* | 5/2008 | Jalali ............................ 343/703 |
| 2010/0267347 A1* | 10/2010 | Melis .................... H04B 7/0837 455/73 |

FOREIGN PATENT DOCUMENTS

| | | |
|---|---|---|
| EP | 1763276 A2 | 3/2007 |
| JP | 2002185476 A | 6/2002 |
| JP | 2004526341 A | 8/2004 |
| JP | 2008522497 A | 6/2008 |
| JP | 2008527864 A | 7/2008 |
| JP | 2009505610 A | 2/2009 |
| JP | 2009515476 A | 4/2009 |
| WO | WO-0239710 A1 | 5/2002 |
| WO | WO-2006058058 A2 | 6/2006 |
| WO | WO-2006076349 A2 | 7/2006 |
| WO | WO-2007024357 A2 | 3/2007 |
| WO | WO-2007055910 A1 | 5/2007 |

OTHER PUBLICATIONS

Taiwan Search Report—TW097124605—TIPO—Dec. 26, 2011.

* cited by examiner

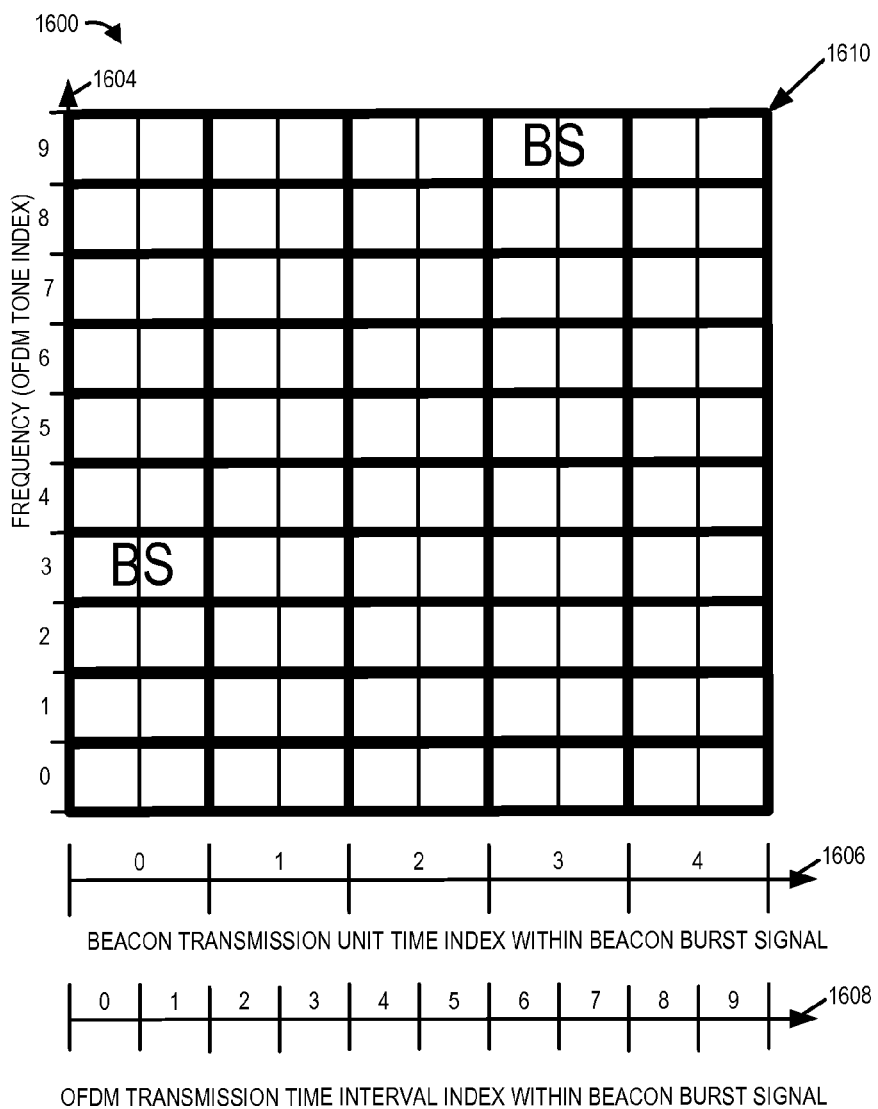
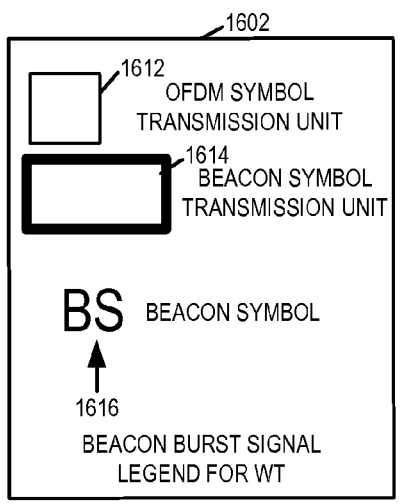
FIGURE 16

METHOD AND APPARATUS FOR INTERFERENCE MANAGEMENT BETWEEN NETWORKS SHARING A FREQUENCY SPECTRUM

CLAIM OF PRIORITY UNDER 35 U.S.C §119

The present application for patent claims priority to U.S. Provisional Application No. 60/948,977 entitled "Method and Apparatus for Interference Management Between a WAN and Peer-to-Peer Network using Polarization Antennas" filed Jul. 10, 2007, and assigned to the assignee hereof and hereby expressly incorporated by reference herein.

BACKGROUND

1. Field

Various embodiments are directed to methods and apparatus for wireless communication and, more particularly, to methods and apparatus related to interference management between a wide area network (WAN) and peer-to-peer (P2P) network using polarization antennas.

2. Background

In a wireless network, e.g., an ad hoc network, in which a network infrastructure does not exist, a terminal has to combat certain challenges in order to set up a communication link with another peer terminal. One challenge is that when a terminal just powers up or moves into a new area, the terminal may have to first find out whether another terminal is present in the vicinity before any communication between the two terminals can start.

The general solution to the above problem of identification and acquisition is to let the terminal transmit and/or receive signals according to certain protocol. Note that the protocol and the signal have to be designed carefully so that the solution is robust and power efficient. Robustness is essential. For example, the terminals often may not have a common timing reference, e.g., because of the lack of the network infrastructure. So it is possible that when a first terminal is transmitting a signal and a second terminal is not in the receiving mode, the transmitted signal does not help the second terminal to detect the presence of the first terminal. Power efficiency has great impact on the battery life of the terminals and is thus another important issue in the wireless system.

Consequently, a problem exists in how to implement such ad hoc network while extending the battery life of the terminals.

SUMMARY

In one embodiment, a method for operating a wireless terminal equipped with at least a first antenna and a second antenna is provided. A first signal is transmitted to a base station using the first antenna having a first polarization in a first direction, wherein the base station provides wireless wide area network (WAN) connectivity to the wireless terminal. A second signal is then transmitted to a second wireless terminal using the second antenna having a second polarization in a second direction. In some embodiments, the first and the second signals are transmitted in non-overlapping time intervals while in other embodiments, the first and the second signals are transmitted in overlapping time intervals. The first signal may be a wireless WAN signal and the second signal may be a peer-to-peer signal. The first and second polarizations may be in orthogonal directions. In some embodiments, the first and second polarizations are different by at least forty-five (45) degrees. In some embodiments, the first polarization is a horizontal polarization and the second polarization is a vertical polarization. The first polarization may be a first mix of horizontal and vertical polarizations and the second polarization may be a second mix of vertical and horizontal polarizations.

The method may further include obtaining a channel allocation, wherein the first signal and second signal share the channel allocation. The method may further include obtaining a channel allocation for communicating with the base station, wherein the first signal is transmitted within the channel allocation and the second signal is transmitted using at least part of the channel allocation. In some embodiments, the channel allocation includes at least one of forward and reverse link timeslots, and forward and reverse link frequencies The method may further include ascertaining an orientation for the wireless terminal based on received signals of known polarization from the base station. The method may further include beamforming using the first and second antennas to align transmission and reception for the wireless terminal with the received signals of known polarization from the base station. The method may further include (a) initiating a call with the second wireless terminal, wherein the call is capable of being routed via the base station, (b) determining whether the second wireless terminal is within range of the first wireless terminal, and/or (c) establishing the call with the second wireless terminal via the second antenna. In some embodiments, transmissions via the first antenna are higher power relative to lower power transmissions via the second antenna. In some embodiments, transmissions via the first antenna are longer range relative to shorter range transmissions via the second antenna.

In another embodiment, a wireless terminal including a first antenna having a first polarization in a first direction, a second antenna having a second polarization in a second direction and a processing circuit coupled to the first and second antennas is provided. The processing circuit may be configured to (a) transmit a first signal to a base station using the first antenna, wherein the base station provides wireless wide area network (WAN) connectivity to the wireless terminal, and/or (b) transmit a second signal to a second wireless terminal using the second antenna is disclosed. In some embodiments, the first and the second signals are transmitted in non-overlapping time intervals while in other embodiments, the first and the second signals are transmitted in overlapping time intervals. The first signal may be a wireless WAN signal and the second signal may be a peer-to-peer signal. The first and second polarizations may be in orthogonal directions. In some embodiments, the first and second polarizations are different by at least forty-five (45) degrees. In some embodiments, the first polarization is a horizontal polarization and the second polarization is a vertical polarization. The first polarization may be a first mix of horizontal and vertical polarizations and the second polarization may be a second mix of vertical and horizontal polarizations.

The processing circuit may further be configured to obtain a channel allocation, wherein the first signal and second signal share the channel allocation. The processing circuit may further be configured to obtain a channel allocation for communicating with the base station, wherein the first signal is transmitted within the channel allocation and the second signal is transmitted using at least part of the channel allocation. The channel allocation may include at least one of forward and reverse link timeslots, and forward and reverse link frequencies.

The processing circuit may further be configured to (a) ascertain an orientation for the wireless terminal based on received signals of known polarization from the base station, and/or (b) beamform using the first and second antennas to align transmission and reception for the wireless terminal with the received signals of known polarization from the base station. The processing circuit may further be configured to (a) initiate a call with the second wireless terminal, wherein the call is capable of being routed via the base station, (b) determine whether the second wireless terminal is within range of the first wireless terminal, and/or (c) establish the call with the second wireless terminal via the second antenna. In some embodiments, transmissions via the first antenna are higher power relative to lower power transmissions via the second antenna. In some embodiments, transmissions via the first antenna are longer range relative to shorter range transmissions via the second antenna.

Consequently, an embodiment of a wireless terminal may include (a) means for transmitting a first signal to a base station using a first antenna having a first polarization in a first direction, wherein the base station provides wireless wide area network (WAN) connectivity to the wireless terminal, and/or (b) means for transmitting a second signal to a second wireless terminal using a second antenna having a second polarization in a second direction. In some embodiments, the first and second polarizations are different by at least forty-five (45) degrees. The terminal may further include means for obtaining a channel allocation for communicating with the base station, wherein the first signal is transmitted within the channel allocation and the second signal is transmitted using at least part of the channel allocation. The terminal may further include (a) means for ascertaining an orientation for the wireless terminal based on received signals of known polarization from the base station, and/or (b) means for beamforming using the first and second antennas to align transmission and reception for the wireless terminal with the received signals of ascertainable polarization from the base station.

In another embodiment, a circuit to allow a wireless terminal to use two antennas, wherein the circuit is adapted to (a) transmit a first signal to a base station using a first antenna having a first polarization in a first direction, wherein the base station provides wireless wide area network (WAN) connectivity to the wireless terminal, and/or (b) transmit a second signal to a second wireless terminal using a second antenna having a second polarization in a second direction is provided. In some embodiments, the first and second polarizations are different by at least forty-five (45) degrees. The circuit may further be adapted to obtain a channel allocation for communicating with the base station, wherein the first signal is transmitted within the channel allocation and the second signal is transmitted using at least part of the channel allocation.

In another embodiment, a machine-readable medium including instructions for allowing a wireless terminal to use two antennas, which when executed by a processor causes the processor to (a) send a first signal to a base station using a first antenna having a first polarization in a first direction, wherein the base station provides wireless wide area network (WAN) connectivity to the wireless terminal, and/or (b) send a second signal to a second wireless terminal using a second antenna having a second polarization in a second direction is disclosed. In some embodiments, the first and second polarizations are different by at least forty-five (45) degrees. The machine-readable medium may further include instructions to obtain a channel allocation for communicating with the base station, wherein the first signal is transmitted within the channel allocation and the second signal is transmitted using at least part of the channel allocation.

In another embodiment, a method for operating a wireless terminal equipped with an antenna element having adjustable polarizations is provided. A first signal may be transmitted to a base station using the antenna element adapted to a first polarization in a first direction, the base station providing wireless wide area network (WAN) connectivity to the wireless terminal. A second signal may be transmitted to a second wireless terminal using the antenna element adapted to a second polarization in a second direction. In some embodiments, the antenna element includes a first antenna polarized according to the first polarization and a second antenna polarized according to the second polarization, the first signal being transmitted over the first antenna and the second signal being transmitted over the second antenna. In some embodiments, the first and second polarizations are orthogonal directions. In some embodiments, the first polarization is a first mix of horizontal and vertical polarizations and the second polarization is a second mix of vertical and horizontal. In some embodiments, the first and second polarizations are different by at least forty-five (45) degrees.

The method may further include obtaining a channel allocation, wherein the first signal and second signal share the channel allocation. The method may further include (a) ascertaining an orientation for the wireless terminal based on received signals of known polarization from the base station, and/or (b) beamforming using the antenna element to align transmission and reception for the wireless terminal with the received signals of known polarization from the base station.

In another embodiment, a wireless terminal, including an antenna element having adjustable polarizations and a processing circuit coupled to the antenna element, the processing circuit configured to (a) transmit a first signal to a base station using the antenna element adapted to a first polarization in a first direction, the base station providing wireless wide area network (WAN) connectivity to the wireless terminal, and/or (b) transmit a second signal to a second wireless terminal using the antenna element adapted to a second polarization in a second direction is provided. The antenna element may include a first antenna polarized according to the first polarization and a second antenna polarized according to the second polarization, the first signal being transmitted over the first antenna and the second signal being transmitted over the second antenna. In some embodiments, the first and second polarizations are orthogonal directions. In some embodiments, the first and second polarizations are different by at least forty-five (45) degrees. The processing circuit may further be configured to obtain a channel allocation, wherein the first signal and second signal share the channel allocation. The processing circuit may further be configured to (a) ascertain an orientation for the wireless terminal based on received signals of known polarization from the base station, (b) and/or beamform using the antenna element to align transmission and reception for the wireless terminal with the received signals of known polarization from the base station.

Consequently, an embodiment of a wireless terminal may include (a) means for transmitting a first signal to a base station using an antenna element adapted to a first polarization in a first direction, the base station providing wireless wide area network (WAN) connectivity to the wireless terminal, and/or (b) means for transmitting a second signal to a second wireless terminal using the antenna element adapted to a second polarization in a second direction is provided. The antenna element may include a first antenna polarized according to the first polarization and a second antenna polarized according to the second polarization, the first signal being transmitted over the first antenna and the second signal being transmitted over the second antenna. The first and second polarizations may be different by at least forty-five (45) degrees. The terminal may further include means for obtaining a channel allocation, wherein the first signal and second signal concurrently share the channel allocation. The terminal may further include (a) means for ascertaining an orientation for the wireless terminal based on received signals of ascertainable polarization from the base station, and/or (b) means for beamforming using the antenna element to align transmission and reception for the wireless terminal with the received signals of ascertainable polarization from the base station.

In another embodiment, a circuit for facilitating dual use of an antenna element by a wireless terminal, wherein the circuit is adapted to (a) transmit a first signal to a base station using the antenna element adapted to a first polarization in a first direction, the base station providing wireless wide area network (WAN) connectivity to the wireless terminal, and/or (b) transmit a second signal to a second wireless terminal using the antenna element adapted to a second polarization in a second direction is provided. The circuit may further be adapted to obtain a channel allocation, wherein the first signal and second signal concurrently share the channel allocation, and wherein the first and second polarizations are different by at least forty-five (45) degrees. The circuit may further be adapted to (a) ascertain an orientation for the wireless terminal based on received signals of ascertainable polarization from the base station, and/or (b) beamform using the antenna element to align transmission and reception for the wireless terminal with the received signals of ascertainable polarization from the base station.

In another embodiment, a machine-readable medium including instructions for allowing a wireless terminal to share a channel allocation between two networks, which when executed by a processor causes the processor to (a) obtain a channel allocation for communicating over a first wireless network, and/or (b) establish a first communication link with a second wireless terminal via a second wireless network using at least part of the channel allocation of the first wireless network is provided. The machine-readable medium may further include instructions to obtain a channel allocation, wherein the first signal and second signal concurrently share the channel allocation, and wherein the first and second polarizations are different by at least forty-five (45) degrees. The machine-readable medium may further include instructions to (a) ascertain an orientation for the wireless terminal based on received signals of ascertainable polarization from the base station, and/or (b) beamform using the antenna element to align transmission and reception for the wireless terminal with the received signals of ascertainable polarization from the base station.

In another embodiment, a method of operating a wireless communication system including at least first and second wireless terminals, the first wireless terminal equipped with at least a first antenna having a first polarization in a first direction, the second wireless terminal equipped with a second antenna having a second polarization in a second direction, is provided. The first wireless terminal may operate to transmit a first signal to a base station using the first antenna, the base station providing wireless wide area network (WAN) connectivity to the first wireless terminal. The first wireless terminal may also operate to transmit a second signal using the second antenna, wherein the first and second polarizations are different by at least forty-five (45) degrees. In some embodiments, the second signal is sent to the second wireless terminal equipped with a third antenna having a polarization in the second direction. In some embodiments, the second signal is sent to the second wireless terminal, the first wireless terminal equipped with a third antenna, in addition to the first antenna, having a polarization in the second direction.

The method may further include operating the base station to receive the first signal using a fourth antenna having a polarization in the first direction. The method may further include obtaining a channel allocation for the first wireless terminal, wherein the first signal and second signal share the channel allocation. In some embodiments, the first and the second signals are transmitted in overlapping time intervals while in other embodiments, the first and the second signals are transmitted in non-overlapping time intervals. In some embodiments, the first and second polarizations are different by at least forty-five (45) degrees.

BRIEF DESCRIPTION OF THE DRAWINGS

Various features, nature, and advantages may become apparent from the detailed description set forth below when taken in conjunction with the drawings in which like reference characters identify correspondingly throughout.

FIG. 16 is a drawing and corresponding legend illustrating a feature of some embodiments, in which a beacon symbol transmission unit includes a plurality of OFDM symbol transmission units.

DETAILED DESCRIPTION

Figure 1:
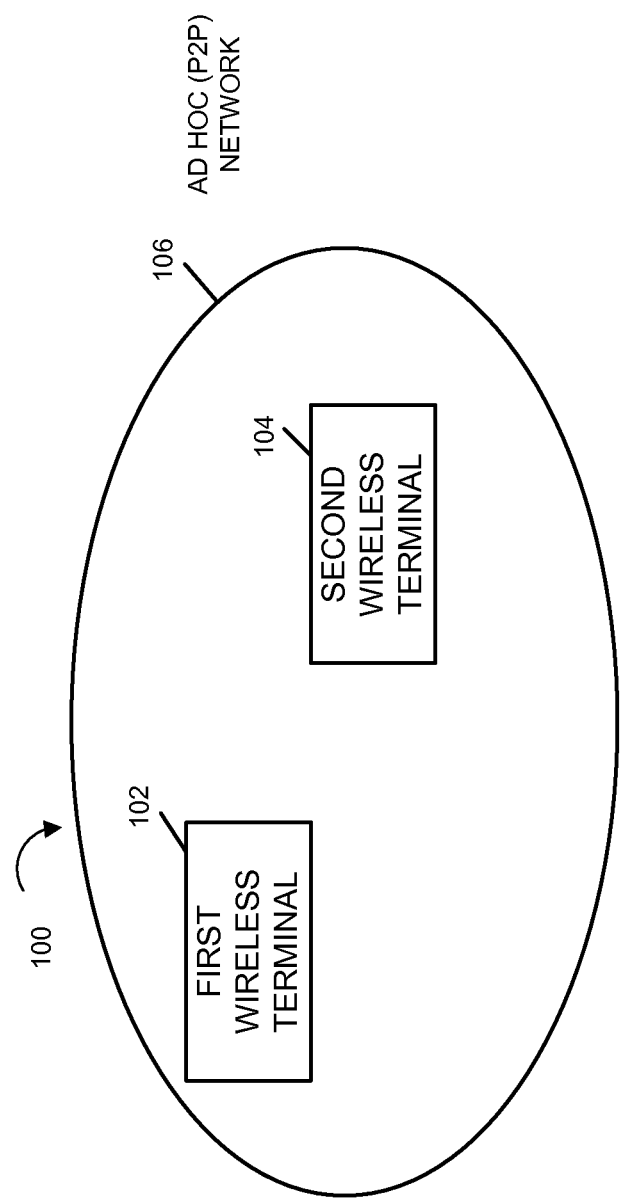
FIG. 1 illustrates an exemplary ad hoc communication network implemented.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One feature provides for establishing an ad hoc peer-to-peer network over an existing channel allocation for another network. Sharing of a frequency spectrum by two networks allows reusing the same transmitter and/or receiver hardware in a terminal to communicate over the two networks, thereby reducing hardware and/or power consumption. This feature reuses and/or concurrently uses a frequency spectrum to efficiently utilize spectrum resources.

Another feature provides interference mitigation between networks sharing a frequency spectrum by channel allocation techniques. For wireless terminals equipped with a single antenna, interference mitigation may be achieved by allocating first communication channels to a first network and allocating second communication channels to a second network, wherein the second communication channels are allocated within one or more of the first communication channels.

Another feature provides for using orthogonally polarized transmissions on the same frequency spectrum to allow the two different types of networks to share the frequency spectrum while reducing or mitigating interference between the two networks. Such polarization may be achieved, for example, by using wireless terminals having two orthogonally polarized antennas where different polarizations are used to perform communications over different networks sharing a frequency spectrum.

Yet another feature reduces traffic through a wide area network by transparently facilitating peer-to-peer communications between nearby devices over a shared frequency spectrum. For instance, rather than routing a call via a WAN base station, a device may establish a peer-to-peer communication link with a nearby target device thereby completing the call without using the WAN. This feature may be also facilitate power conservation on a wireless terminal by having the wireless terminal use a lower-power peer-to-peer communication link rather than a WAN network to execute a call with a nearby peer device.

Ad Hoc Communication System

FIG. 1 illustrates an exemplary ad hoc communication network 100 implemented. Two exemplary wireless terminals, namely a first wireless terminal 102 and a second wireless terminal 104 are present in a geographic area 106. Some spectrum band is available to be used by the two wireless terminals for the purpose of communication. The two wireless terminals use the available spectrum band to establish a peer-to-peer communication link between each other.

Because the ad hoc network may not have a network infrastructure, the wireless terminals may not have a common timing or frequency reference. This results in certain challenges in the ad hoc network. To elaborate, consider the problem of how either of the terminals detects the presence of the other.

For the sake of description, in the following it is assumed that at a given time, the wireless terminal can either transmit or receive, but not both. It is understood that people with ordinary skills in the field can apply the same principles to the case where the terminal can both transmit and receive at the same time.

Figure 2:
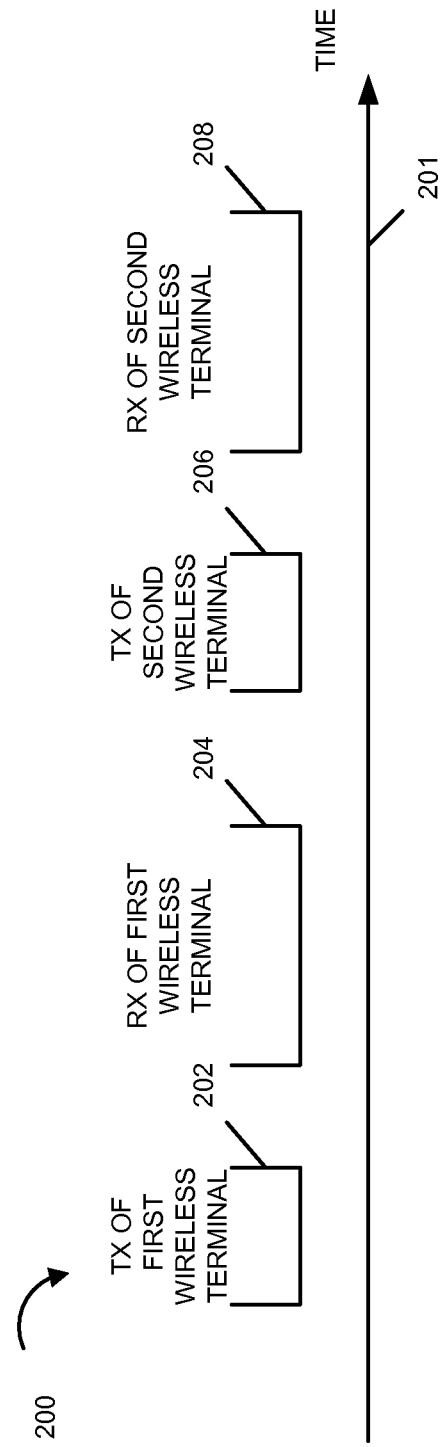
FIG. 2 illustrates an exemplary user misdetection problem in an ad hoc network when there is no common timing reference.

FIG. 2 includes drawing 200 used to describe one possible scheme that the two wireless terminals may use to find each other. The first terminal transmits some signal in time interval 202, and receives signal in time interval 204. Meanwhile, the second wireless terminal transmits some signal in time interval 206, and receives signal in time interval 208. Note that if the first wireless terminal can both transmit and receive at the same time then the time intervals 202 and 204 may overlap with each other.

Note that because the two terminals do not have a common timing reference, their TX (transmit) and RX (receive) timings are not synchronized. In particular, FIG. 2 shows that the time intervals 204 and 206 do not overlap. When the first wireless terminal is listening the second wireless terminal does not transmit, and when the second wireless terminal is transmitting the first wireless terminal does not listen. Therefore, the first wireless terminal does not detect the presence of the second terminal. Similarly, the time intervals 202 and 208 do not overlap. Therefore, the second wireless terminal does not detect the presence of the first wireless terminal either.

There are ways to overcome the above misdetection problem. For example, a wireless terminal may randomize the time interval in which the TX and RX procedure is carried out, so that over time the two wireless terminals will detect each other probabilistically. However, the cost is the delay and the resultant battery power consumption. In addition, the power consumption is also determined by the power requirement in the TX and RX procedure. For example, it may require less processing power to detect one form of the signal than to detect another form.

It is a feature of various embodiments that a new signal TX and RX procedure is implemented and used to reduce the delay of detecting the presence of another terminal and the associated power consumption.

In accordance with various embodiments, a wireless terminal transmits a special signal, called a beacon signal, which occupies a small fraction, e.g., in some embodiments no more than 0.1%, of the total amount of available air link communication resource. Air link communication resources are measured in terms of minimum or basic transmission units, e.g., Orthogonal Frequency-Division Multiplexing (OFDM) tone symbols in an OFDM system. Air link communication resources can be measured in terms of degrees of freedom, where a degree of freedom is the minimum unit of resource which can be used for communication. For example, in a Code Division Multiple Access (CDMA) system, a degree of freedom can be a spreading code, a time corresponding to a symbol period. In general, the degrees of freedom in a given system are orthogonal with each other.

Consider an exemplary embodiment of a frequency division multiplexing system, e.g., an OFDM system. In that system, information is transmitted in a symbol-by-symbol manner. In a symbol transmission period, the total available bandwidth is divided into a number of tones, each of which can be used to carry information.

Figure 3:
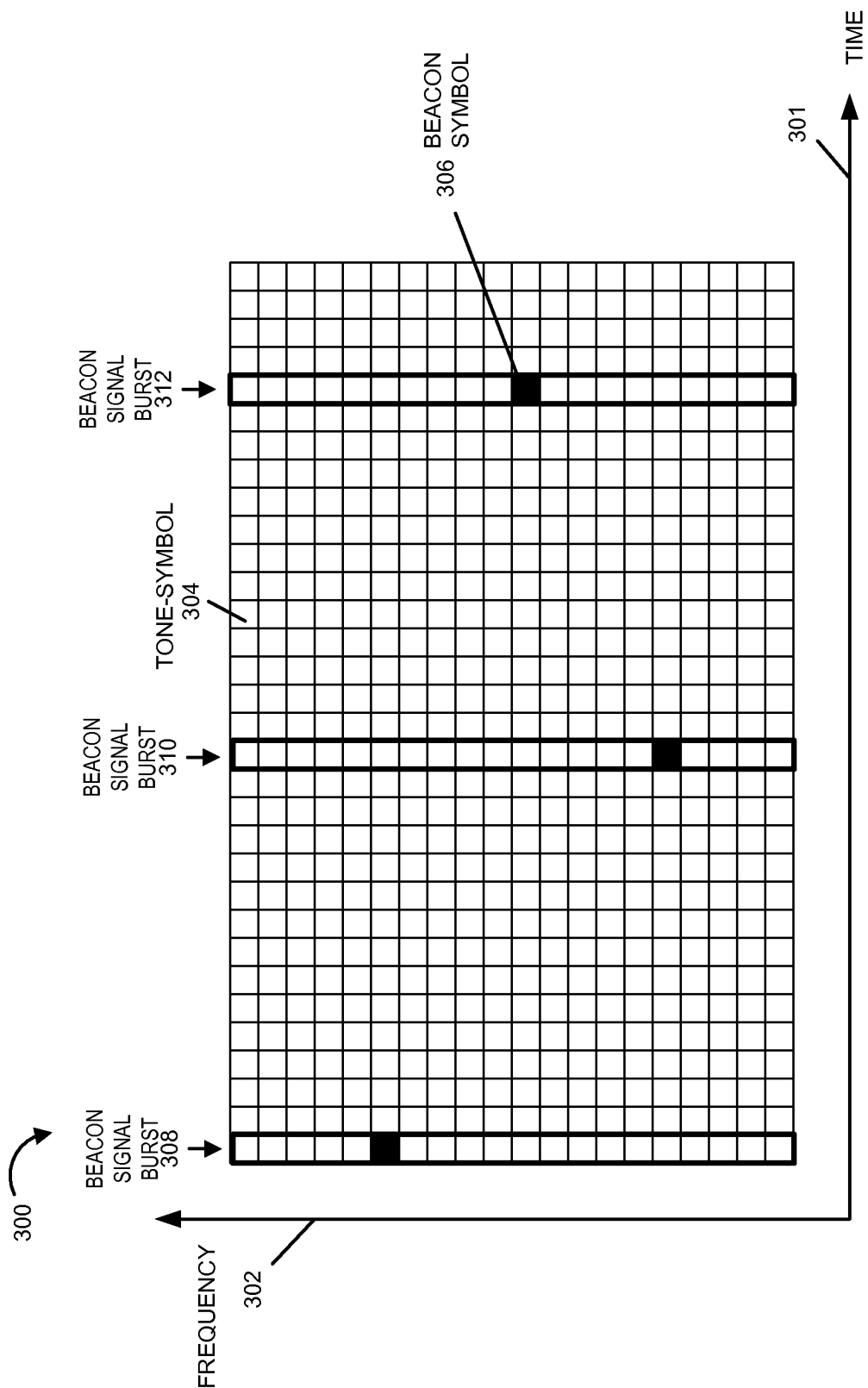
FIG. 3 illustrates an exemplary air link resource being used to communicate a beacon signal including three exemplary beacon signal bursts, each beacon signal burst including one beacon symbol.

FIG. 3 includes drawing 300 showing the available resource in an exemplary OFDM system. The horizontal axis 301 represents time and the vertical axis 302 represents frequency. A vertical column represents each of the tones in a given symbol period. Each small box 304 represents a tone-symbol, which is the air link resource of a single tone over a single transmission symbol period. A minimum transmission unit in the OFDM symbol is a tone-symbol.

The beacon signal includes a sequence of beacon signal bursts (308, 310, 312), which are transmitted sequentially over time. A beacon signal burst includes a small number of beacon symbols. In this example, each beacon symbol burst (308, 310, 312) includes one beacon symbol and nineteen (19) nulls. In this example, each beacon symbol is a single tone over one transmission period. A beacon signal burst includes, beacon symbols of the same tone over a small number of transmission symbol periods, e.g., one or two symbol periods. FIG. 3 shows three small black boxes, each of which (306) represents a beacon symbol. In this case, a beacon symbol uses the air link resource of one tone-symbol, i.e., one beacon symbol transmission unit is an OFDM tone-symbol. In another embodiment, a beacon symbol comprises one tone transmitted over two consecutive symbol periods, and a beacon symbol transmission unit comprises two adjacent OFDM tone-symbols.

The beacon signal occupies a small fraction of the total minimum transmission units. Denote N the total number of tones of the spectrum of interest. In any reasonably long time interval, e.g., of one or two seconds, suppose the number of symbol periods is T. Then the total number of minimum transmission units is N*T. In accordance with various embodiments, the number of tone-symbols occupied by the beacon signal in the time interval is significantly less than N*T, e.g., in some embodiments no more than 0.1% of N*T.

The tone of the beacon symbol in a beacon signal burst, varies (hops) from one burst to another. In accordance with various embodiments, the tone-hopping pattern of the beacon symbol is in some embodiments a function of the wireless terminal and can be, and sometimes is, used as an identification of the terminal or an identification of the type to which the terminal belongs. In general, information in a beacon signal can be decoded by determining which minimum transmission units convey the beacon symbols. For example, information can be included in the frequency of the tone(s) of the beacon symbol(s) in a given beacon signal burst, the number of beacon symbols in a given burst, the duration of a beacon signal burst, and/or the inter-burst interval, in addition to the tone hopping sequences.

Figure 4:
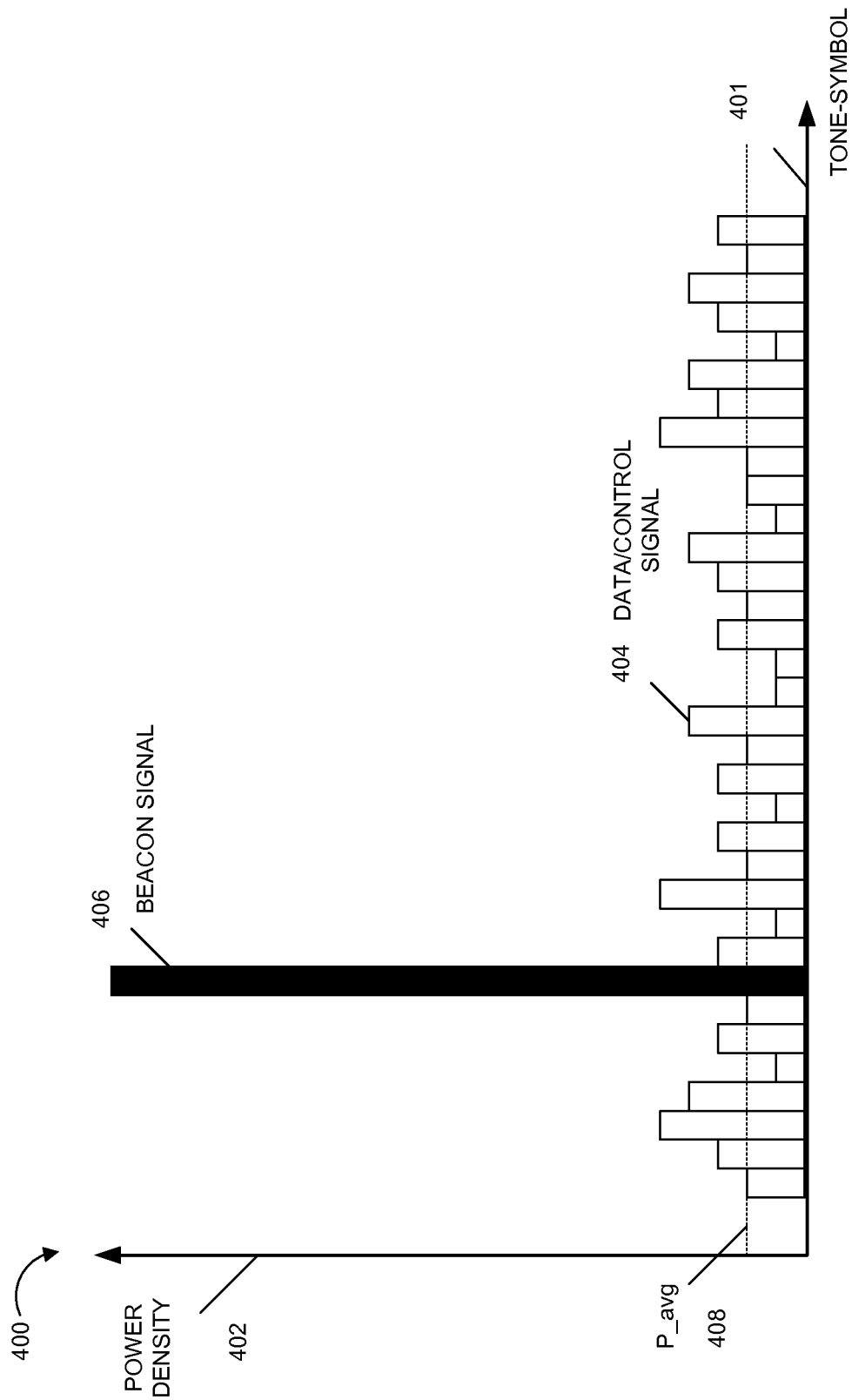
FIG. 4 illustrates an exemplary relative transmission power levels between a beacon symbol and a data/control signal.

The beacon signal can also be characterized from the transmission power perspective. In accordance with various embodiments, the transmission power of the beacon signal per minimum transmission unit is much higher, e.g., in some embodiments at least 10 dB higher, than the average transmission power of data and control signals per degree of freedom when the terminal transmitter is in an ordinary data session. In accordance with some embodiments, the transmission power of the beacon signal per minimum transmission unit is at least sixteen (16) dB higher than the average transmission power of data and control signals per degree of freedom when the terminal transmitter is in an ordinary data session. For example, drawing 400 of FIG. 4 plots the transmission powers used in each of the tone-symbols in a reasonably long time interval, e.g., of one or two seconds, in which the wireless terminal is in a data session, i.e., the terminal is sending data and control information using the spectrum of interest. The order of those tone-symbols, represented by the horizontal axis 401, is immaterial for purposes of this discussion. A small vertical rectangular bar 404 represents the power of individual tone-symbols conveying user data and/or control information. As a comparison, a tall black rectangular bar 406 is also included to show the power of a beacon tone-symbol.

In another embodiment, a beacon signal includes a sequence of beacon signal bursts transmitted at intermittent time periods. A beacon signal burst includes one or more (a small number) of time-domain impulses. A time-domain impulse signal is a special signal that occupies a very small transmission time duration over a certain spectrum bandwidth of interest. For example, in a communication system where the available bandwidth is thirty (30) kHz, a time-domain impulse signal occupies a significant portion of the thirty (30) kHz bandwidth for a short duration. In any reasonably long time interval, e.g., a few seconds, the total duration of the time-domain impulses is a small fraction, e.g., in some embodiments no more than 0.1%, of the total time duration. Moreover, the per degree of freedom transmission power in the time interval during which the impulse signal is transmitted is significantly higher, e.g., in some embodiments ten (10) dB higher, than the average transmission power per degree of freedom when the transmitter is in an ordinary data session. In one embodiment, the per degree of freedom transmission power in the time interval during which the impulse signal is transmitted is at least sixteen (16) dB higher than the average transmission power per degree of freedom when the transmitter is in an ordinary data session.

FIG. 4 shows that the transmission power may vary from one tone-symbol to another. The average transmission power per tone-symbol (408) is denoted by $P_{avg}$. In accordance with various embodiments, the per tone-symbol transmission power of the beacon signal is much higher, e.g., at least ten (10) dB higher, than $P_{avg}$. In one embodiment, the per tone-symbol transmission power of the beacon signal is at least sixteen (16) dB higher than $P_{avg}$. In one exemplary embodiment, the per tone-symbol transmission power of the beacon signal is twenty (20) dB higher than $P_{avg}$.

In one embodiment, the per tone-symbol transmission power of the beacon signal is constant for a given terminal. That is, the power does not vary with time or with tone. In another embodiment, the per tone-symbol transmission power of the beacon signal is the same for multiple terminals, or even each of the terminals in the network.

Figure 5:
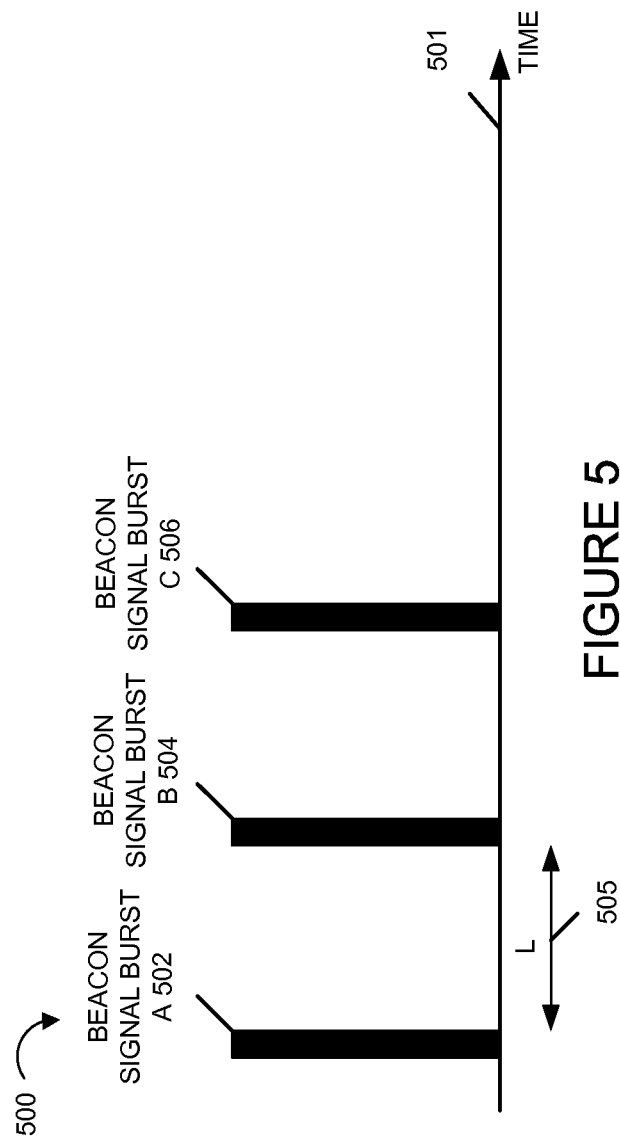
FIG. 5 illustrates one exemplary embodiment of transmitting beacon signal bursts.

Drawing 500 of FIG. 5 illustrates one embodiment of transmitting beacon signal bursts. A wireless terminal keeps on transmitting the beacon signal bursts, e.g., beacon signal burst A 502, beacon signal burst B 504, beacon signal burst C 506, etc., even if the wireless terminal determines that there is no other terminal in the vicinity or even if the terminal has already detected other terminals and may even have established communication links with them.

The terminal transmits the beacon signal bursts in an intermittent (i.e., non-continuous) manner so that there are a number of symbol periods between two successive beacon signal bursts. In general, the time duration of a beacon signal burst is much shorter, e.g., in some embodiments at least fifty (50) times shorter, than the number of symbol periods in-between two successive beacon signal bursts, denoted as L 505. In one embodiment, the value of L is fixed and constant, in which case the beacon signal is periodic. In some embodiments the value of L is the same and known for each of the terminals. In another embodiment, the value of L varies with time, e.g., according to a predetermined or pseudo-random pattern. For example, the number can be a number, e.g., random number, distributed between constants $L_0$ and $L_1$.

Figure 6:
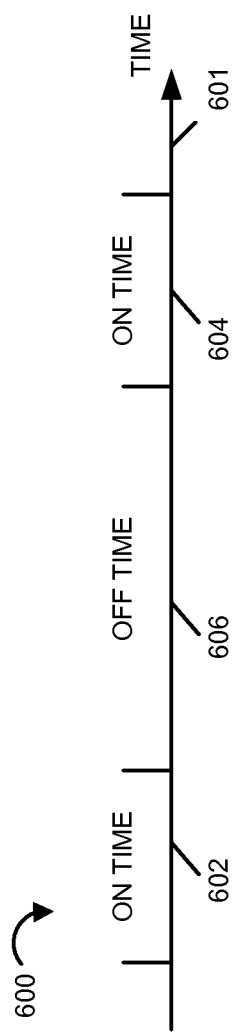
FIG. 6 illustrates one exemplary embodiment in which receiving beacon signal bursts can occur during certain designated time intervals, while at other times the receiver is off to conserve power.

Drawing 600 of FIG. 6 illustrates one exemplary embodiment in which receiving beacon signal bursts can occur during certain designated time intervals, while at other times the receiver is off to conserve power. The wireless terminal listens to the spectrum of interest and attempts to detect a beacon signal, which may be sent by a different terminal. The wireless terminal may continuously be in the listening mode for a time interval of a few symbol periods, which is called on time. The on time 602 is followed by an off time 606 during which the wireless terminal is in a power saving mode and does not receive any signal. In the off time, the wireless terminal, completely turns off the receive modules. When the off time 606 ends, the terminal resumes to the on time 604 and starts to detect a beacon signal again. The above procedure repeats.

Preferably, the length of an on time interval is shorter than that of an off time interval. In one embodiment, an on time interval may be less than one-fifth (⅕) of an off time interval. In one embodiment, the length of each of the on time intervals are the same, and the length of each of the off time intervals are also the same.

In some embodiments the length of an off time interval depends on the latency requirement for a first wireless terminal to detect the presence of another (second) wireless terminal, if the second wireless terminal is actually present in the vicinity of the first wireless terminal. The length of an on time interval is determined so that the first wireless terminal has a great probability of detecting at least one beacon signal burst in the on time interval. In one embodiment, the length of the on time interval is a function of at least one of the transmission duration of a beacon signal burst and the duration between successive beacon signal bursts. For example, the length of the on time interval is at least the sum of the transmission duration of a beacon signal burst and the duration between successive beacon signal bursts.

Figure 7:
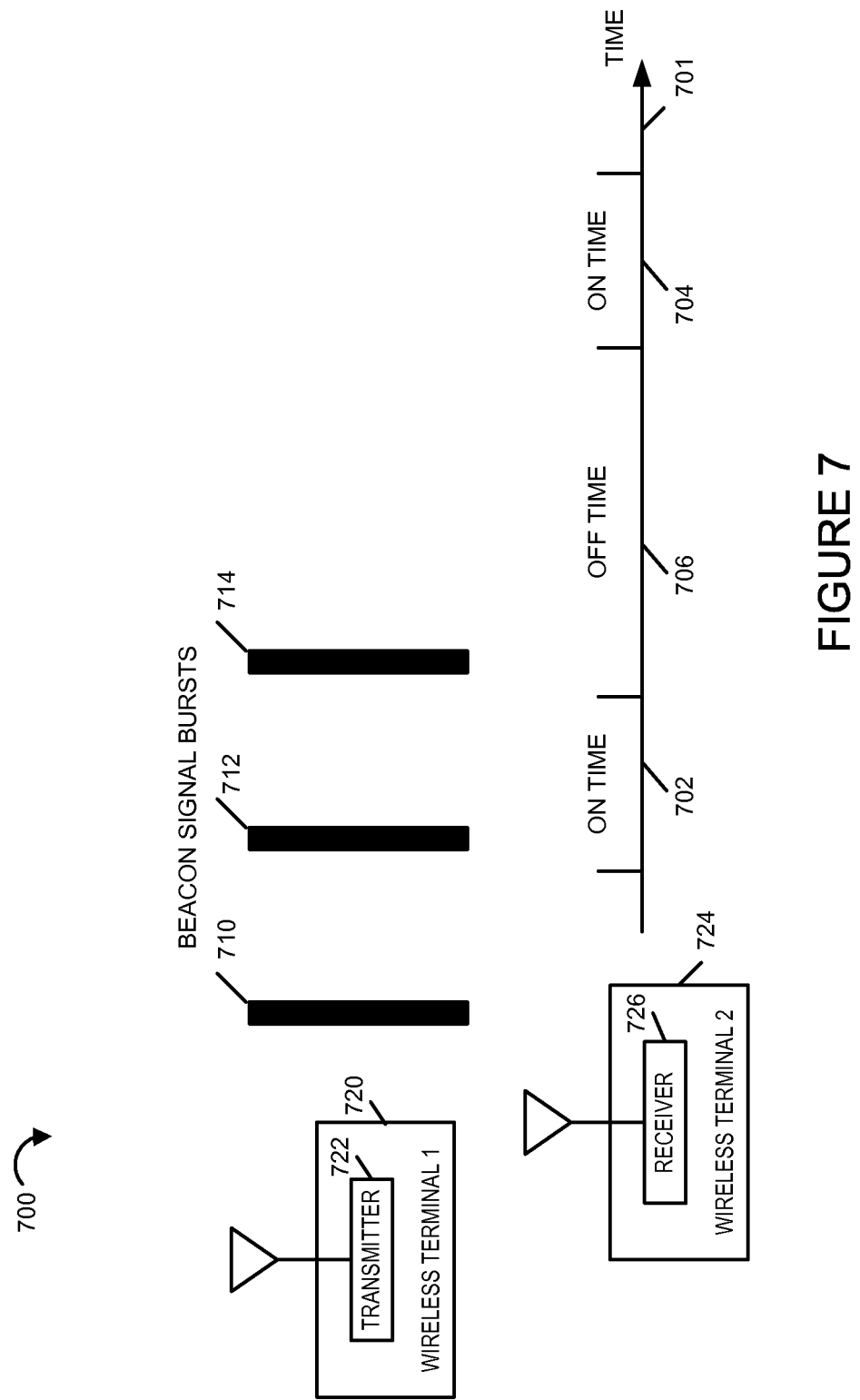
FIG. 7 is used to describe how a user misdetection problem is solved when two terminals transmit and receive beacon signal bursts.

Drawing 700 of FIG. 7 illustrates how a terminal detects the presence of a second terminal when the two terminals use the beacon signal transmission and reception procedure implemented.

The horizontal axis 701 represents time. The first wireless terminal 720 arrives at the ad hoc network before the second wireless terminal 724 shows up. The first wireless terminal 720, using transmitter 722, starts to transmit the beacon signal, which includes a sequence of beacon signal bursts 710, 712, 714, etc. The second wireless terminal 724 shows up after the first wireless terminal 720 has already transmitted burst 710. Suppose that the second wireless terminal 724, including receiver 726, starts the on time interval 702. Note that the on time interval is sufficiently large to cover the transmission duration of a beacon signal burst 712 and the duration between bursts 712 and 714. Therefore, the second wireless terminal 724 can detect the presence of beacon signal burst 712 in the on time interval 702, even though the first and the second wireless terminals (720, 724) do not have a common timing reference.

Figure 8:
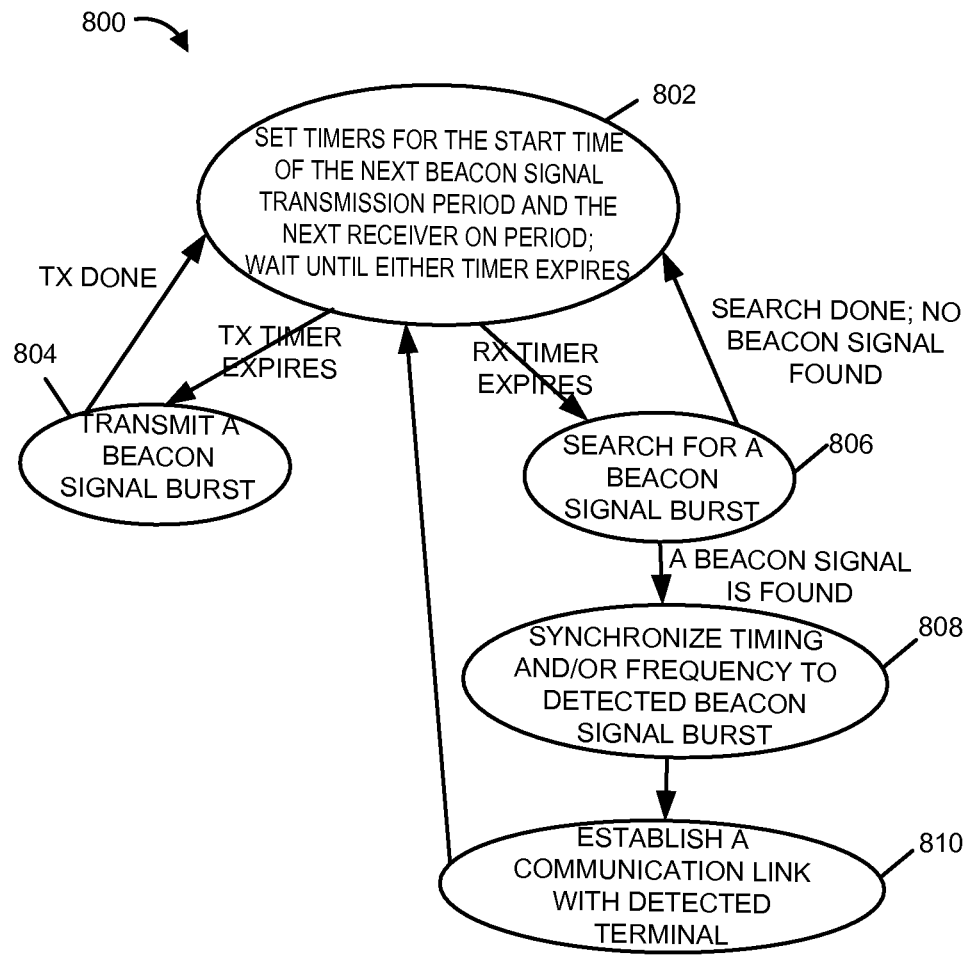
FIG. 8 illustrates one exemplary embodiment of a state diagram implemented in a terminal.

FIG. 8 illustrates one embodiment of an exemplary state diagram 800 implemented in a wireless terminal.

When the wireless terminal is powered up, the wireless terminal enters the state of 802, in which the terminal determines the start time of the next beacon signal burst to be transmitted. In addition, the wireless terminal determines the start time of the next on time interval for the receiver. The wireless terminal may, and in some embodiments does, use a transmitter timer and a receiver timer to manage the start times. The wireless terminal waits until either timer expires. Note that either timer may expire instantaneously, meaning that the wireless terminal is to transmit or detect a beacon signal burst upon power up.

Upon the expiration of the TX timer, the terminal enters the state of 804. The wireless terminal determines the signal form of the burst including the frequency tone to be used by the burst, and transmits the beacon signal burst. Once the transmission is done, the terminal returns to the state of 802.

Upon the expiration of the RX timer, the wireless terminal enters the state of 806. The wireless terminal is in the listening mode and searches for a beacon signal burst. If the wireless terminal has not found a beacon signal burst when the on time interval ends, then the wireless terminal returns to the state of 802. If the wireless terminal detects a beacon signal burst of a new wireless terminal, the wireless terminal may proceed to the state of 808 if the wireless terminal intends to communicate with the new terminal. In the state of 808, the wireless terminal derives the timing and/or frequency of the new wireless terminal from the detected beacon signal, and then synchronizes its own timing and/or frequency to the new wireless terminal. For example, the wireless terminal can use the beacon location in time and/or in frequency as a basis for estimating the timing phase and/or frequency of the new wireless terminal. This information can be used to synchronize the two wireless terminals.

Once the synchronization is done, the wireless terminal may send (810) additional signal to the new terminal and establish a communication link. The wireless terminal and the new wireless terminal may then set up a peer-to-peer communication session. When the wireless terminal has established a communication link with another terminal, the terminal should keep on intermittently transmitting the beacon signal so that other terminals, e.g., new wireless terminals can detect the wireless terminal. In addition, the wireless terminal, keeps on periodically entering the on time intervals to detect new wireless terminals.

Figure 9:
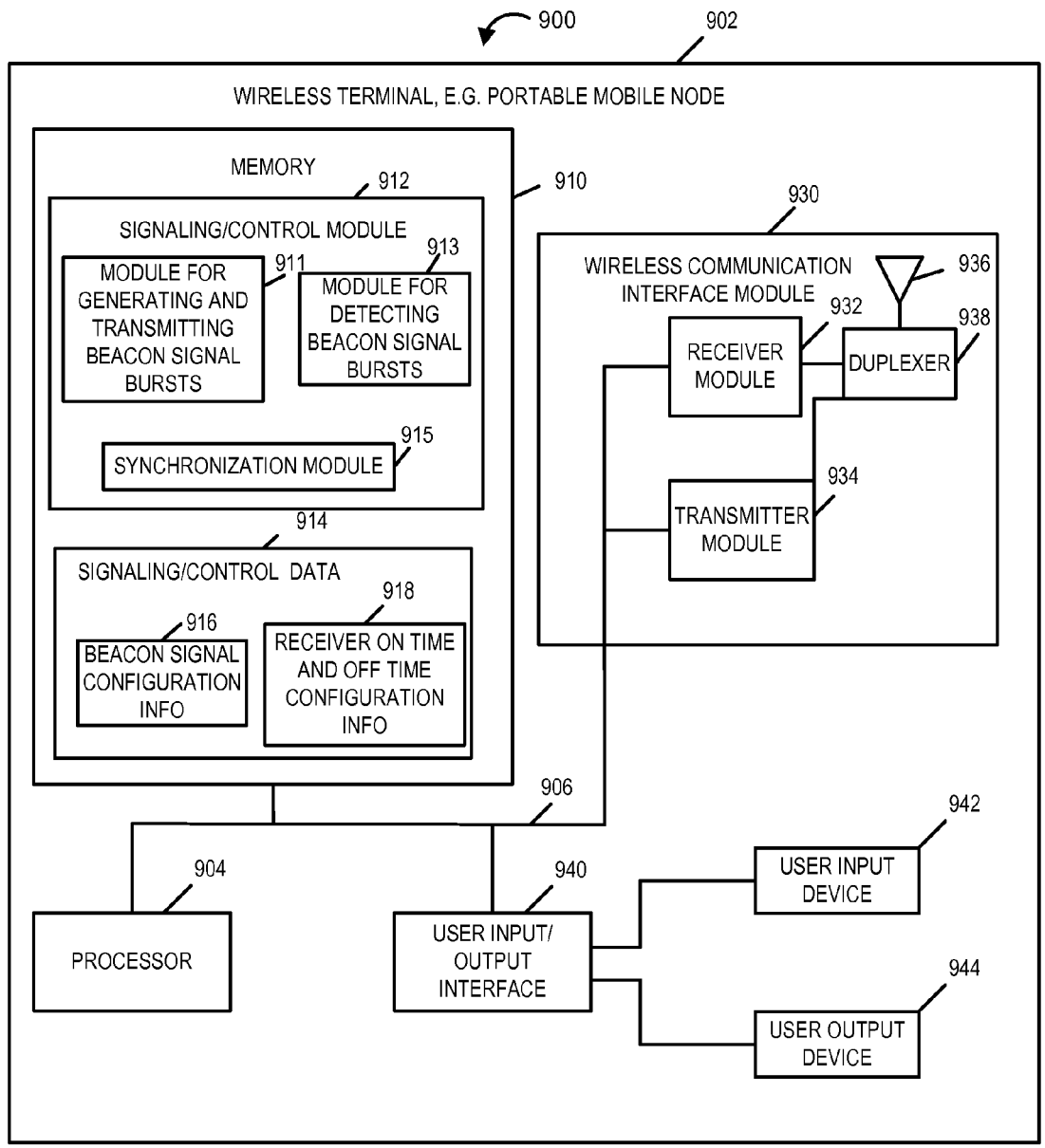
FIG. 9 illustrates a detailed illustration of an exemplary wireless terminal.

FIG. 9 provides a detailed illustration of an exemplary wireless terminal 900, e.g., portable mobile node, implemented. The exemplary wireless terminal 900, depicted in FIG. 9, is a detailed representation of an apparatus that may be used as any one of terminals 102 and 104 depicted in FIG. 1. In the FIG. 9 embodiment, the terminal 900 includes a processor 904, a wireless communication interface module 930, a user input/output interface 940 and memory 910 coupled together by bus 906. Accordingly, via bus 906 the various components of the terminal 900 can exchange information, signals and data. The components 904, 906, 910, 930, 940 of the terminal 900 are located inside a housing 902.

The wireless communication interface module 930 provides a mechanism by which the internal components of the wireless terminal 900 can send and receive signals to/from external devices and another wireless terminal. The wireless communication interface module 930 includes, e.g., a receiver module 932 and a transmitter module 934, which are connected with a duplexer 938 with an antenna 936 used for coupling the wireless terminal 900 to other terminals, e.g., via wireless communications channels.

The exemplary wireless terminal 900 also includes a user input device 942, e.g., keypad, and a user output device 944, e.g., display, which are coupled to bus 906 via the user input/output interface 940. Thus, user input/output devices 942, 944 can exchange information, signals and data with other components of the terminal 900 via user input/output interface 940 and bus 906. The user input/output interface 940 and associated devices 942, 944 provide a mechanism by which a user can operate the wireless terminal 900 to accomplish various tasks. In particular, the user input device 942 and user output device 944 provide the functionality that allows a user to control the wireless terminal 900 and applications, e.g., modules, programs, routines and/or functions, that execute in the memory 910 of the wireless terminal 900.

The processor 904 under control of various modules, e.g., routines, included in memory 910 controls operation of the wireless terminal 900 to perform various signaling and processing. The modules included in memory 910 are executed on startup or as called by other modules. Modules may exchange data, information, and signals when executed. Modules may also share data and information when executed. In the FIG. 9 embodiment, the memory 910 of exemplary wireless terminal 900 includes a signaling/control module 912 and signaling/control data 914.

The signaling/control module 912 controls processing relating to receiving and sending signals, e.g., messages, for management of state information storage, retrieval, and processing. Signaling/control data 914 includes state information, e.g., parameters, status and/or other information relating to operation of the terminal. In particular, the signaling/control data 914 includes beacon signal configuration information 916, e.g., the symbol periods in which the beacon signal bursts are to be transmitted and the signal forms of the beacon signal bursts including the frequency tones to be used, and receiver on time and off time configuration information 918, e.g., the starting and ending times of the on time intervals. The module 912 may access and/or modify the data 914, e.g., update the configuration information 916 and 918. The module 912 also includes the module for generating and transmitting beacon signal bursts 911, the module for detecting beacon signal bursts 913, and the synchronization module 915 for determining and/or implementing timing and/or frequency synchronization information as a function of received beacon signal information.

Figure 10:
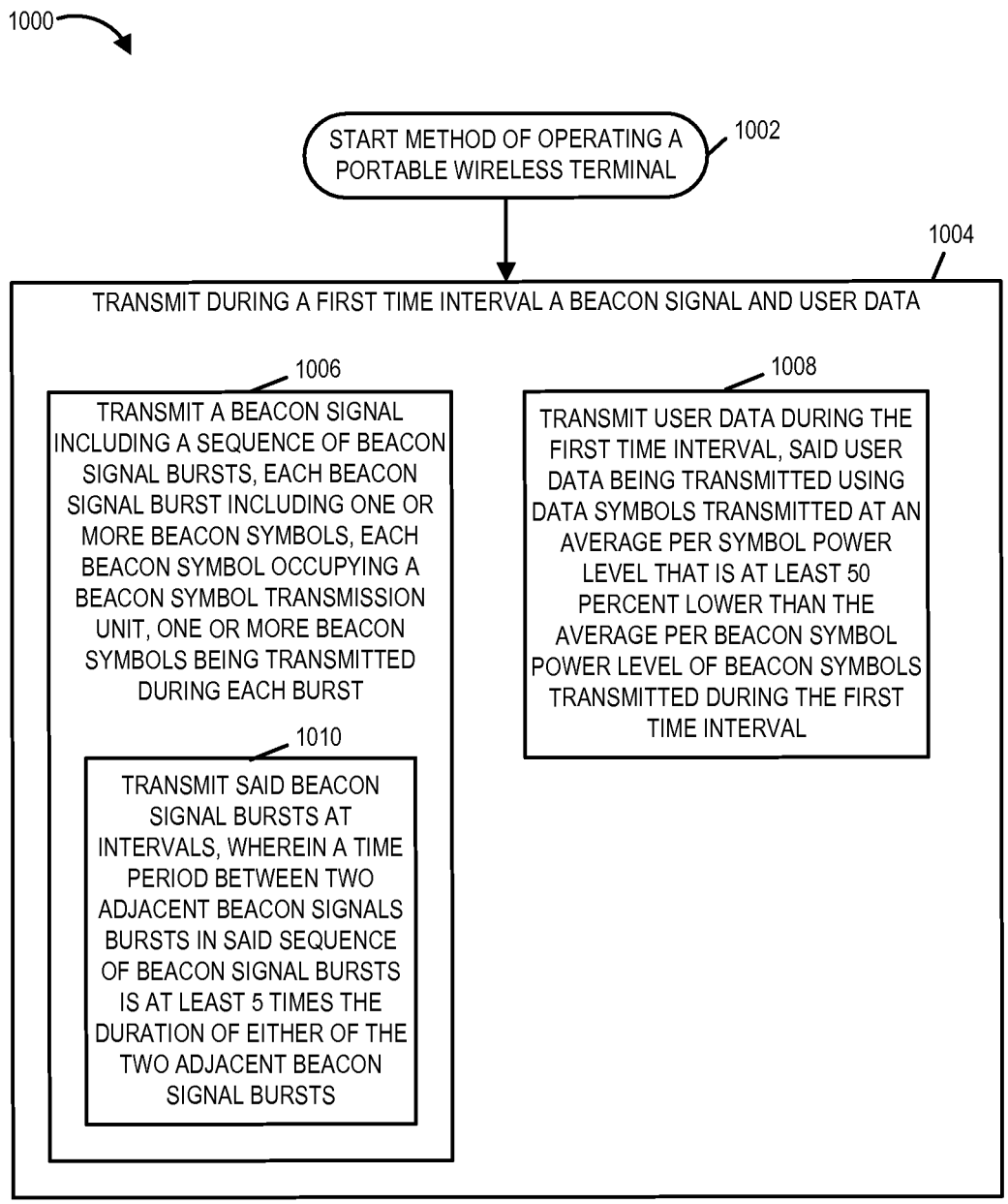
FIG. 10 is a drawing of a flowchart of an exemplary method of operating a portable wireless terminal.

FIG. 10 is a drawing of a flowchart 1000 of an exemplary method of operating a portable wireless terminal. Operation of the exemplary method starts in step 1002, where the wireless terminal is powered on and initialized and proceeds to step 1004. In step 1004, the wireless terminal is operated to transmit, during a first time interval, a beacon signal and user data. Step 1004 includes sub-step 1006 and sub-step 1008.

In sub-step 1006, the wireless terminal is operated to transmit a beacon signal including a sequence of beacon signal bursts, each beacon signal burst including one or more beacon symbols, each beacon symbol occupying a beacon symbol transmission unit, one or more beacon symbols being transmitted during each beacon symbol burst. In various embodiments, the transmission power used for transmitting the beacon signal is from a battery power source. The number of beacon symbols in a beacon signal burst may occupy less than ten (10) percent of the available beacon symbol transmission units. In one embodiment, each of the beacon signal bursts transmitted in the sequence of beacon signal bursts may have the same period. In other embodiments, at least some of the beacon signal bursts transmitted in the sequence of beacon signal bursts have periods of different length.

Sub-step 1006 includes sub-step 1010. In sub-step 1010, the wireless terminal is operated to transmit said beacon signal bursts at intervals, wherein a time period between two adjacent beacon signal bursts in said sequence of beacon signal bursts is at least five (5) times the duration of either of the two adjacent beacon signal bursts. In one embodiment, the time spacing between beacon signal bursts occurring during the first period of time is constant with the beacon signal bursts occurring in a periodic manner during the first period of time. In some such embodiments, the duration of beacon signal bursts during said first period of time is constant. In one embodiment, the time spacing between beacon signal bursts occurring during the first period of time varies with the beacon signal bursts occurring during the first period of time in accordance with a predetermined pattern. In some such embodiments, the duration of beacon signal bursts during said first period of time is constant. In one embodiment, the predetermined pattern varies depending on the wireless terminal performing the transmitting step. In various embodiments, the predetermined pattern is the same for all wireless terminals in the system. In one embodiment, the pattern is a pseudo random pattern.

In sub-step 1008, the wireless terminal is operated to transmit user data during the first time interval, said user data being transmitted using data symbols transmitted at an average per symbol power level that is at least fifty (50) percent lower than the average per beacon symbol power level of beacon symbols transmitted during the first time interval. In an aspect, the average per symbol transmission power level of each beacon symbol is at least ten (10) dB higher than the average per symbol transmission power level of symbols used to transmit data during the first time period. In an aspect, the average per symbol transmission power level of each beacon symbol is at least sixteen (16) dB higher than the average per symbol transmission power level of symbols used to transmit data during the first time period.

In various embodiments, the beacon symbols may be transmitted using OFDM tone-symbols, said beacon symbols occupying less than one (1) percent of the tone-symbols of a transmission resource used by said wireless terminal during a period of time including multiple beacon symbol bursts. In some such embodiments, the beacon symbols occupy less than one-tenth (0.1) percent of the tone-symbols in a portion of said period of time including one beacon signal burst and one interval between successive beacon signal bursts.

In sub-step 1008, the wireless terminal is operated to transmit user data on at least 10 percent of the tone-symbols of the transmission resource used by said wireless terminal during said first period of time. In some such embodiments, the time duration of a beacon signal burst time period occurring in said first period of time is at least fifty (50) times shorter than a time period occurring between two consecutive beacon signal bursts during said first period of time.

In an aspect, the portable wireless terminal includes an OFDM transmitter which transmits said beacon signal and the beacon signal is communicated using a resource which is a combination of frequency and time. In an aspect, the portable wireless terminal includes a CDMA transmitter which transmits said beacon signal and the beacon signal is communicated using a resource which is a combination of code and time.

Figure 11:
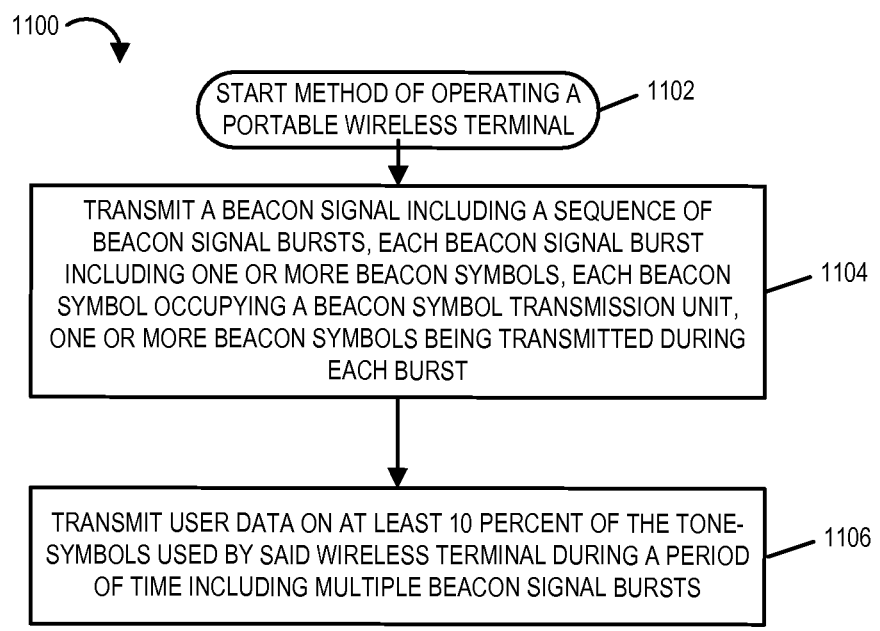
FIG. 11 is a drawing of a flowchart of an exemplary method of operating a portable wireless terminal.

FIG. 11 is a drawing of a flowchart 1100 of an exemplary method of operating a portable wireless terminal, e.g., a battery powered mobile node. Operation starts in step 1102, where the portable wireless terminal is powered on and initialized. Operation proceeds from start step 1102 to step 1104, where the portable wireless terminal is operated to transmit a beacon signal including a sequence of beacon signal bursts, each beacon symbol burst including one or more beacon symbols, each beacon symbol occupying a beacon symbol transmission unit, one or more beacon symbols being transmitted during each burst. In some such embodiments, the beacon symbols are transmitted using OFDM tone-symbols, and the beacon symbols occupy less than one (1) percent of the tone-symbols of a transmission resource used by said wireless terminal during a period of time including multiple signal bursts. Operation proceeds from step 1104 to step 1106.

In step 1106, the portable wireless terminal is operated to transmit user data on at least ten (10) percent of the tone-symbols used by said wireless terminal during a period of time including multiple signal bursts. In some such embodiments, the time duration of a beacon signal burst occurring in said period of time is at least fifty (50) times shorter than a time period occurring between two consecutive beacon signal bursts during said period of time.

Figure 12:
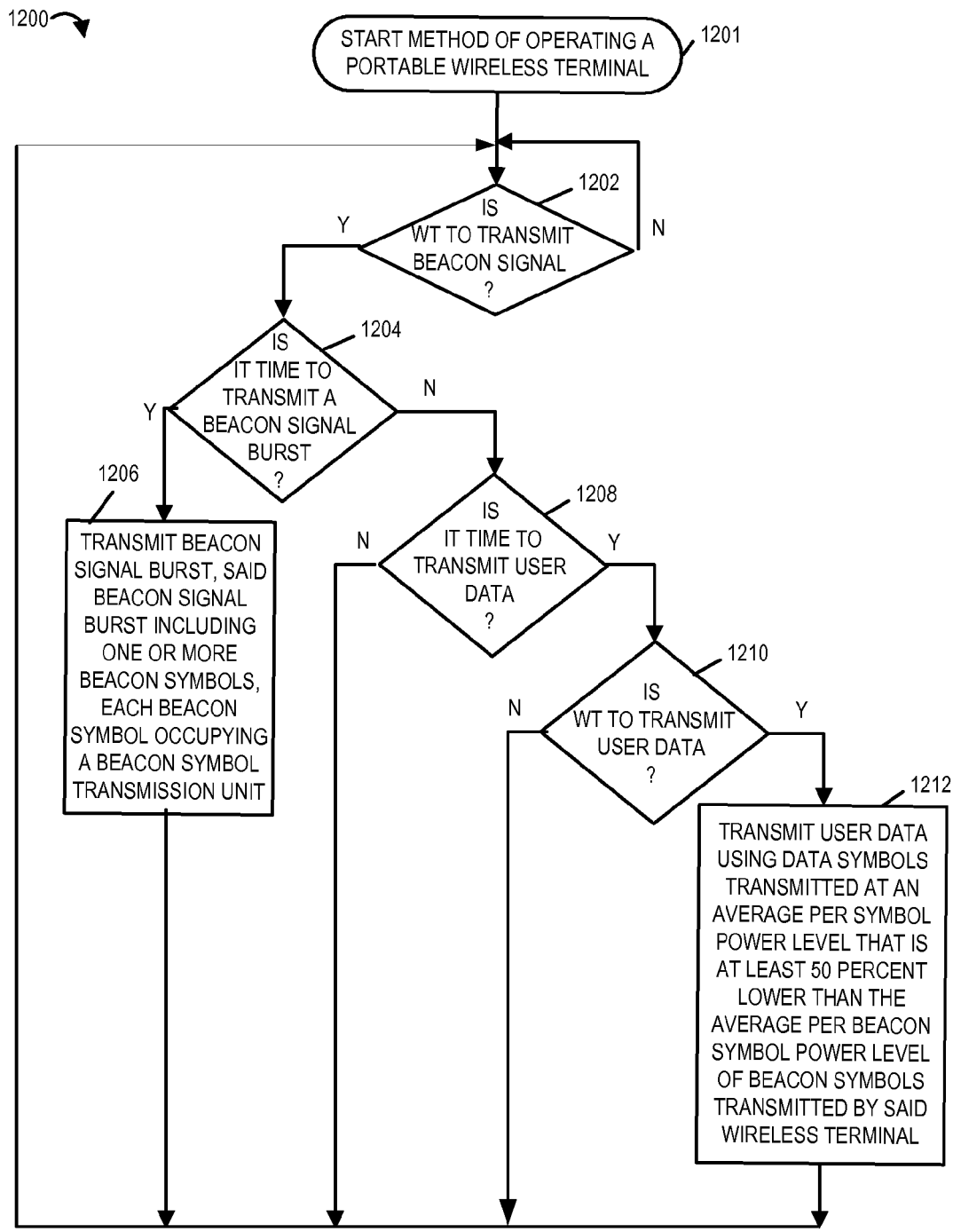
FIG. 12 is a drawing of a flowchart of an exemplary method of operating a portable wireless terminal, e.g., a battery powered mobile node.

FIG. 12 is a drawing of a flowchart 1200 of an exemplary method of operating a portable wireless terminal, e.g., a battery powered mobile node. Operation starts in step 1201, where the wireless terminal is powered on and initialized. Operation proceeds from start step 1201 to step 1202, where the wireless terminal checks as to whether the wireless terminal is to transmit beacon signals. If it is determined in step 1202 that the wireless terminal is to transmit beacon signals, e.g., the wireless terminal is in a mode of operation or state of operation in which the wireless terminal is to transmit beacon signals, operation proceeds from step 1202 to step 1204; otherwise operation proceeds back to the input of step 1202 for another check as to whether a beacon signal is to be transmitted.

In step 1204, the wireless terminal checks whether or not it is time to transmit a beacon signal burst. If it is determined in step 1204 that it is time to transmit a beacon signal burst, then operation proceeds to step 1206, where the wireless terminal transmits a beacon signal burst including one or more beacon symbols, each beacon symbol occupying a beacon symbol transmission unit. Operation proceeds from step 1206 to step 1202.

If it is determined in step 1204 that it is not time to transmit a beacon signal burst, then operation proceeds to step 1208, in which the wireless terminal determines whether or not it is time for potential user data transmission. If it is determined in step 1208 that it is the time allocated for potential user data transmissions, then operation proceeds from step 1208 to step 1210, otherwise operation proceeds from step 1208 to step 1202.

In step 1210, the wireless terminal determines if the wireless terminal is to transmit user data. If the wireless terminal is to transmit user data, then operation proceeds from step 1210 to step 1212, where the wireless terminal transmits user data using data symbols transmitted at an average per symbol power level that is at least fifty (50) percent lower than the average per beacon symbol power level of beacon symbols transmitted by said wireless terminal. If it is determined in step 1210, that the wireless terminal is not to transmit user data at this time, e.g., the wireless terminal has no backlog of user data waiting to be transmitted and/or a peer node to which the wireless terminal wants to send the data is not ready to receive the user data, then operation proceeds back to step 1202.

Figure 13:
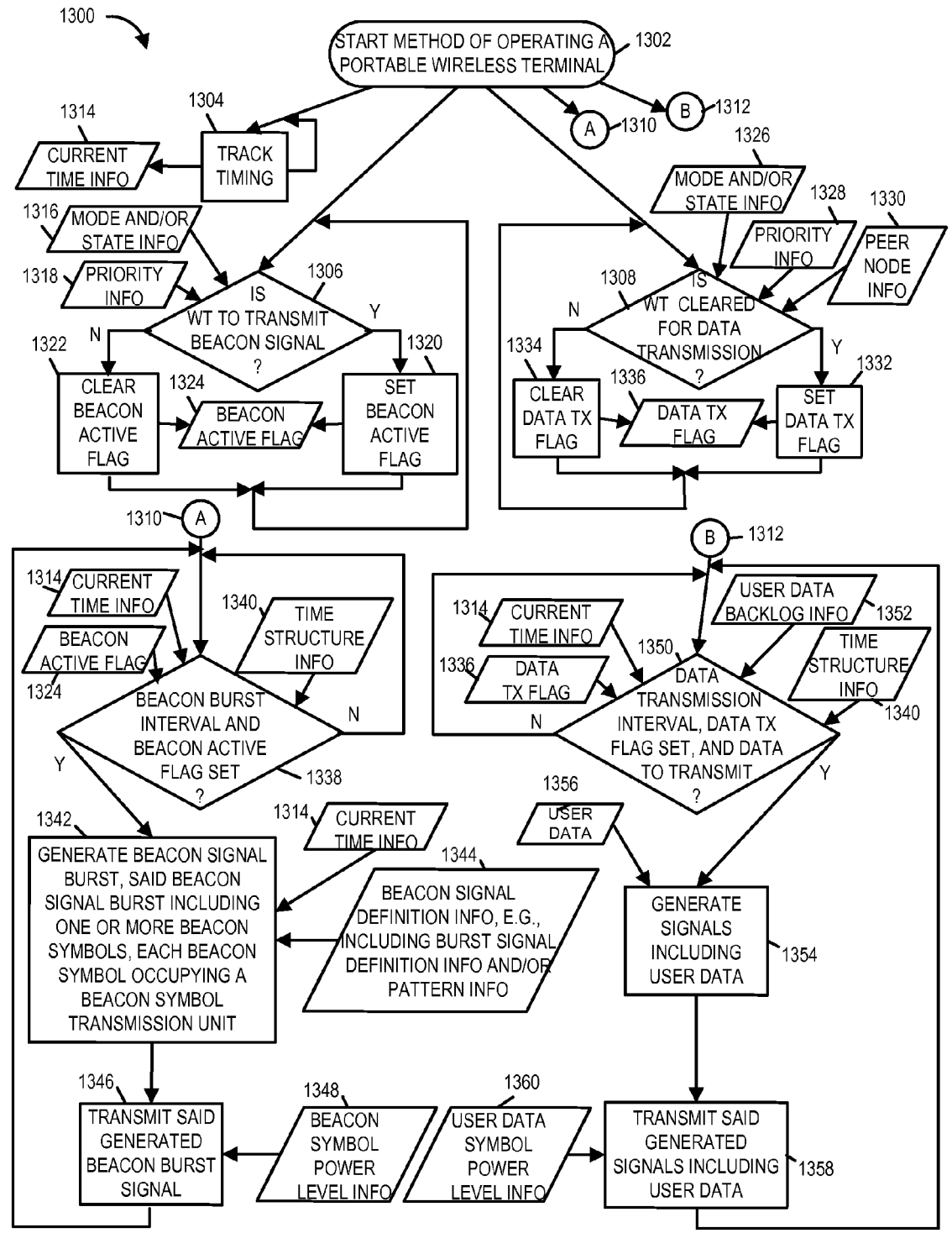
FIG. 13 is a drawing of a flowchart of an exemplary method of operating a portable wireless terminal, e.g., a battery powered mobile node.

FIG. 13 is a drawing of a flowchart 1300 of an exemplary method of operating a portable wireless terminal, e.g., a battery powered mobile node. Operation starts in step 1302, where the wireless terminal is powered on and initialized. Operation proceeds from start step 1302 to steps 1304, 1306, 1308, connecting node A 1310 and connecting node B 1312.

In step 1304, which may be performed on an ongoing basis, the wireless terminal tracks timing, outputting current time information 1314. Current time information 1314 identifies, e.g., an index value in a recurring timing structure being used by the wireless terminal.

In step 1306, the wireless terminal determines whether or not the wireless terminal is to transmit a beacon signal. The wireless terminal uses mode and/or state information 1316 and/or priority information 1318 in determining whether or not the wireless terminal should transmit a beacon signal. If the wireless terminal decides in step 1306 that the wireless terminal is to transmit a beacon signal, operation proceeds to step 1320, where the wireless terminal sets beacon active flag 1324. However, if the wireless terminal decides in step 1306 that the wireless terminal is not to transmit a beacon signal, operation proceeds to step 1322, where the wireless terminal clears the beacon active flag 1324. Operation proceeds from step 1320 or step 1322 back to step 1306, where the wireless terminal again tests as to whether or not a beacon signal should be transmitted.

In step 1308, the wireless terminal determines whether or not the wireless terminal is cleared for data transmissions. The wireless terminal uses mode and/or state information 1326, priority information 1328, and/or peer node information 1330, e.g., information indicating whether or not a peer wireless terminal is receptive and able to receive user data, in determining whether or not the wireless terminal is cleared for data transmission. If the wireless terminal decides in step 1308 that the wireless terminal is cleared to transmit user data, operation proceeds to step 1332, where the wireless terminal sets data transmission flag 1336. However, if the wireless terminal decides in step 1308 that the wireless terminal is not cleared for user data transmissions, operation proceeds to step 1334, where the wireless terminal clears the data transmission flag 1336. Operation proceeds from step 1332 or step 1334 back to step 1308, where the wireless terminal again tests as to whether or not the wireless terminal is cleared for data transmission.

Returning to connecting node A 1310, operation proceeds from connecting node A 1310 to step 1338. In step 1338, the wireless terminal checks as to whether the current time information 1314 indicates a beacon burst interval with respect to the time structure information 1340 and whether or not the beacon active flag 1324 is set. If the time indicates that it is a beacon burst interval and that the beacon active flag is set, then operation proceeds from step 1338 to step 1342; otherwise operation proceeds back to the input of step 1338 for another test of conditions.

In step 1342, the wireless terminal generates a beacon signal burst, said beacon signal burst including one or more beacon symbols, each beacon symbol occupying a beacon symbol transmission unit. The wireless terminal utilizes current time information 1314 and stored beacon signal definition information 1344 in generating the beacon signal burst. The beacon signal definition information 1344 includes, e.g., burst signal definition information and/or pattern information. Beacon signal burst information includes information identifying a subset of OFDM tone-symbols used for conveying beacon symbols corresponding to the generated beacon burst signal for the wireless terminal within a set of potential OFDM tone-symbols which may be used to carry beacon symbols. In one embodiment, the tone-subset for one beacon signal burst may be, and sometimes is, different from one beacon signal burst to the next within the same beacon signal, e.g., in accordance with a predetermined hopping pattern. In an embodiment, beacon signal information includes information identifying the modulation symbol values to be conveyed by the beacon tone symbols of the generated beacon burst signal. In an embodiment, a sequence of beacon signal bursts is used to define a beacon signal, e.g., corresponding to a particular wireless terminal. In an aspect, a pattern of beacon symbols is utilized to define the beacon signal, e.g., a particular pattern within the beacon burst signal.

Operation proceeds from step 1342 to step 1346, in which the wireless terminal transmits the generated beacon burst signal. The wireless terminal uses stored beacon symbol power level information 1348 to determine the transmission power level of the beacon symbols within the transmitted beacon burst signal. Operation then proceeds from step 1346 to step 1338.

Returning to connecting node B 1312, operation proceeds from connecting node B 1312 to step 1350. In step 1350, the wireless terminal checks as to whether the current time information 1314 indicates a data transmission interval with respect to the time structure information 1340, whether or not the data transmission flag 1336 is set, and whether the wireless terminal has data to transmit as indicated by user backlog information 1352. If the indications are that it is a data transmission interval, that the data transmission flag 1336 is set and that the wireless terminal has data waiting to be transmitted, then operation proceeds from step 1350 to step 1354; otherwise operation proceeds back to the input of step 1350 for another test of conditions.

In step 1354, the wireless terminal generates signals including user data 1356. User data 1356 includes, e.g., audio, image, file, and/or text data/information intended for a peer of the wireless terminal.

Operation proceeds from step 1354 to step 1358, in which the wireless terminal transmits the generated signals including user data. The wireless terminal uses stored user data symbol power level information 1360 to determine the transmission power level of the user data symbols to be transmitted. Operation proceeds from step 1358 to step 1350 where the wireless terminal performs checks pertaining to user data transmission.

In an aspect, the number of beacon symbols within a beacon signal burst may occupy less than ten (10) percent of the available beacon symbol transmission units. In various embodiments, the user data symbols are transmitted at an average per symbol power level that is at least fifty (50) percent lower than the average per beacon symbol power level of transmitted beacon symbols.

Figure 14:
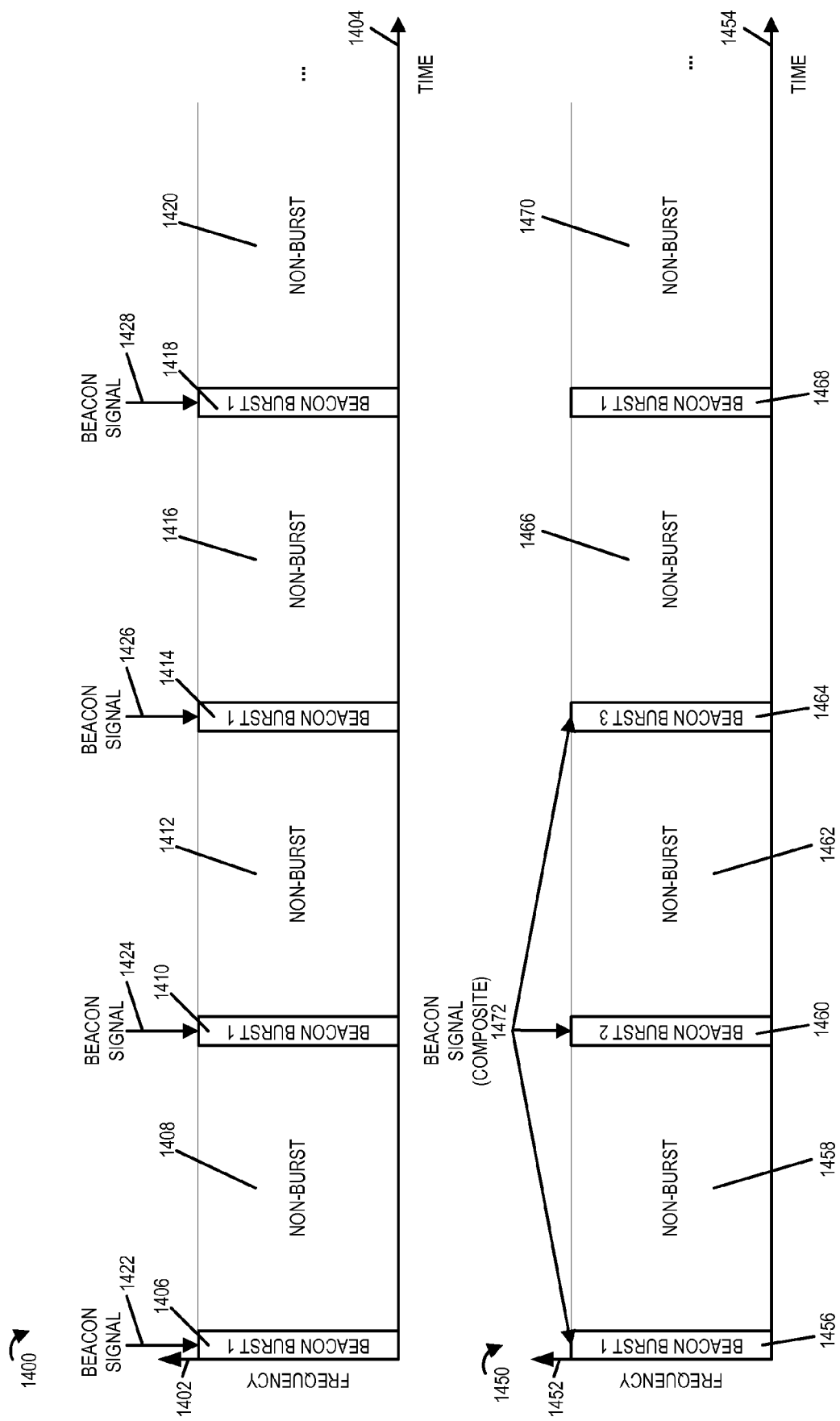
FIG. 14 includes drawings illustrating exemplary beacon signaling from a portable wireless terminal.

FIG. 14 includes drawing 1400 illustrating exemplary beacon signaling from a portable wireless terminal, in accordance with an exemplary embodiment in which the same beacon burst signal, beacon burst 1, is repeated between non-beacon burst intervals. Each beacon signal burst includes one or more beacon symbols, each beacon symbol occupying a beacon symbol transmission unit, one or more beacon symbols being transmitted during each beacon signal burst. Frequency, e.g., OFDM tones, is plotted on the vertical axis 1402, while time is plotted on horizontal axis 1404. The following sequence is illustrated in drawing 1400: beacon burst 1 signal interval including beacon burst 1 signal 1406, non-burst interval 1408, beacon burst 1 signal interval including beacon burst 1 signal 1410, non-burst interval 1412, beacon burst 1 signal interval including beacon burst 1 signal 1414, non-burst interval 1416, beacon burst 1 signal interval including beacon burst 1 signal 1418, non-burst interval 1420. In this example, each beacon burst signal (1406, 1410, 1414, 1418) corresponds to a beacon signal (1422, 1424, 1426, 1428). In addition in this example, each beacon burst signal (1422, 1424, 1426, 1428) is the same; each beacon burst signal includes the same beacon symbols.

FIG. 14 also includes drawing 1450 illustrating exemplary beacon signaling from a portable wireless terminal in which a beacon signal is a composite signal including a sequence of beacon burst signals. Each beacon signal burst includes one or more beacon symbols, each beacon symbol occupying a beacon symbol transmission unit, one or more beacon symbols being transmitted during each beacon signal burst. Frequency, e.g., OFDM tones, is plotted on the vertical axis 1452, while time is plotted on horizontal axis 1454. The following sequence is illustrated in drawing 1450: beacon burst 1 signal interval including beacon burst 1 signal 1456, non-burst interval 1458, beacon burst 2 signal interval including beacon burst 2 signal 1460, non-burst interval 1462, beacon burst 3 signal interval including beacon burst 3 signal 1464, non-burst interval 1466, beacon burst 1 signal interval including beacon burst 1 signal 1468, non-burst interval 1470. In this example, beacon signal 1472 is a composite signal including beacon burst 1 signal 1456, beacon burst 2 signal 1460 and beacon burst 3 signal 1464. In addition in this example, each beacon burst signal (beacon burst 1 signal 1456, beacon burst 2 signal 1460, beacon burst 3 signal 1464) is different; e.g., each beacon burst signal includes a set of beacon symbols which does not match either set corresponding to the other two beacon burst signals.

In an aspect, the beacon symbols occupy less than 0.3 percent of the air resource including one beacon signal burst and one interval between successive beacon signal bursts. In some such embodiments, the beacon symbols occupy less than 0.1 percent of the air resource including one beacon signal burst and one interval between successive beacon signal bursts. The air resource in some embodiments includes a set of OFDM tone-symbols corresponding to a set of tones for a predetermined time interval.

Figure 15:
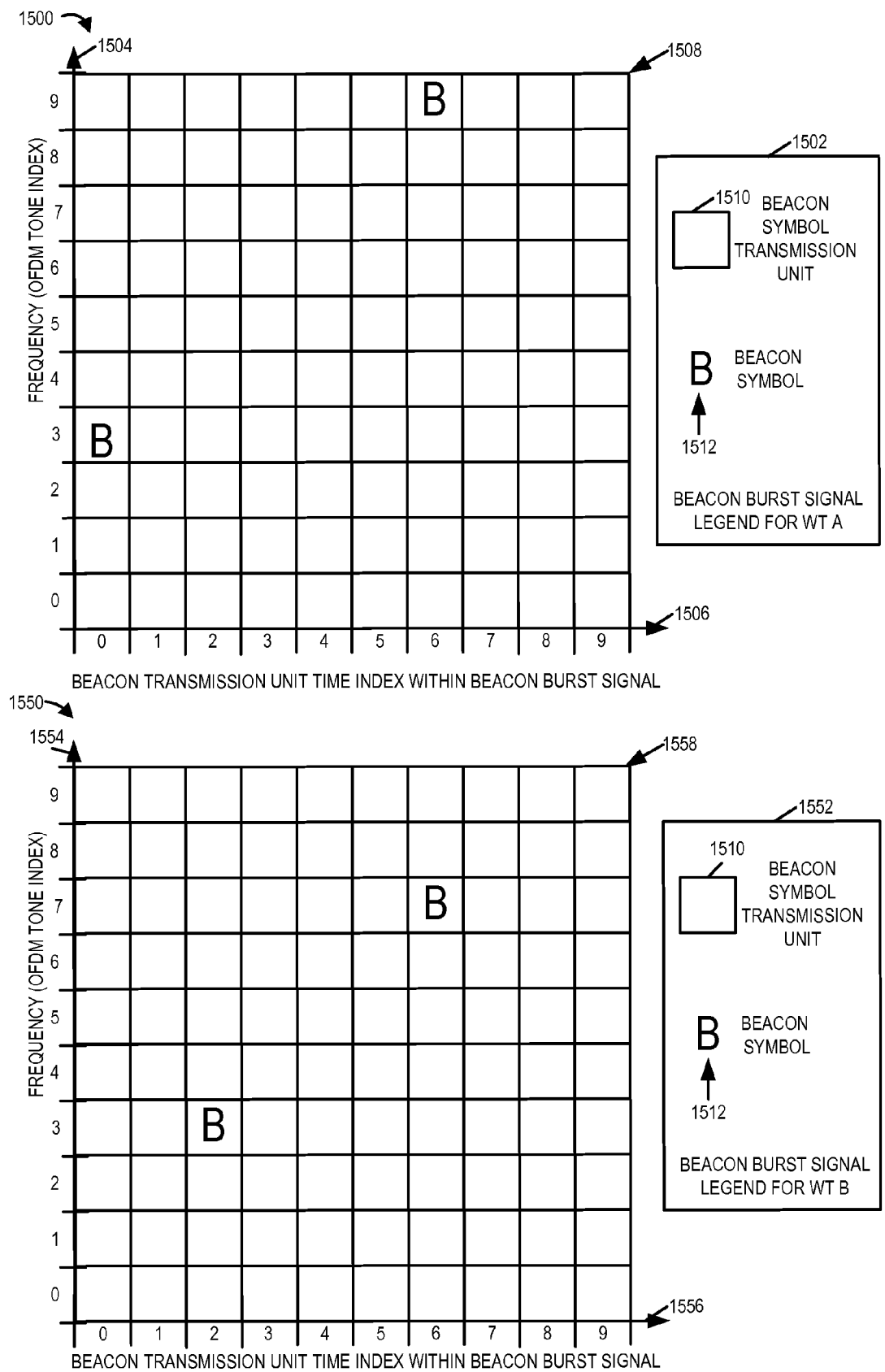
FIG. 15 illustrates that different wireless terminals, transmit different beacon signals including different beacon burst signals.

FIG. 15 illustrates that different wireless terminals transmit different beacon signals including different beacon burst signals. Different beacon signals transmitted from wireless terminals can be, and sometimes are, used for wireless terminal identification. For example, consider that drawing 1500 includes a representation of a beacon burst signal associated with wireless terminal A, while drawing 1550 includes a representation of a beacon burst signal associated with wireless terminal B. Legend 1502 corresponds to drawing 1500, while legend 1552 corresponds to drawing 1550.

Legend 1502 indicates that with respect to the beacon burst signal for WT A, grid box 1510 represents a beacon symbol transmission unit, while large letter "B" 1512 represents a beacon symbol conveyed by a beacon transmission unit. In drawing 1500, vertical axis 1504 represents frequency, e.g., OFDM tone index, while horizontal axis 1506 represents beacon transmission unit time index within the beacon burst signal. Beacon burst signal 1508 includes one hundred (100) beacon symbol transmission units 1510. Two of those beacon symbol transmission units carry a beacon symbol "B" 1512. A first beacon symbol has frequency index=3 and time index=0; a second beacon symbol has frequency index=9 and time index=6. The other beacon symbol transmission units are left unused. Thus in this example 2% of the transmission resources of the beacon burst are used to convey beacon symbols. In some embodiments beacon symbols occupy less than 10% of the transmission resources of the beacon burst.

Legend 1552 indicates that with respect to the beacon burst signal for WT B, grid box 1510 represents a beacon symbol transmission unit, while large letter "B" 1512 represents a beacon symbol conveyed by a beacon transmission unit. In drawing 1550, vertical axis 1504 represents frequency, e.g., OFDM tone index, while horizontal axis 1556 represents beacon transmission unit time index within the beacon burst signal. Beacon burst signal 1558 includes 100 beacon symbol transmission units 1510. Two of those beacon symbol transmission units carry a beacon symbol "B" 1512. A first beacon symbol has frequency index=3 and time index=2; a second beacon symbol has frequency index=7 and time index=6. The other beacon symbol transmission units are left unused. Thus in this example 2% of the transmission resources of the beacon burst are used to convey beacon symbols.

FIG. 16 is a drawing 1600 and corresponding legend 1602 illustrating a feature of some embodiments, in which a beacon symbol transmission unit includes a plurality of OFDM symbol transmission units. In this example, a beacon symbol transmission unit occupies two adjacent OFDM symbol transmission units. In other embodiments, a beacon symbol transmission unit occupies a different number of OFDM transmission units, e.g., 3, or 4. This feature of using multiple OFDM transmission units for a beacon symbol transmission unit can facilitate easy detection of a beacon signal, e.g., where precise timing and/or frequency synchronization between wireless terminals may not exist. In an embodiment, the beacon symbol includes an initial beacon symbol portion followed by an extension beacon symbol portion. For example, the initial beacon symbol portion includes a cyclic prefix portion followed by a body portion, and the extension beacon symbol portion is a continuation of the body portion.

Legend 1602 illustrates that for the exemplary beacon burst signal 1610, an OFDM transmission unit is represented by square box 1612, while a beacon symbol transmission unit is represented by rectangular box 1614 with heavy borders. Large letters "BS" 1616 represent a beacon symbol conveyed by a beacon transmission unit.

In drawing 1600, vertical axis 1604 represents frequency, e.g., OFDM tone index, while horizontal axis 1606 represents beacon transmission unit time index within the beacon burst signal, and horizontal axis 1608 represents OFDM symbol time interval index within the beacon burst signal. Beacon burst signal 1610 includes 100 OFDM symbol transmission units 1612 and 50 beacon symbol transmission units 1614. Two of those beacon symbol transmission units carry a beacon symbol BS 1616. A first beacon symbol has frequency index=3, beacon transmission unit time index=0, and OFDM time index 0-1; a second beacon symbol has frequency index=9, beacon transmission unit time index=3, and OFDM time index 6-7. The other beacon symbol transmission units are left unused. Thus in this example 4% of the transmission resources of the beacon burst are used to convey beacon symbols. In some embodiments beacon symbols occupy less than 10% of the transmission resources of the beacon burst.

Figure 17:
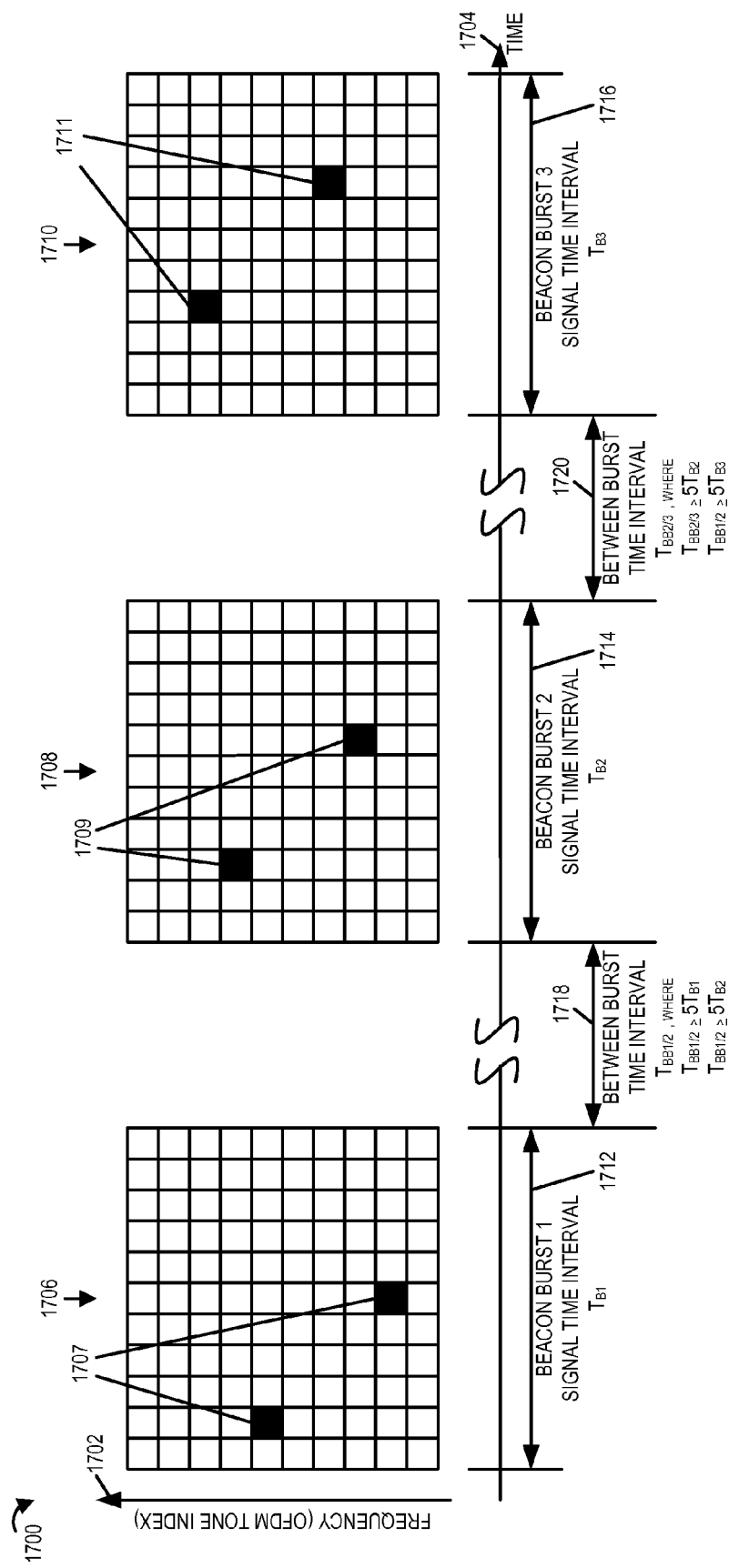
FIG. 17 is a drawing used to illustrate an exemplary beacon signal comprising a sequence of beacon burst signals and to illustrate timing relationships of some embodiments.

FIG. 17 is a drawing 1700 used to illustrate an exemplary beacon signal comprising a sequence of beacon burst signals and to illustrate timing relationships of some embodiments. Drawing 1700 includes a vertical axis 1702 representing frequency, e.g., OFDM tone index, while the horizontal axis 1704 represents time. The exemplary beacon signal of drawing 1700 includes beacon burst 1 signal 1706, beacon burst 2 signal 1708 and beacon burst 3 signal 1710. The exemplary beacon signal of drawing 1700 may be, e.g., the composite beacon signal 1472 of drawing 1450 of FIG. 14.

Beacon burst signal 1706 includes two beacon symbols 1707; beacon burst signal 1708 includes two beacon symbols 1709; beacon burst signal 1710 includes two beacon symbols 1711. In this example, the beacon symbols in each burst occur in different beacon transmission unit positions in the time/frequency grid. In addition, in this example the change of positions is in accordance with a predetermined tone hopping sequence.

Along time axis 1704, there is a beacon burst 1 signal time interval $T_{B1}$ 1712 corresponding to beacon burst 1 signal 1706, followed by a between burst time interval $T_{BB1/2}$ 1718, followed by a beacon burst 2 signal time interval $T_{B2}$ 1714 corresponding to beacon burst 2 signal 1708, followed by a between burst time interval $T_{BB2/3}$ 1720, followed by a beacon burst 3 signal time interval $T_{B3}$ 1716 corresponding to beacon burst 3 signal 1710. In this example, the time between beacon bursts is at least 5 times greater than the time of an adjacent burst. For example, $T_{BB1/2} \geq 5\ T_{B1}$ and $T_{BB1/2} \geq 5\ T_{B2}$; $T_{BB2/3} \geq 5\ T_{B2}$ and $T_{BB2/3} \geq 5\ T_{B3}$. In this example, each of the beacon bursts (1706, 1708, 1710) have the same time duration, e.g., $T_{B1} = T_{B2} = T_{B3}$.

Figure 18:
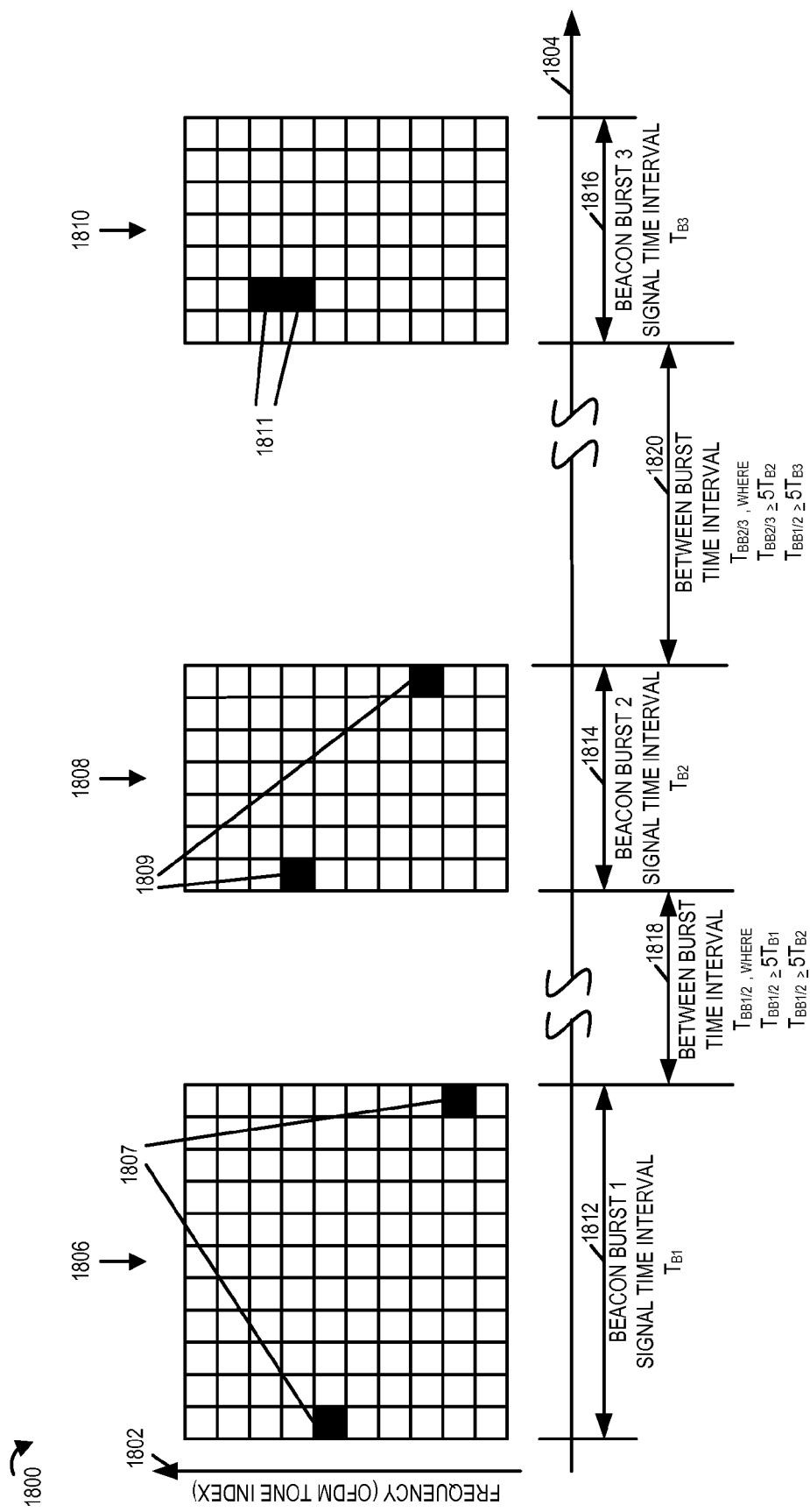
FIG. 18 is a drawing used to illustrate an exemplary beacon signal comprising a sequence of beacon burst signals and to illustrate timing relationships of some embodiments.

FIG. 18 is a drawing 1800 used to illustrate an exemplary beacon signal comprising a sequence of beacon burst signals and to illustrate timing relationships of some embodiments. Drawing 1800 includes a vertical axis 1802 representing frequency, e.g., OFDM tone index, while the horizontal axis 1804 represents time. The exemplary beacon signal of drawing 1800 includes beacon burst 1 signal 1806, beacon burst 2 signal 1808 and beacon burst 3 signal 1810. The exemplary beacon signal of drawing 1800 is, e.g., the composite beacon signal 1472 of drawing 1450 of FIG. 14.

Beacon burst signal 1806 includes two beacon symbols 1807; beacon burst signal 1808 includes two beacon symbols 1809; beacon burst signal 1810 includes two beacon symbols 1811. In this example, the beacon symbols in each burst occur in different beacon transmission unit positions in the time/frequency grid. In addition in this example, the change of positions is in accordance with a predetermined tone hopping sequence.

Along time axis 1804, there is a beacon burst 1 signal time interval $T_{B1}$ 1812 corresponding to beacon burst 1 signal 1806, followed by a between burst time interval $T_{BB1/2}$ 1818, followed by a beacon burst 2 signal time interval $T_{B2}$ 1814 corresponding to beacon burst 2 signal 1808, followed by a between burst time interval $T_{BB2/3}$ 1820, followed by a beacon burst 3 signal time interval $T_{B3}$ 1816 corresponding to beacon burst 3 signal 1810. In this example, the time between beacon bursts is at least 5 times greater than the time of an adjacent burst. For example, $T_{BB1/2} \geq 5\ T_{B1}$ and $T_{BB1/2} \geq 5\ T_{B2}$; $T_{BB2/3} \geq 5\ T_{B2}$ and $T_{BB2/3} \geq 5\ T_{B3}$. In this example, each of the beacon bursts (1806, 1808, 1810) have the different time duration, e.g., $T_{B1} \neq T_{B2} \neq T_{B3} \neq T_{B1}$., at least two of the beacon burst signals in the composite beacon signal have different duration.

Figure 19:
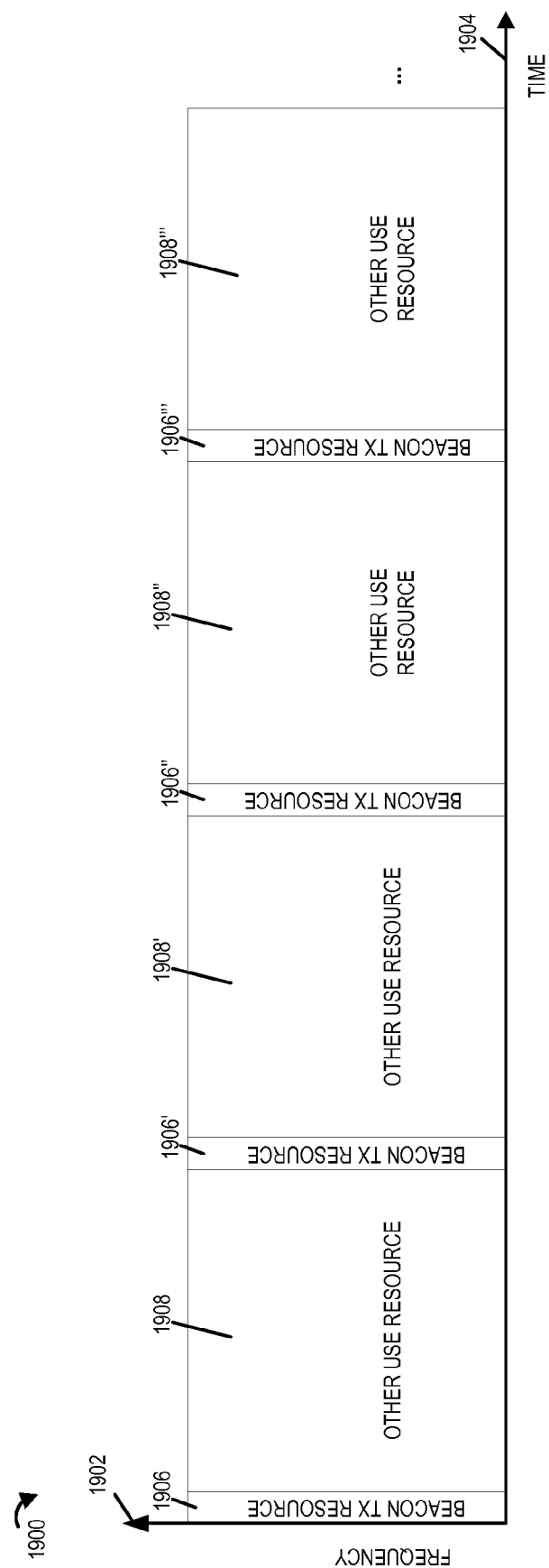
FIG. 19 is a drawing illustrating exemplary air link resource partitioning by a wireless terminal in a mode of operation in which the wireless terminal transmits a beacon signal.

FIG. 19 is a drawing 1900 illustrating exemplary air link resource partitioning by a wireless terminal in a mode of operation in which the wireless terminal transmits a beacon signal. Vertical axis 1902 represents frequency, e.g., OFDM tones, while horizontal axis 1904 represents time. In this example, there is a beacon transmission resource 1906, followed by an other use resource 1908, followed by a beacon transmission resource 1906', followed by an other use resource 1908', followed by a beacon transmission resource 1906'', followed by an other use resource 1908'', followed by a beacon transmission resource 1906''', followed by an other use resource 1908'''. A beacon transmission resource of FIG. 19 corresponds, e.g., to a beacon burst of FIG. 14, while an other use resource of FIG. 19 corresponds, e.g., to a non-burst interval of FIG. 14.

Figure 20:
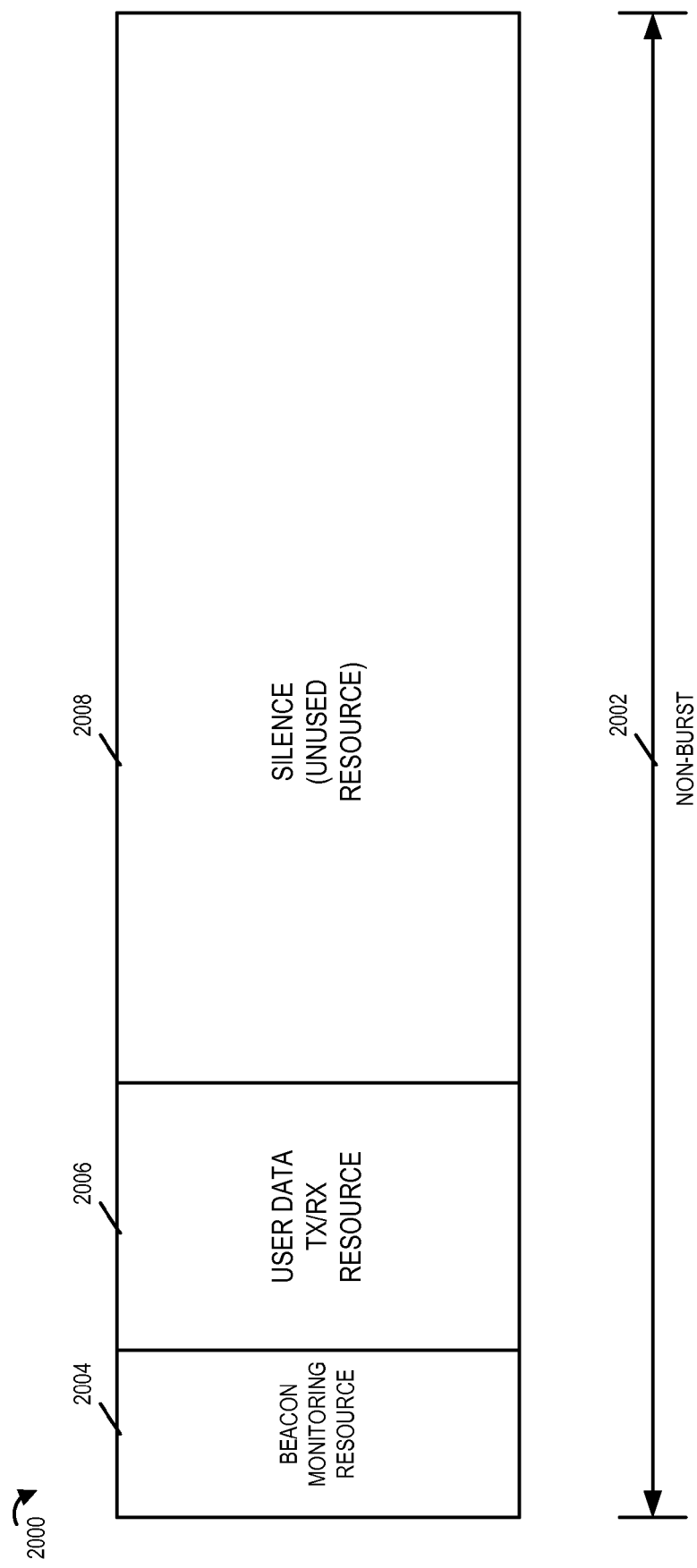
FIG. 20 describes an exemplary air link resource portion associated with uses other than beacon signal transmission for an exemplary mode of wireless terminal operation in which the wireless terminal transmits a beacon signal and can receive and/or transmit user data, e.g., an active mode of operation.

FIG. 20 describes an exemplary other use resource, e.g., resource 2000, for an exemplary mode of wireless terminal operation in which the wireless terminal transmits a beacon signal and can receive and/or transmit user data, e.g., an active mode of operation. Other use resource 2000 occurs during non-burst interval 2002 and includes: a beacon monitoring resource 2004, a user data transmission/receive resource 2006, and a silence or unused resource 2008. The beacon monitoring resource 2004 represents air link resources, e.g., a combination of frequency and time, in which the wireless terminal detects for the presence of other beacon signals, e.g., from other wireless terminals and/or fixed position reference beacon signal transmitters. The user data resource 2006 represents air link resources, e.g., a combination of frequency and time, in which the wireless terminal can transmit user data and/or receive user data. The silence air link resource 2008 represents unused air link resources, e.g., where the wireless terminal neither receives nor transmits. During the silence resource 2008, the wireless can be, and sometimes is, in a sleep state in which power consumption is lowered to conserve energy.

Figure 21:
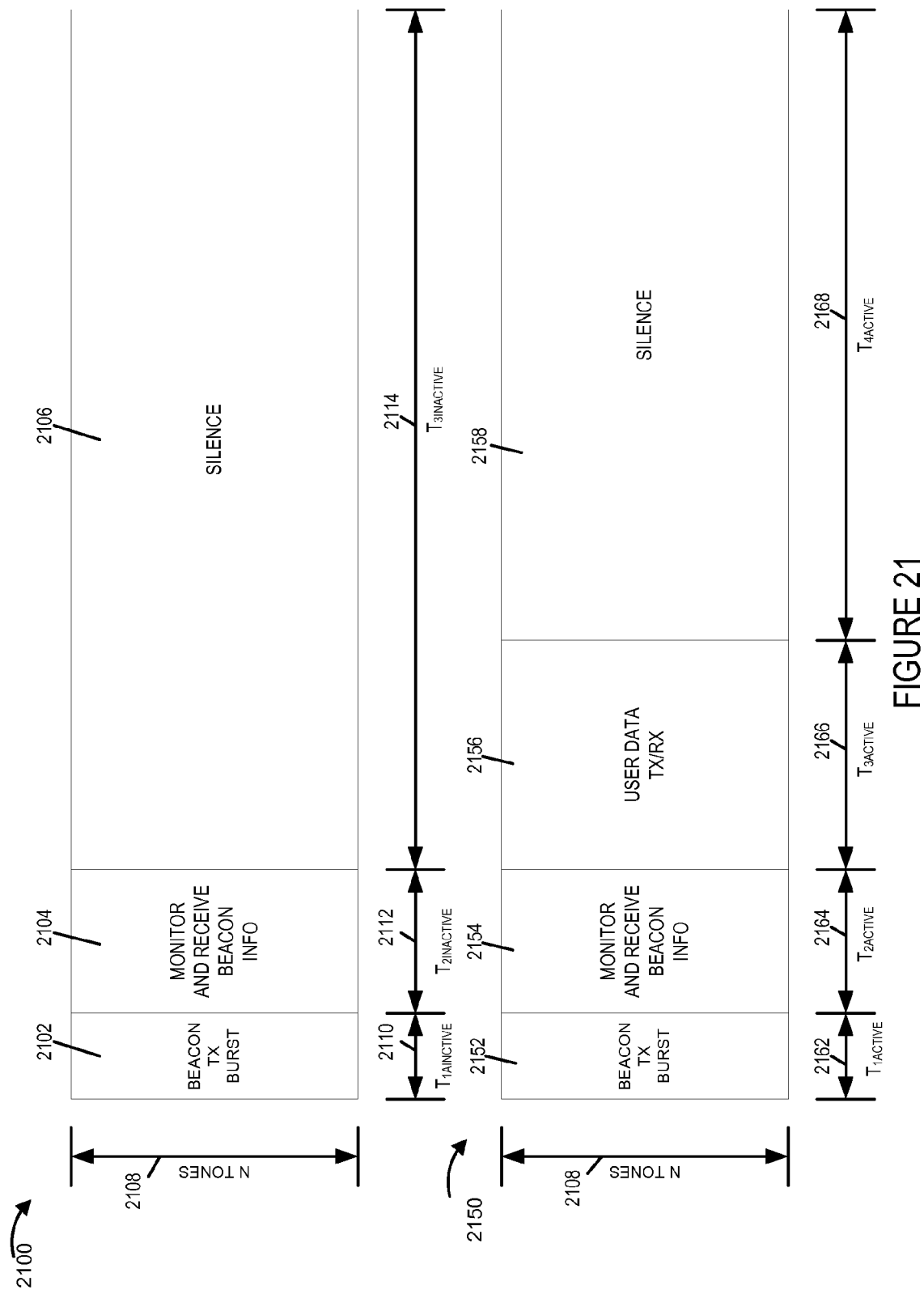
FIG. 21 illustrates two exemplary modes of wireless terminal operation in which the wireless terminal is transmitting a beacon signal, e.g., an inactive mode and an active mode.

FIG. 21 illustrates two exemplary modes of wireless terminal operation in which the wireless terminal is transmitting a beacon signal, e.g., an inactive mode and an active mode. Drawing 2100 corresponds to the exemplary inactive mode of operation, while drawing 2150 corresponds to the active mode of operation.

In the exemplary inactive mode of operation, the wireless terminal does not transmit or receiver user data. In drawing 2100, the air link resource used by the wireless terminal occupies N tones 2108. In an embodiment, N is greater than or equal to one hundred (100). In drawing 2100, there is a beacon transmission burst resource 2102 with a corresponding time duration $T_{1inactive}$ 2110, followed by a monitor and receive beacon information resource 2104 with a corresponding time duration $T_{2inactive}$ 2112, followed by a silence resource 2106 with a corresponding time duration $T_{3inactive}$ 2114. In various embodiments, $T_{1inactive}<T_{2inactive}<T_{3inactive}$. In an aspect, $T_{2inactive} \geq 4T_{1inactive}$. In an embodiment, $T_{3inactive} \geq 10T_{2inactive}$. For, example, in one exemplary embodiment N>100, e.g. 113, $T_{1inactive}$=50 OFDM symbol transmission time intervals, $T_{2inactive}$=200 OFDM symbol transmission time intervals, and $T_{3inactive}$=2000 OFDM symbol transmission time intervals. In such an embodiment, if beacon symbols are allowed to occupy at most 10% of the burst beacon signal resource, beacon symbols occupy approximately at most 0.22% of the total resource.

In the exemplary active mode of operation, the wireless terminal can transmit and receive user data. In drawing 2150, the air link resource used by the wireless terminal occupies N tones 2108. In an embodiment, N is greater than or equal to one hundred (100). In drawing 2150, there is a beacon transmission burst resource 2152 with a corresponding time duration $T_{1active}$ 2162, followed by a monitor and receive beacon information resource 2154 with a corresponding time duration $T_{2active}$ 2164, followed by a user data transmit/receive resource 2156 with a corresponding time duration $T_{3active}$ 2166, followed by a silence resource 2158 with a corresponding time duration $T_{4active}$ 2168. In various embodiments, $T_{1active}<T_{2active}<T_{3active}$. In an aspect, $T_{2active} \geq 4T_{1active}$. In one embodiment, $(T_{3active}+T_{4active}) \geq 10T_{2inactive}$. In various embodiments $T_{1inactive}=T_{1active}$. In an embodiment, there may be guard intervals between at least some of the different types of intervals.

Figure 22:
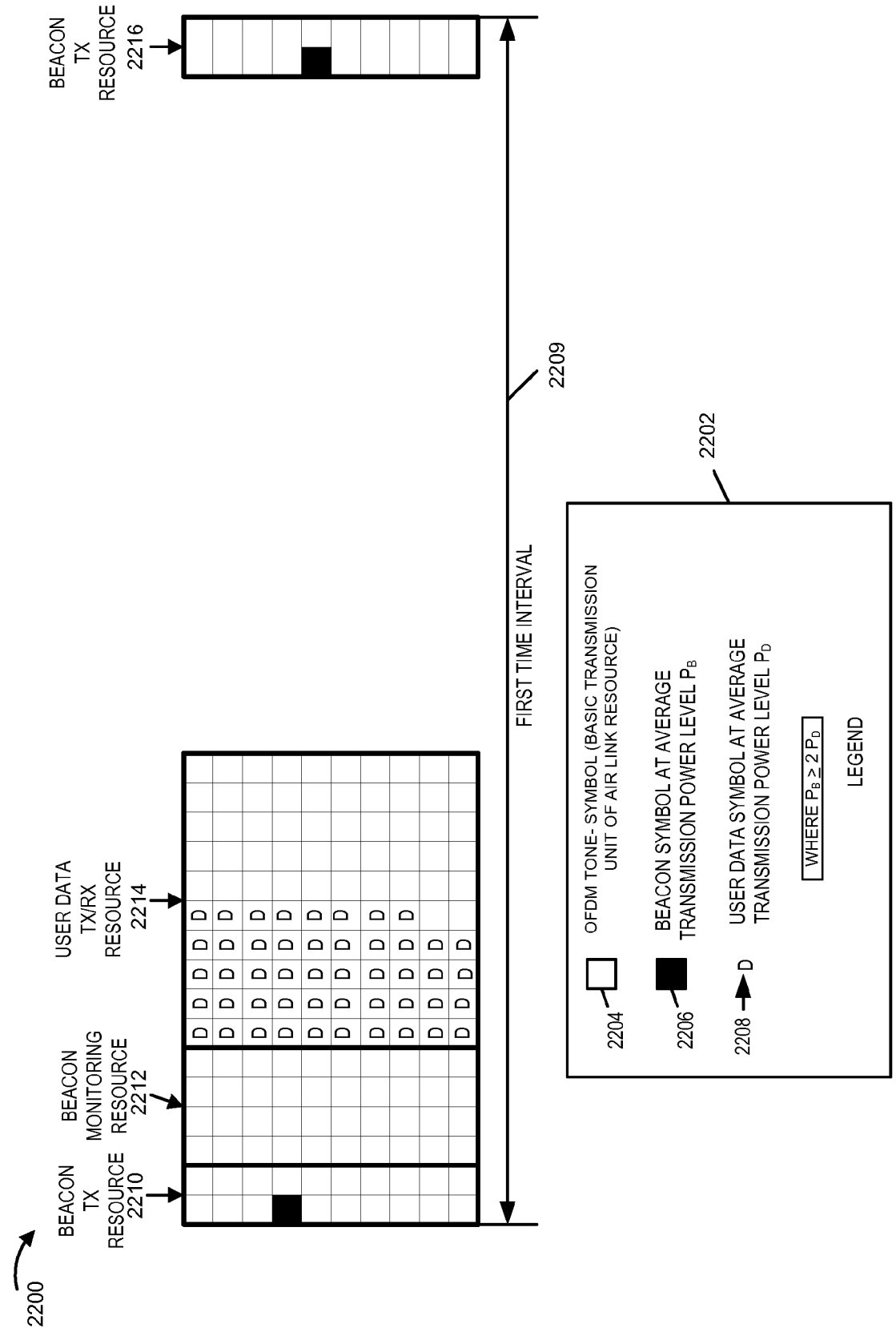
FIG. 22 includes a drawing and corresponding legend illustrating exemplary wireless terminal air link resource utilization during an exemplary first time interval including two beacon bursts.

FIG. 22 is a drawing 2200 and corresponding legend 2202 illustrating exemplary wireless terminal air link resource utilization during an exemplary first time interval 2209 including two beacon bursts. Legend 2202 indicates that a square 2204 indicates an OFDM tone-symbol, the basic transmission unit of the air link resource. Legend 2202 also indicates that: (i) a beacon symbol is indicated by a shaded square 2206 and is transmitted at an average transmission power level $P_B$, (ii) a user data symbol is indicated by a letter "D" 2208 and that data symbols are transmitted such as to have an average transmission power level $P_D$, and (iii) $P_B \geq 2P_D$.

In this example, the beacon transmission resource 2210 includes twenty (20) OFDM tone-symbols; the beacon monitoring resource 2212 includes forty (40) OFDM tone-symbols; the user data transmission/receive resource 2214 includes 100 OFDM tone-symbols; and the beacon transmission resource 2216 includes twenty (20) OFDM tone-symbols.

Beacon transmission resources 2210 and 2216 each carry one beacon symbol 2206. This represents 5% of the transmission resources allocated for beacon burst signaling. Forty-eight (48) of the one hundred (100) OFDM symbols of the user data TX/RX resource 2214 carry a user data symbol being transmitted by the wireless terminal. This represents 48/180 OFDM symbols being used by the wireless terminal during the first time interval 2209. Assume that the WT switches from TX to receive for the sixth ($6^{th}$) OFDM symbol transmission time interval of the user data portion, then user data symbols are transmitted on 48/90 OFDM tone-symbols used by the wireless terminal for transmission during the first time interval. In an embodiment, when the wireless terminal transmits user data, the wireless terminal transmits user data on at least 10% of the transmission resource used by the wireless terminal during a period of time including multiple beacon signal bursts.

In an aspect, at different times the user data transmit/receive resource can be, and sometime is used differently, e.g., exclusively for transmission including user data, exclusively for reception including user data, portioned between receive and transmit, e.g., on a time share basis.

Figure 23:
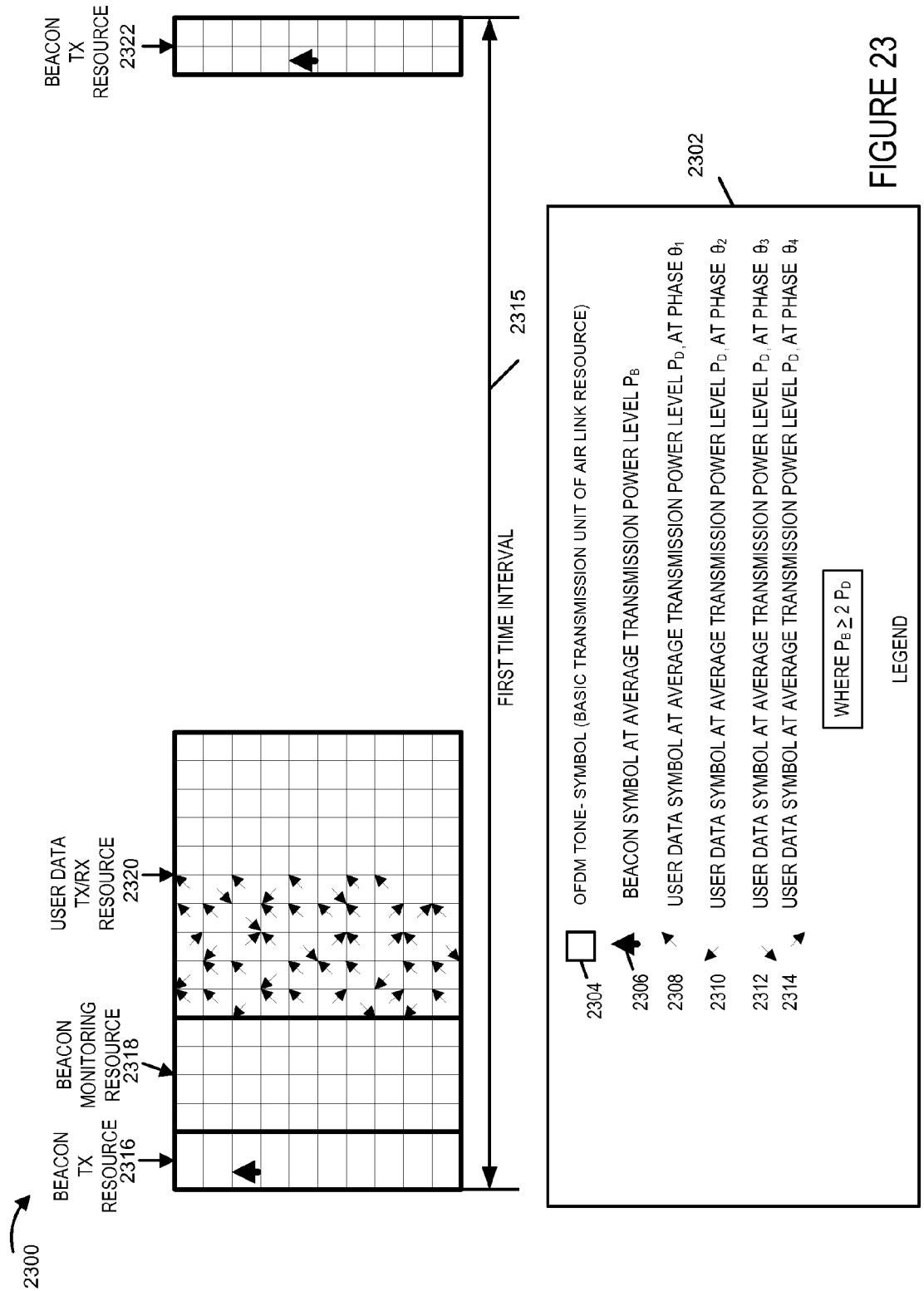
FIG. 23 includes a drawing and corresponding legend illustrating exemplary wireless terminal air link resource utilization during an exemplary first time interval including two beacon bursts.

FIG. 23 is a drawing 2300 and corresponding legend 2302 illustrating exemplary wireless terminal air link resource utilization during an exemplary first time interval 2315 including two beacon bursts. Legend 2302 indicates that a square 2304 indicates an OFDM tone-symbol, the basic transmission unit of the air link resource. Legend 2302 also indicates that: (i) a beacon symbol is indicated by a large vertical arrow 2306 and is transmitted at an average transmission power level $P_B$, (ii) user data symbols are indicated by small arrows 2308, 2310, 2312, 2314, which correspond to different phases ($\Theta_1, \Theta_2, \Theta_3, \Theta_4$), respectively, e.g., corresponding to QPSK, and that data symbols are transmitted such as to have an average transmission power level $P_D$, and (iii) $P_B \geq 2P_D$.

In this example, the beacon transmission resource 2316 includes twenty (20) OFDM tone-symbols; the beacon monitoring resource 2318 includes forty (40) OFDM tone-symbols; the user data transmission/receive resource 2320 includes 100 OFDM tone-symbols; and the beacon transmission resource 2322 includes twenty (20) OFDM tone-symbols.

Beacon transmission resources 2316 and 2322 each carry one beacon symbol 2306. In this embodiment, the beacon symbols have the same amplitude and phase. This amount of beacon symbols represents 5% of the transmission resources allocated for beacon burst signaling. Forty-eight (48) of the 100 OFDM symbols of the user data TX/RX resource 2320 carry a user data symbol. In this embodiment, different data symbols can, and sometimes do, have different phase. In an embodiment, different data symbols can, and sometimes do have different amplitude. This amount of data symbols represents 48/180 OFDM symbols being used by the wireless terminal during the first time interval 2315. Assume that the WT switches from TX to receive for the sixth ($6^{th}$) OFDM symbol transmission time interval of the user data portion, then user data symbols are transmitted on 48/90 OFDM tone-symbols used by the wireless terminal for transmission during the first time interval. In one embodiment, when the wireless terminal transmits user data, the wireless terminal transmits user data on at least 10% of the transmission resource used by the wireless terminal during a period of time including multiple beacon signal bursts.

In an aspect, at different times the user data transmit/receive resource can be, and sometime is used differently, e.g., exclusively for transmission including user data, exclusively for reception including user data, portioned between receive and transmit, e.g., on a time share basis.

Figure 24:
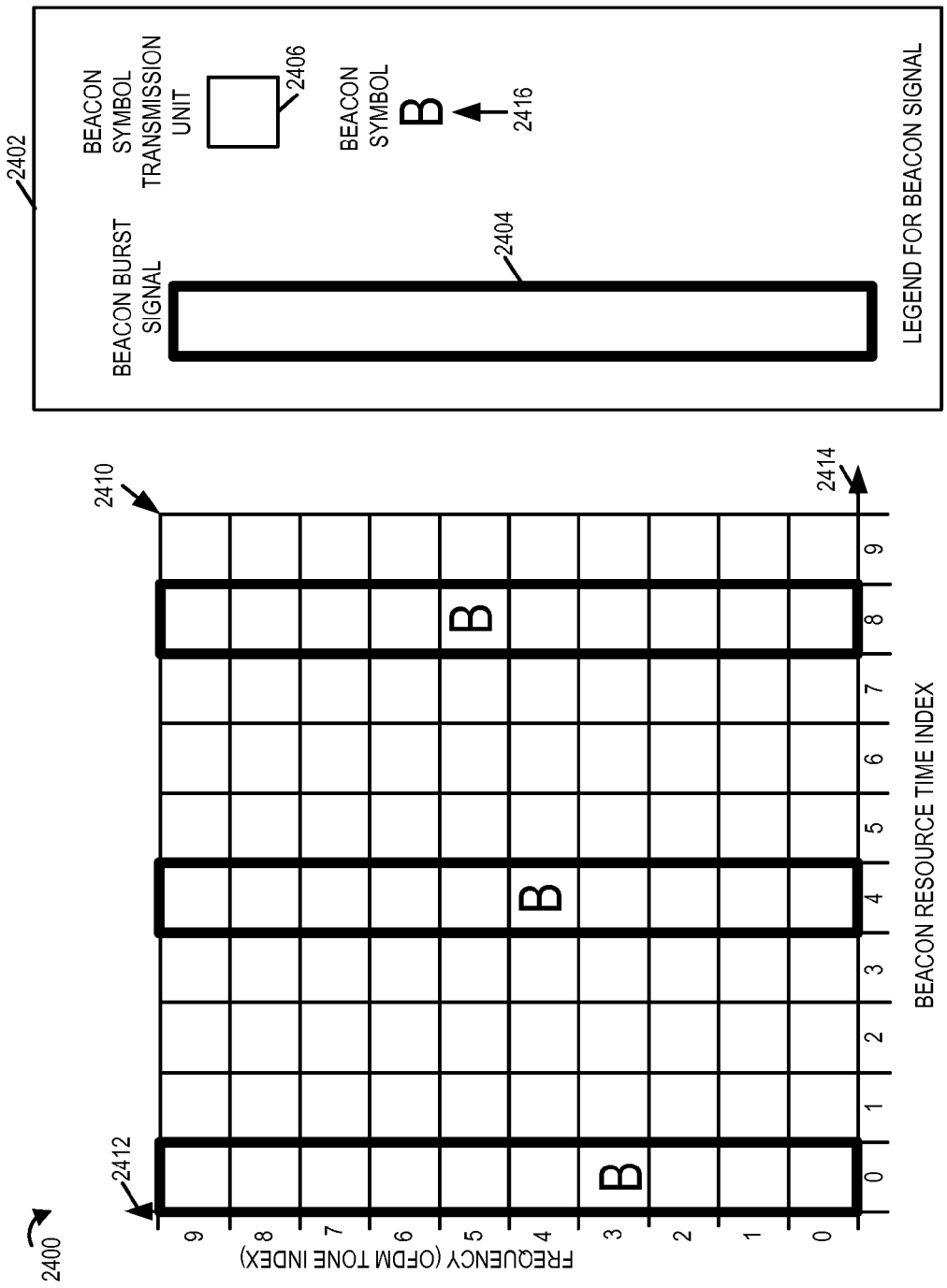
FIG. 24 illustrates an alternative descriptive representation with respect to beacon signals.

FIG. 24 illustrates an alternative descriptive representation with respect to beacon signals. Drawing 2400 and associated legend 2402 are used to describe an exemplary beacon signal. Vertical axis 2412 represents frequency, e.g., OFDM tone index, while horizontal axis 2414 represents beacon resource time index. Legend 2402 identifies that a beacon signal burst is identified by heavy line rectangle 2404, a beacon symbol transmission unit is identified by a square box 2406, and a beacon symbol is represented by a bold letter "B" 2416. The beacon signal resource 2410 includes 100 beacon symbol transmission units 2406. Three beacon burst signals 2404 are shown corresponding to time index values=0, 4, and 8. One beacon symbol 2416 occurs in each beacon burst signal, and the location of the beacon symbol changes from one burst signal to the next within the beacon signal, e.g., in accordance with a predetermined pattern and/or equation. In this embodiment, the beacon symbol location follows a slope. In this example, the beacon bursts are separated from each other by three times the duration of a beacon burst. In various embodiments, the beacon bursts are separated from one another by at least twice the duration of a beacon symbol. In an aspect, a beacon burst may occupy two or more successive beacon resource time intervals, e.g., with the same tone being used for multiple successive beacon time indexes. In an aspect, a beacon burst includes multiple beacon symbols. In some such embodiments, beacon symbols occupy 10% or less of the beacon signal resource.

Figure 25:
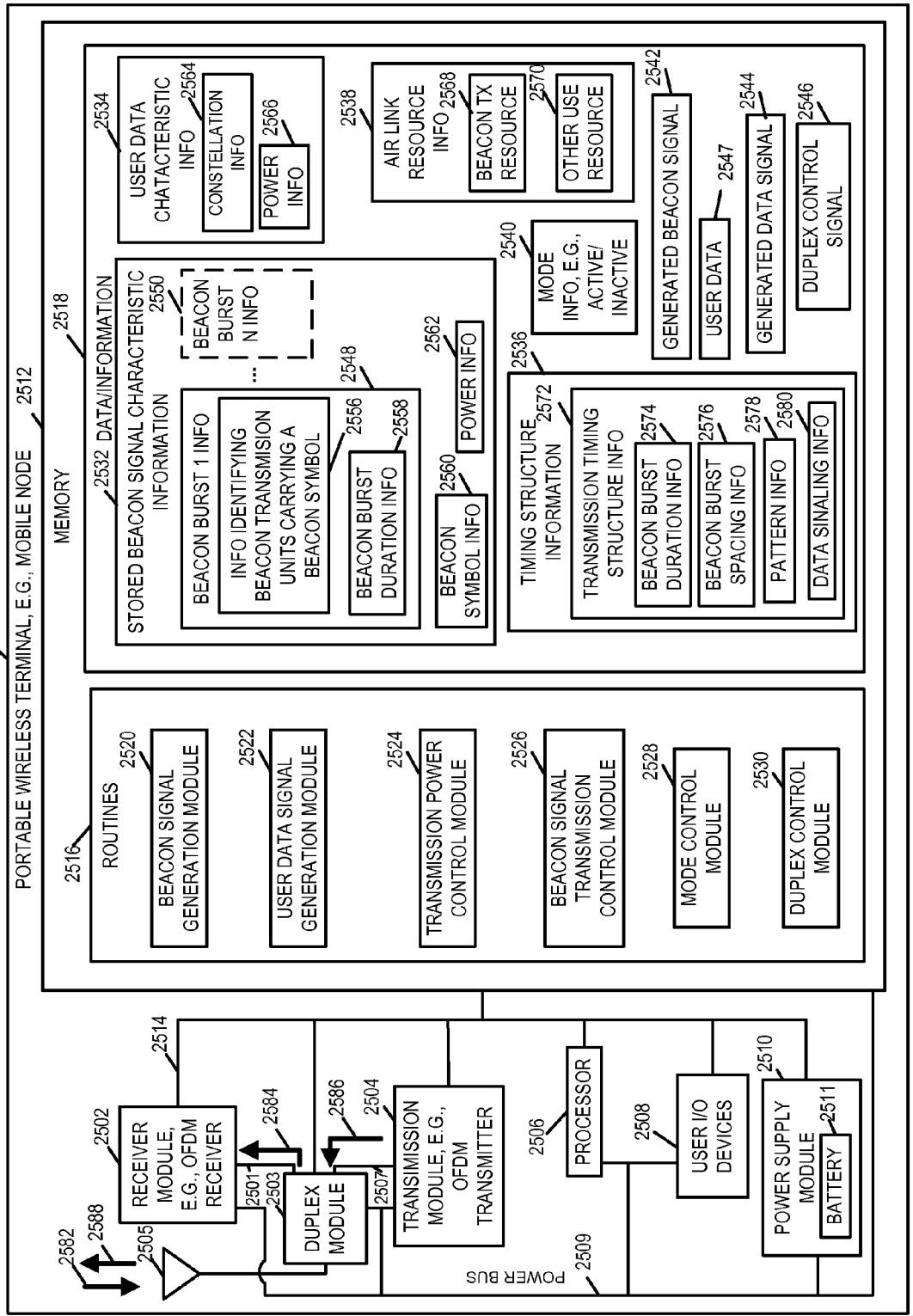
FIG. 25 is a drawing of an exemplary portable wireless terminal, e.g., mobile node.

FIG. 25 is a drawing of an exemplary portable wireless terminal 2500, e.g., mobile node. Exemplary portable wireless terminal 2500 may be any of the wireless terminals of FIG. 1.

Exemplary wireless terminal 2500 includes a receiver module 2502, a transmission module 2504, a duplex module 2503, a processor 2506, user I/O devices 2508, a power supply module 2510 and memory 2512 coupled together via a bus 2514 over which the various elements may interchange data and information.

Receiver module 2502, e.g., an OFDM receiver, receives signals from other wireless terminals and/or fixed location beacon transmitters, e.g., beacon signals and/or user data signals.

Transmission module 2504, e.g., an OFDM transmitter, transmits signals to other wireless terminals, said transmitted signals including beacon signals and user data signals. A beacon signal includes a sequence of beacon signal bursts, each beacon signal burst including one or more beacon symbols, and each beacon symbol occupies a beacon symbol transmission unit. One or more beacon symbols are transmitted by transmission module 2504 for each transmitted beacon signal burst.

In various embodiments, the transmission module 2504 is an OFDM transmitter which transmits beacon signals and the beacon signal is communicated using a resource which is a combination of frequency and time. In various other embodiments, the transmission module 2504 is a CDMA transmitter which transmits beacon signals and the beacon signal is communicated using a resource which is a combination of code and time.

Duplex module 2503 is controlled to switch the antenna 2505 between the receiver module 2502 and transmission module 2504, as part of a time division duplex (TDD) spectrum system implementation. The duplex module 2503 is coupled to antenna 2505 via which the wireless terminal 2500 receives signals 2582 and transmits signals 2588. Duplex module 2503 is coupled to receiver module 2502 via link 2501 over which received signals 2584 are conveyed. Signal 2584 is a filtered representation of signal 2582. Signal 2584 is, the same as signal 2582, e.g., module 2503 functions as a pass thru device without filtering. Duplex module 2503 is coupled to transmission module 2504 via link 2507 over which transmit signals 2586 are conveyed. Signal 2588 is a filtered representation of signal 2586. In an embodiment, signal 2588 is the same signal 2586, e.g., duplex module 2503 functions as a pass thru device without filtering.

User I/O devices 2508 include, e.g., microphone, keyboard, keypad, switches, camera, speaker, display, etc. User devices 2508, allow a user to input data/information, access output data/information, and control at least some operations of the wireless terminal, e.g., initiate a power up sequence, attempt to establish a communications session, terminate a communications session.

The power supply module 2510 includes a battery 2511 utilized as a source of portable wireless terminal power. The output of the power supply module 2510 is coupled to the various components (2502, 2503, 2504, 2506, 2508, and 2512) via power bus 2509 to provide power. Thus, transmission module 2504 transmits beacon signals using battery power.

Memory 2512 includes routines 2516 and data/information 2518. The processor 2506, e.g., a CPU, executes the routines 2516 and uses the data/information 2518 in memory 2512 to control the operation of the wireless terminal 2500 and implement methods. Routines 2516 include beacon signal generation module 2520, user data signal generation module 2522, transmission power control module 2524, beacon signal transmission control module 2526, mode control module 2528 and duplex control module 2530.

Beacon signal generation module 2520 uses the data information 2518 in memory 2512 including stored beacon signal characteristic information 2532 to generate beacon signals, a beacon signal including a sequence of beacon signal bursts, each beacon signal burst including one or more beacon symbols.

User data signal generation module 2522 uses the data/information 2518 including user data characteristic information 2534 and user data 2547 to generate a user data signal, said user data signal including user data symbols. For example, information bits representing the user data 2547 are mapped to a set of data symbols, e.g., OFDM data modulation symbols in accordance with constellation information 2564. Transmission power control module 2524 uses the data/information 2518 including beacon power information 2562 and user data power information 2566 to control the transmission power level of beacon symbols and data symbols. In an aspect, during a first period of time, the transmission power control module 2524 controls the data symbols to be transmitted at an average per symbol power level that is at least 50 percent lower than the average per beacon symbol power level of the beacon symbols transmitted. In an aspect, the transmission power control module 2524 controls the average per symbol transmission power level of each beacon symbol transmitted during a first period of time to be at least 10 dB higher than the average per symbol transmission power level of symbols used to transmit user data during a first period of time. In an aspect, the transmission power control module 2524 controls the average per symbol transmission power level of each beacon symbol transmitted during a first period of time to be at least 16 dB higher than the average per symbol transmission power level of symbols used to transmit user data during a first period of time. In an embodiment, the beacon symbol power level and one or more data symbol power levels are interrelated with respect to a reference being used by the wireless terminal, and the reference may be, and sometimes does change. In some such embodiments, the first period of time is a time interval during which the reference level does not change.

Beacon signal transmission control module 2526 uses the data/information 2518 including the timing structure information 2536 to control the transmission module 2504 to transmit beacon signal bursts at intervals. In an aspect, the time period between two adjacent beacon signal bursts in a sequence of beacon signal bursts is controlled to be at least 5 times the duration of either of the two adjacent beacon signal bursts. In various embodiments, at least some different beacon signal bursts have periods of different lengths.

Mode control module 2528 controls the wireless terminal's mode of operation with the current mode of operation being identified by mode information 2540. In an aspect, the various modes of operation include an OFF mode, a receive-only mode, an inactive mode, and an active mode. In the inactive mode, the wireless terminal can send and receive beacon signals but is not permitted to transmit user data. In the active mode, the wireless can send and receive user data signals in addition to beacon signals. In inactive mode, the wireless terminal is in a silence, e.g., sleep, state of low power consumption, for a longer time than in an active mode of operation.

Duplex control module 2530 controls the duplex module 2503 to switch the antenna connection between receiver module 2502 and transmission module 2504 in response to TDD system timing information and/or user needs. For example, a user data interval in a timing structure is, available for either receive or transmit with the selection being a function of the wireless terminal needs. In various embodiments, the duplex control module 2530 also operates to shut down at least some circuitry in receiver module 2502 and/or transmission module 2504, when not in use to conserve power.

Data/information 2518 includes stored beacon signal characteristic information 2532, user data characteristic information 2534, timing structure information 2536, air link resource information 2538, mode information 2540, generated beacon signal information 2542, generated data signal information 2544, duplex control signal information 2546, and user data 2547. Stored beacon signal characteristic information 2532 includes one or more sets of beacon burst information (beacon burst 1 information 2548, . . . , beacon burst N information 2550), beacon symbol information 2560, and power information 2562.

Beacon burst 1 information 2548 includes information identifying beacon transmission units carrying a beacon symbol 2556 and beacon burst duration information 2558. Information identifying beacon transmission units carrying a beacon symbol 2556 is used by beacon signal generation module 2520 in identifying which beacon transmission units in a beacon signal burst are to be occupied by beacon symbols. In various embodiments, the other beacon transmission units of the beacon burst are set to be nulls, e.g., no transmission power applied with respect to those other beacon transmission units. In an aspect, the number of beacon symbols in a beacon signal burst occupy less than ten (10) percent of the available beacon symbol transmission units. In an aspect, the number of beacon symbols in a beacon signal burst occupy less than or equal to 10 percent of the available beacon symbol transmission units. Beacon signal burst duration information 2558 includes information defining the duration of beacon burst 1. In some embodiments each of the beacon bursts have the same duration, while in other embodiments, different beacon bursts within the same composite beacon signal can, and sometimes do, have different duration. In an aspect, one beacon burst in a sequence of beacon bursts has a different duration, and this may be useful for synchronization purposes.

Beacon symbol information 2560 includes information defining the beacon symbol, e.g., the modulation value and/or characteristic of the beacon symbol. In various embodiments, the same beacon symbol value is used for each of the identified positions to carry a beacon symbol in information 2556, e.g., the beacon symbol has the same amplitude and phase. In various embodiments, different beacon symbol values can be, and sometimes are used for at least some of the identified positions to carry a beacon symbol in information 2556, e.g., the beacon symbol value has the same amplitude but can have one of two potential phases, thus facilitating the communication of additional information via the beacon signal. Power information 2562 includes, e.g., power gain scale factor information used with respect to beacon symbol transmissions.

User data characteristic information 2534 includes constellation information 2564 and power information 2566. Constellation information 2564 identifies, e.g., QPSK, QAM 16, QAM 64, and/or QAM256, etc, and modulation symbol values associated with the constellation. Power information 2566 includes, e.g., power gain scale factor information used with respect to data symbol transmissions.

Timing structure information 2536 includes information identifying intervals associated with various operations, e.g., a beacon transmission time interval, an interval for monitoring for beacon signals from other wireless terminals and/or fixed location beacon transmitters, a user data interval, a silence, e.g., sleep, interval, etc. Timing structure information 2536 includes transmission timing structure information 2572 which includes beacon burst duration information 2574, beacon burst spacing information 2576, pattern information 2578, and data signaling information 2580.

In an aspect, the beacon burst duration information 2574 identifies that the duration of a beacon burst is a constant, e.g., one hundred (100) successive OFDM transmission time intervals. In an aspect, the beacon burst duration information 2574 identifies that the duration of a beacon burst varies, e.g., in accordance with a predetermined pattern specified by pattern information 2578. In various embodiments, the predetermined pattern is a function of a wireless terminal identifier. In other embodiments, the predetermined pattern is the same for all wireless terminals in the system. In an aspect, the predetermined pattern is a pseudo random pattern.

In an embodiment, beacon burst duration information 2574 and beacon burst spacing information 2576 indicate that the duration of a beacon burst is at least fifty (50) times shorter than the interval of time from the end of the beacon burst to the start of the next beacon burst. In an embodiment, the beacon burst spacing information 2576 indicates that the spacing between beacon bursts is constant with beacon bursts occurring in a periodic manner during a period of time in which the wireless terminal is transmitting beacon signals. In an embodiment, the beacon burst spacing information 2576 indicates that the beacon bursts are transmitted with the same interval spacing whether the wireless terminal is in an inactive mode or an active mode. In other embodiments, the beacon burst spacing information 2576 indicates that the beacon bursts are transmitted using different interval spacing as a function of the wireless terminal operational mode, e.g., whether the wireless terminal is in an inactive mode or an active mode.

Air link resource information 2538 includes beacon transmission resource information 2568 and other use resource information 2570. In an embodiment, air link resources are defined in terms of OFDM tone-symbols in a frequency time grid, e.g., as part of a wireless communication system such as a TDD system. Beacon transmission resource information 2568 includes information identifying air link resources allocated to WT 2500 for beacon signals, e.g., a block of OFDM tone-symbols to be used to transmit a beacon burst including at least one beacon symbol. Beacon transmission resource information 2568 also includes information identifying beacon transmission units. In some embodiments a beacon transmission unit is a single OFDM tone-symbol. In an embodiment, a beacon transmission unit is a set of OFDM transmission units, e.g., a set of contiguous OFDM tone-symbols. Other use resource information 2570 includes information identifying air link resources to be used by WT 2500 for other purposes such as, e.g., beacon signal monitoring, receive/transmit user data. Some of the air link resources may be, and sometimes are, intentionally not used, e.g., corresponding to a silence state, e.g., sleep state, which conserves power. In some embodiments a beacon symbol is transmitted using the air link resource of OFDM tone-symbols, and beacon symbols occupy less than 1 percent of the tone-symbols of the transmission resource used by said wireless terminal during a period of time including multiple beacon signal bursts and at least one user data signal. In various embodiments, beacon signals occupy less than 0.3 percent of the tone symbols in a portion of a period of time, said portion of said period of time including one beacon signal burst and one interval between successive beacon signal bursts. In various embodiments, beacon signals occupy less than 0.1 percent of the tone symbols in a portion of a period of time, said portion of said period of time including one beacon signal burst and one interval between successive beacon signal bursts. In various embodiments, during at least some modes of operation, e.g., an active mode of operation, the transmission module 2504 can transmit user data, and when the wireless terminal transmits user data, user data is transmitted on at least 10 percent of the tone-symbols of the transmission resource used by said wireless terminal during a period of time including the user data signal transmission and two adjacent beacon signal bursts.

Generated beacon signal 2542 is an output of beacon signal generation module 2520, while generated data signal 2544 is an output of user data signal generation module 2522. The generated signals (2542, 2544) are directed to transmission module 2504. User data 2547 includes, e.g., audio, voice, image, text and/or file data/information that is used as input by user data signal generation module 2522. Duplex control signal 2546 represents output of duplex control module 2530, and the output signal 2546 is directed to duplex module 2503 to control antenna switching and/or to a receiver module 2502 or transmitter module 2504 to shut down at least some circuitry and conserve power.

Figure 26:
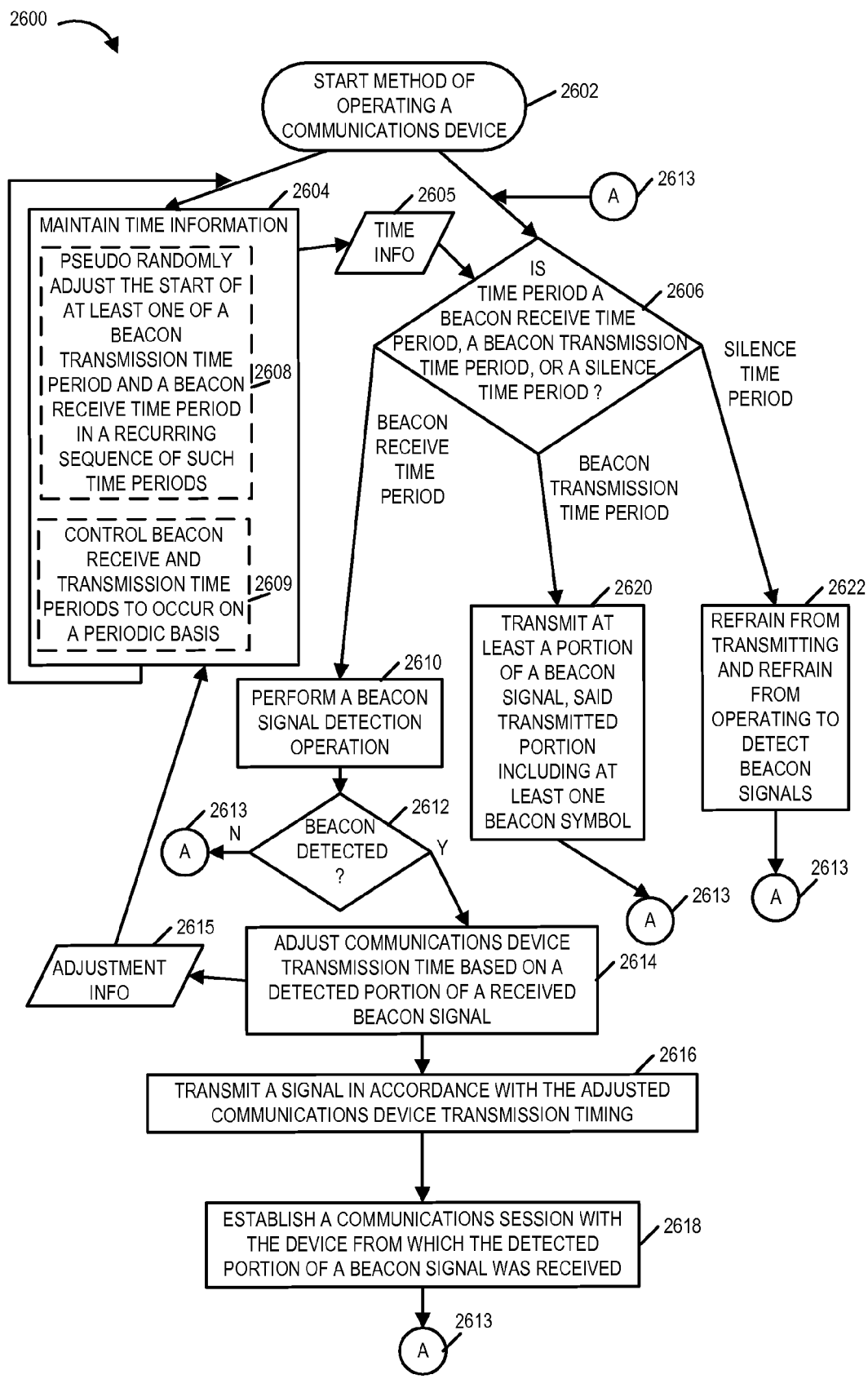
FIG. 26 is a drawing of a flowchart of an exemplary method of operating a communications device, e.g., a battery powered wireless terminal.

FIG. 26 is a drawing of a flowchart 2600 of an exemplary method of operating a communications device, e.g., a battery powered wireless terminal. Operation starts in step 2602, where the communications device is powered on and initialized. Operation proceeds from start step 2602 to step 2604 and step 2606.

In step 2604, which is performed on an ongoing basis, the communications device maintains time information. Time information 2605 is output from step 2604 and used in step 2606. In step 2606, the communications device determines whether a time period is a beacon receive time period, a beacon transmission time period, or a silence time period, and proceeds differently depending on the determination. If the time period is a beacon receive time period, then operation proceeds from step 2606 to step 2610, where the communications device performs a beacon signal detection operation.

If the time period is a beacon transmission time period, then operation proceeds from step 2606 to step 2620, where the communications device transmits at least a portion of a beacon signal, said transmitted portion including at least one beacon symbol.

If the time period is a silence time period, then operation proceeds from step 2606 to step 2622, where the communications device refrains from transmitting and refrains from operating to detect beacon signals. In an embodiment, the communications device goes into a silence, e.g., sleep, mode in step 2622 and conserves battery power.

Returning to step 2610, operation proceeds from step 2610 to step 2612. In step 2612, the communications device determines if a beacon has been detected. If a beacon has been detected, operation proceeds from step 2612 to step 2614. However, if a beacon was not detected, operation proceeds from step 2612 via connecting node A 2613 to step 2606. In step 2614, the communications device adjusts communications device transmission time based on a detected portion of a received signal. Adjustment information 2615, obtained from step 2614 is used in maintaining time information for the communications device in step 2604. In an embodiment, the timing adjustments adjusts the beacon signal transmission time period to occur during a time period known to by used by the device which transmitted the received beacon signal portion to receive beacon signals. Operation proceeds from step 2614 to step 2616, where the communications device transmits a signal in accordance with the adjusted communications device transmission timing, e.g., a beacon signal. Then, in step 2618, the communications device establishes a communications session with the device from which the detected portion of a beacon signal was received. Operation proceeds from any of steps 2618, 2620, or 2622 via connecting node A 2613 to step 2606.

In an embodiment, step 2604 includes at least one of sub-step 2608 and 2609. In sub-step 2608, the communications device pseudo randomly adjusts the start of at least one of a beacon transmission time period and a beacon receive time period in a recurring sequence of such time periods. For example, a communication device at a particular time, e.g., following power on or entering a new region, may not be synchronized with respect to any other communication device, and may perform sub-step 2608 one or more times, in order to increase the probability of detecting a beacon signal from another communications device while having a limited beacon detection time interval in a recurring time structure. Thus sub-step 2608 can effectively shift relative timing between two peers. In sub-step 2609, the communications device sets beacon receive and transmission time periods to occur on a periodic basis.

In various embodiments, the beacon receive time period is longer than the beacon transmission time period. In an embodiment, the beacon receive and transmission time periods are non-overlapping, and the beacon receive time period is at least two times the beacon transmission time period. In an embodiment, the silence time period occurs between beacon receive and beacon transmission time periods. In various embodiments, the silence period is at least twice one of the beacon transmission time periods and beacon receive time periods.

Figure 27:
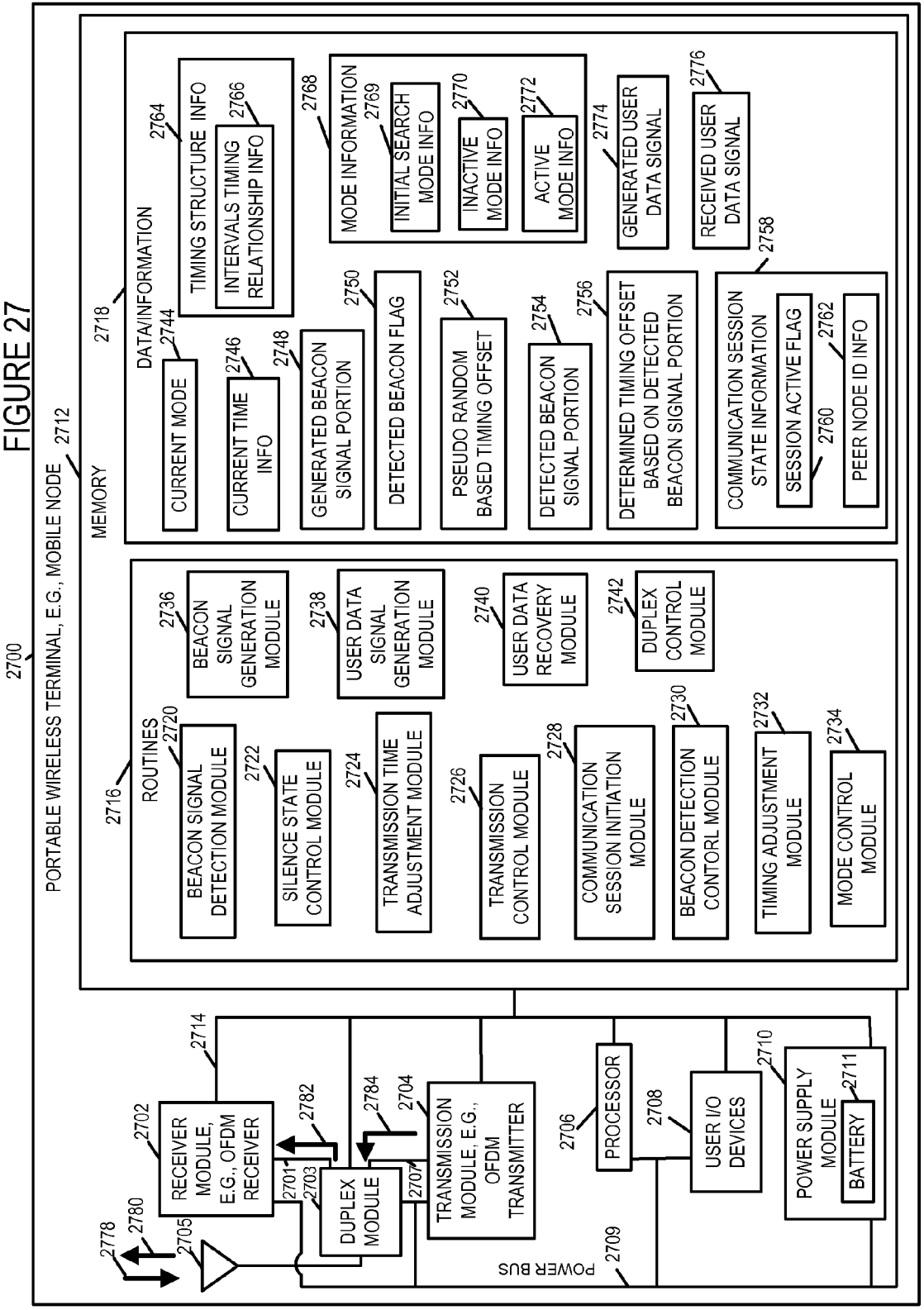
FIG. 27 is a drawing of an exemplary portable wireless terminal, e.g., mobile node.

FIG. 27 is a drawing of an exemplary communications device which is portable wireless terminal 2700, e.g., mobile node. Exemplary portable wireless terminal 2700 may be any of the wireless terminals of FIG. 1. Exemplary wireless terminal 2700 is, e.g., a communication device which is part of a time division duplex (TDD) orthogonal frequency division multiplexing (OFDM) wireless communications system supporting peer-peer direct communications between mobile nodes. Exemplary wireless terminal 2700 can both transmit and receive beacon signals. Exemplary wireless terminal 2700 performs timing adjustments based on detected beacon signals, e.g., from a peer wireless terminal transmitting beacon signals and/or from a fixed beacon transmitter, to establish timing synchronization.

Exemplary wireless terminal 2700 includes a receiver module 2702, a transmission module 2704, a duplex module 2703, a processor 2706, user I/O devices 2708, a power supply module 2710 and memory 2712 coupled together via a bus 2714 over which the various elements may interchange data and information.

Receiver module 2702, e.g., an OFDM receiver, receives signals from other wireless terminals and/or fixed location beacon transmitters, e.g., beacon signals and/or user data signals.

Transmission module 2704, e.g., an OFDM transmitter, transmits signals to other wireless terminals, said transmitted signals including beacon signals and user data signals. A beacon signal includes a sequence of beacon signal bursts, each beacon signal burst including one or more beacon symbols, and each beacon symbol occupies a beacon symbol transmission unit. One or more beacon symbols are transmitted by transmission module 2704 for each transmitted beacon signal burst. Transmission module 2704 transmits during a beacon transmission time period at least a portion of a beacon signal, e.g., a beacon burst signal, said transmitted portion including at least one beacon symbol, e.g., a relatively high power tone with respect to the power level of user data symbols.

In various embodiments, the transmission module 2704 is an OFDM transmitter which transmits beacon signals and the beacon signal is communicated using a resource which is a combination of frequency and time. In various other embodiments, the transmission module 2704 is a CDMA transmitter which transmits beacon signals and the beacon signal is communicated using a resource which is a combination of code and time.

Duplex module 2703 is controlled to switch the antenna 2705 between the receiver module 2702 and transmission module 2704, as part of a time division duplex (TDD) implementation. The duplex module 2703 is coupled to antenna 2705 via which the wireless terminal 2700 receives signals 2778 and transmits signals 2780. Duplex module 2703 is coupled to receiver module 2702 via link 2701 over which received signals 2782 are conveyed. Signal 2782 is a filtered representation of signal 2778. In an embodiment, signal 2782 is the same as signal 2778, e.g., where duplex module 2703 functions as a pass through device without filtering. Duplex module 2703 is coupled to transmission module 2704 via link 2707 over which transmit signals 2784 are conveyed. Signal 2780 is, in an embodiment, a filtered representation of signal 2784. In an embodiment, signal 2780 is the same as signal 2784, e.g., where duplex module 2703 functions as a pass through device without filtering.

User I/O devices 2708 include, e.g., microphone, keyboard, keypad, switches, camera, speaker, display, etc. User devices 2708, allow a user to input data/information, access output data/information, and control at least some operations of the wireless terminal, e.g., initiate a power up sequence, attempt to establish a communications session, terminate a communications session.

The power supply module 2710 includes a battery 2711 utilized as a source of portable wireless terminal power. The output of the power supply module 2710 is coupled to the various components (2702, 2703, 2704, 2706, 2708, and 2712) via power bus 2709 to provide power. Thus, transmission module 2704 transmits beacon signals using battery power.

Memory 2712 includes routines 2716 and data/information 2718. The processor 2706, e.g., a CPU, executes the routines 2716 and uses the data/information 2718 in memory 2712 to control the operation of the wireless terminal 2700 and implement methods. Routines 2716 include beacon signal detection module 2720, a silence state control module 2722, a transmission time adjustment module 2724, a transmission control module 2726, a communication session initiation module 2728, a beacon detection control module 2730, a timing adjustment module 2732, a mode control module 2734, a beacon signal generation module 2736, a user data signal generation module 2738, a user data recovery module 2740, and a duplex control module 2742.

Beacon signal detection module 2720 performs a beacon signal detection operation during a beacon receive time period to detect the receipt of at least a portion of a beacon signal. In addition, the beacon signal detection module 2720 sets the detected beacon flag 2750 indicating the receipt of a beacon signal portion in response to a detected beacon signal portion. Detected beacon signal portion 2754 is an output of beacon signal detection module 2720. In addition, the beacon signal detection module 2720 sets the detected beacon flag 2750 indicating the receipt of a beacon signal portion in response to a detected beacon signal portion. In an embodiment, the beacon signal detection module 2720 performs detections as a function of energy level comparisons. In an embodiment, the beacon signal detection module 2720 performs detections as a function of detected beacon symbol pattern information, e.g., in a monitored air link resource corresponding to a beacon burst. The beacon signal detection module 2720, recovers information from the detected beacon signal portion, e.g., information identifying the source, e.g., wireless terminal, which transmitted the beacon signal. For example, different wireless terminals may, and sometimes do have different beacon burst patterns and/or signatures.

Silence state control module 2722 controls wireless terminal operation during a silence period, occurring, e.g., between beacon receive and beacon transmission time periods, to neither transmit nor operate to detect beacon signals.

Transmission time adjustment module 2724 adjusts the communications device's transmission time based on a detected portion of a received beacon signal. For example, consider that the communications system is, e.g., an ad hoc network, and the received beacon signal portion is from another wireless terminal. As another example, consider the system includes fixed location beacon transmitters serving as references, and that the detected beacon signal portion is sourced from such a transmitter; the transmission time adjustment module 2724 adjusts the wireless terminal's transmission time to synchronize with respect to the reference. Alternatively, consider the system does not include fixed location beacon transmitters, or that the wireless terminal can not currently detect such a beacon signal, and that the detected beacon signal portion is from another wireless terminal, then the transmission time adjustment module 2724 adjusts the wireless terminal's transmission time to synchronize with respect to the peer wireless terminal which had transmitted the beacon signal. In an embodiment, including both fixed location beacons and wireless terminal beacons, the fixed locations beacons are used, when available, to achieve a coarse level of system synchronization, and the wireless terminal beacons are used to achieve a higher degree of synchronization between peers. Detected timing offset based on detected beacon signal portion 2756 is an output of transmission time adjustment module 2724.

In various embodiments, the transmission time adjustment module 2724 adjusts the beacon signal transmission time period to occur during a time period known to be used by the device, e.g., other wireless terminal, which transmitted the received portion to receive beacon signals. Thus the transmission time adjustment module 2724 sets WT 2700's beacon to be transmitted such that it is expected to hit the time window in which the peer is attempting to detect beacons.

Transmission control module 2726 controls the transmission module 2704 to transmit a signal, e.g., a beacon signal, in accordance with the adjusted communications device transmission timing. When stored communication session state information 2758 indicates that an established session is ongoing, via session active flag 2760 being set, the transmission control module 2726 controls the transmission module 2704 to repeat beacon signal portion transmission operations. In an embodiment, the transmission control module 2726 controls the wireless terminal to repeat beacon signal portion transmission operation in both the inactive and active modes of wireless terminal operation.

Communication session initiation module 2728 is used to control operations to establish a communications session with another wireless terminal, from which a beacon signal was received. For example, following a beacon signal detection, wherein the beacon signal is sourced from another wireless terminal, if wireless terminal 2700 desires to establish a communications session with said another wireless terminal, module 2728 is activated to start to initiate the communication session, e.g., generating and processing handshaking signals in accordance with a predetermined protocol.

Beacon detection control module 2730 controls the beacon signal detection module 2720 operation. For example, when stored communication session state information 2758 indicates that an established session is ongoing, via session active flag 2760 being set, the beacon detection control module 2730 controls the beacon signal detection module 2720 to repeat detection operations. In an embodiment, the beacon detection control module 2730 controls the wireless terminal to repeat beacon detection operations in both the inactive and active modes of wireless terminal operation.

Timing adjustment module 2732 pseudo randomly adjusts the start of at least one of a beacon transmission time period and a beacon receive time period in a recurring sequence of such time periods. Pseudo random based timing offset 2752 is an output of timing adjustment module 2732. Timing adjustment module 2732 is, used to shift the wireless terminal's timing structure with respect to other wireless terminals, operating independently, such as to increase the likelihood of the wireless terminal and a peer being able to detect one another's presence while limiting beacon transmit and/or beacon detection time intervals.

Mode control module 2734 controls the communications device to operate during different times, in a first and second mode of operation, in which the communications device transmits beacon signals. For example, the first mode of operation is an inactive mode in which the communications device transmits beacon signals, detects for beacon signals, but is restricted from transmitting user data; the second mode of operation is an active mode in which the communications device transmits beacon signals, detects for beacon signals, and is permitted to transmit user data. Another mode of operation, into which mode control module 2734 can control the communications device to operate is a search mode in which the wireless terminal searches for beacon signals but is not permitted to transmit.

Beacon signal generation module 2736 generates beacon signal portions 2748, e.g., beacon bursts including a least one beacon symbol, which are transmitted by transmission module 2704. User data signal generation module 2738, generates user data signals 2774, e.g., signals conveying coded blocks of user data such as voice data, other audio data, image data, text data, file data, etc. User data signal generation module 2738 is active when the wireless terminal is in active mode and the generated user data signals 2774 are transmitted via transmission module 2704 during time intervals reserved for user data transmit/receive signals. User data recovery module 2740 recovers user data from received user data signals 2776 received from a peer in a communication session with wireless terminal 2700. The received user data signals 2776 are received via receiver module 2702, while the wireless terminal is in an active mode of operation during time intervals reserved for user data transmit/receive signals.

Duplex control module 2742 controls operation of duplex module 2703, e.g., controlling antenna 2705 to be coupled to receiver module 2702 for receive time intervals, e.g., beacon monitoring time intervals and intervals for receiving user data, and to be coupled to transmission module 2704 for transmission time intervals, e.g., beacon transmission time intervals and intervals for transmitting user data. Duplex control module 2742 also controls at least some circuits in at least one of receiver module 2702 and transmission module 2704 to be powered down during certain time intervals, thereby conserving battery power.

Data/information 2718 includes current mode information 2744, current time information 2746, generated beacon signal portion 2748, detected beacon flag 2750, pseudo random based timing offset 2752, detected beacon signal portion 2754, determined timing offset based on detected beacon signal portion 2756, communication session state information 2758, timing structure information 2764, mode information 2768, generated user data signal 2774, and received user data signal 2776.

Current mode information 2744 includes information identifying the wireless terminal's current mode of operation, sub-modes and/or state of operation, e.g., whether the wireless terminal is in a mode where it receives but does not transmit, whether the wireless terminal is an inactive mode including beacon signal transmission but not allowing user data transmissions, or whether the wireless terminal is in an active mode including beacon signal transmissions and permitting user data transmissions.

Current time information 2746 includes information identifying the wireless terminal time with respect to its position within a recurring timing structure being maintained by the wireless terminal, e.g., an indexed OFDM symbol transmission time period within the structure. Current time information 2746 also includes information identifying the wireless terminal's time with respect to another timing structure, e.g., of another wireless terminal or of a fixed location beacon transmitter.

Communication session state information 2758 includes a session active flag 2760 and peer node identification information 2762. Session active flag 2760 indicates whether or not the session is still active. For example, a peer node in a communication session with WT 2700 powers down, the wireless terminal 2700 ceases to detect the peer's beacon signal, and session active flag is cleared. Peer node identification information 2762 includes information identifying the peer. In various embodiments, the peer node ID information is conveyed, at least in part, via beacon signals.

Timing structure information 2764 includes information defining duration, ordering and spacing of various intervals such as, e.g., beacon transmission intervals, beacon detection intervals, user data signaling intervals and silence intervals. Timing structure information 2764 includes intervals' timing relationship information 2766. Intervals' timing relationship information 2766 includes, e.g., information defining: (i) that a beacon receive time period is longer than a beacon transmission time period; (ii) that beacon receive and beacon transmission time periods are non-overlapping; (iii) that the beacon receive time period is at least two times the beacon transmit time period in duration; (iv) the silence period is at least twice one of the beacon transmission time period and the beacon receive time period.

Mode information 2768 includes initial search mode information 2769, inactive mode information 2770 and active mode information 2772. Initial search mode information 2769 includes information defining an initial extended duration search mode for beacon signals. In an embodiment, the duration of the initial search exceeds the expected interval between successive beacon burst transmissions by other wireless terminals which are transmitting sequences of beacon burst signals. In an embodiment, the initial search mode information 2769 is used for performing an initial search upon power up. In addition, in some embodiments the wireless terminal enters the initial search mode from the inactive mode occasionally, e.g., if no other beacon signals have been detected while in the inactive mode and/or if the wireless terminal wants to perform a faster and/or more thorough beacon search than is achieved using the inactive mode. Inactive mode information 2770 defines an inactive mode of wireless terminal operation including a beacon signal interval, a beacon monitoring interval and a silence interval. Inactive mode is a power saving mode where the wireless terminal conserves energy in the silence mode, yet is able to indicate its presence by the beacon signal and is able to maintain situational awareness of the presence of other wireless terminals by a limited duration beacon monitoring interval. Active mode information 2772 defines an active mode of wireless terminal operation including a beacon signal transmission interval, a beacon monitoring interval, a user data TX/RX interval, and a silence interval.

Figure 28:
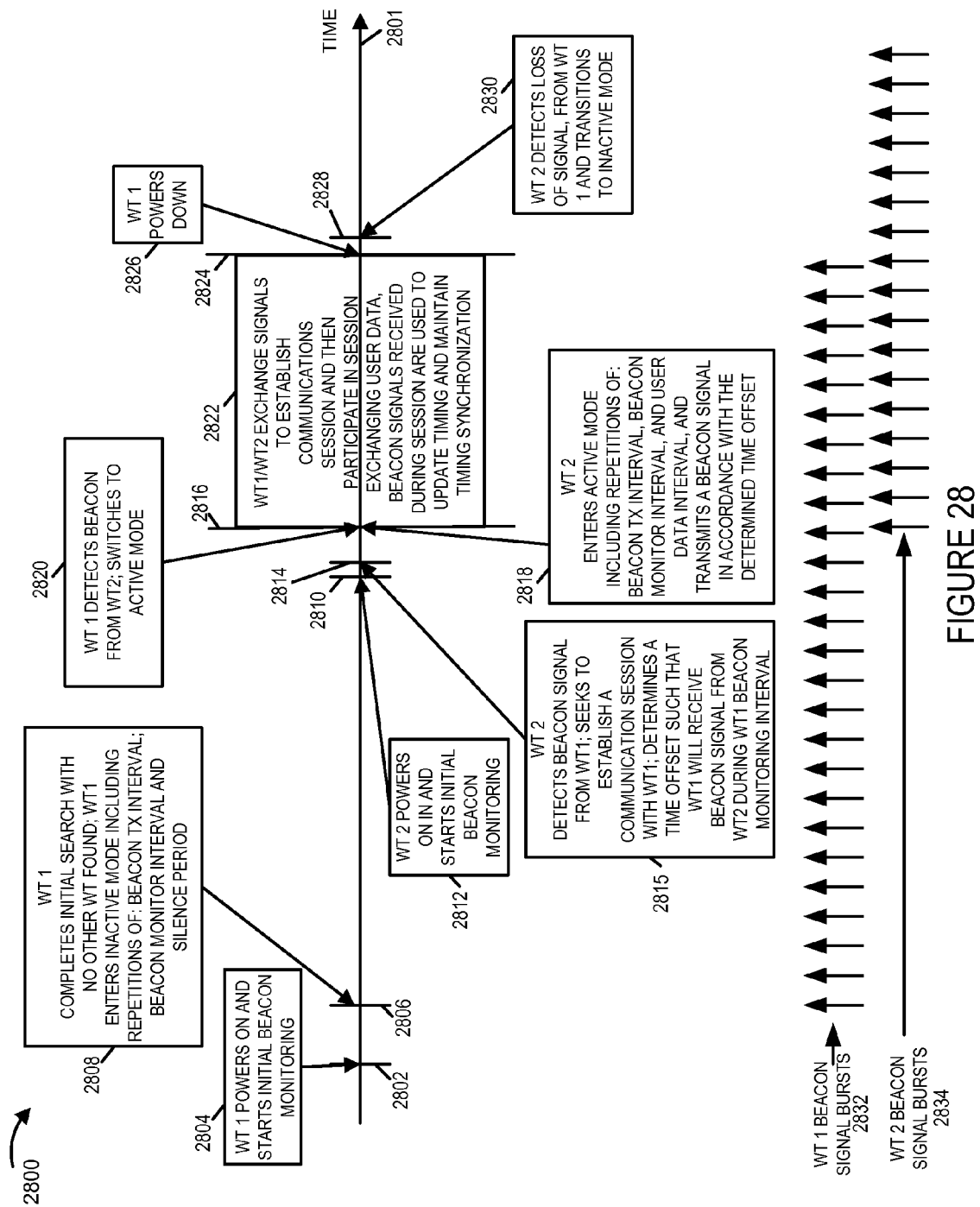
FIG. 28 is a drawing illustrating an exemplary time line, sequence of events, and operations with respect to two wireless terminals in an ad hoc network which become aware of the presence of each other and achieve timing synchronization via the use of wireless terminal beacon signals.

FIG. 28 is a drawing 2800 illustrating an exemplary time line, sequence of events, and operations with respect to two wireless terminals in an ad hoc network which become aware of the presence of each other and achieve timing synchronization via the use of wireless terminal beacon signals. Horizontal axis 2801 represents a time line. At time 2802, wireless terminal 1 powers on and starts an initial monitoring for beacon signals, as indicated by block 2804. The monitoring continues until time 2806, at which point wireless terminal completes its initial search, with the result that no other wireless terminals were found; then, wireless terminal 1 enters an inactive mode of operation including repetitions of beacon transmission intervals in which wireless terminal 1 transmits a beacon signal burst, beacon monitoring intervals in which the wireless terminal monitors for beacon signals, and silence intervals in which the wireless terminal neither transmits nor receives, thus conserving power, as illustrated by block 2808.

Then, at time 2810, wireless terminal 2 powers on and starts initial beacon monitoring as indicated by block 2812. Then, at time 2814, wireless terminal 2 detects a beacon signal from wireless terminal 1, decides that it seeks to establish a communication session with wireless terminal 1, and determines a time offset such that wireless terminal will receive a beacon signal burst from wireless terminal 2 during a wireless terminal 1 beacon monitoring interval, as indicated by block 2815.

At time 2816, wireless terminal 2 has entered active mode which includes repetitions of: beacon transmission intervals, beacon monitoring intervals, and user data intervals, and at time 2816 wireless terminal 2 transmits a beacon signal in accordance with the determined time offset of step 2815, as indicated by block 2818. Then wireless terminal 1 detects the beacon signal from wireless terminal 2 and switches to active mode as indicated by block 2820.

Between time interval 2816 and 2824 wireless terminal 1 and wireless terminal 2 exchange signals to establish a communications session and then participate in the session exchanging user data, as indicated by block 2822. In addition, during this time interval beacon signals received during the session are used to update timing and maintain synchronization. Wireless terminal 1 and wireless terminal 2 may be, and sometimes are, mobile nodes which can be moving during the communications sessions.

At time 2824, wireless terminal 1 powers down, as indicated by block 2826. Then, at time 2828, wireless terminal 2 determines that signal has been lost from wireless terminal 1 and the wireless terminal transitions to an inactive mode, as indicated by block 2830. Signal can also be, and sometime is, lost due to other conditions, e.g., wireless terminals 1 and 2 moved far enough away from each other such that the channel conditions were insufficient to maintain the session.

Sequence of arrows 2832 illustrates wireless terminal 1 beacon signal bursts, while sequence of arrows 2834 illustrates wireless terminal 2 beacon signal bursts. It should be observed that the timing between the two wireless terminals has been synchronized, as a function of a received beacon signal from wireless terminal 1, such that wireless terminal 1 is able to detect a beacon signal burst from wireless terminal 2, during its beacon signal monitoring interval.

In this example, a wireless terminal, which has powered up, performs monitoring during an initial beacon monitoring period until a beacon is detected or until the initial beacon monitoring period expires, whichever comes first. The initial beacon monitoring period is, e.g., an extended duration monitoring period having a duration which exceeds one iteration including a beacon transmission interval. In this example, the initial beacon monitoring period is performed prior to entering a mode in which beacon signals are transmitted, a wireless terminal in an inactive mode, said inactive mode including beacon transmission intervals, beacon monitoring intervals and silence intervals, occasionally enters a long duration beacon monitoring interval, e.g., to cover a corner case condition in which two wireless terminals should happen to start up simultaneously.

In some other embodiments, a wireless terminal enters an inactive mode, said inactive mode including beacon transmission intervals and limited duration beacon monitoring intervals following power on without first having an extended beacon monitoring interval. In some such embodiments, a wireless terminal may, and sometimes does, perform pseudo-random time shifts while searching for other beacon signals to facilitate alignment between its own beacon monitoring intervals and other wireless terminal beacon transmission intervals.

Figure 29:
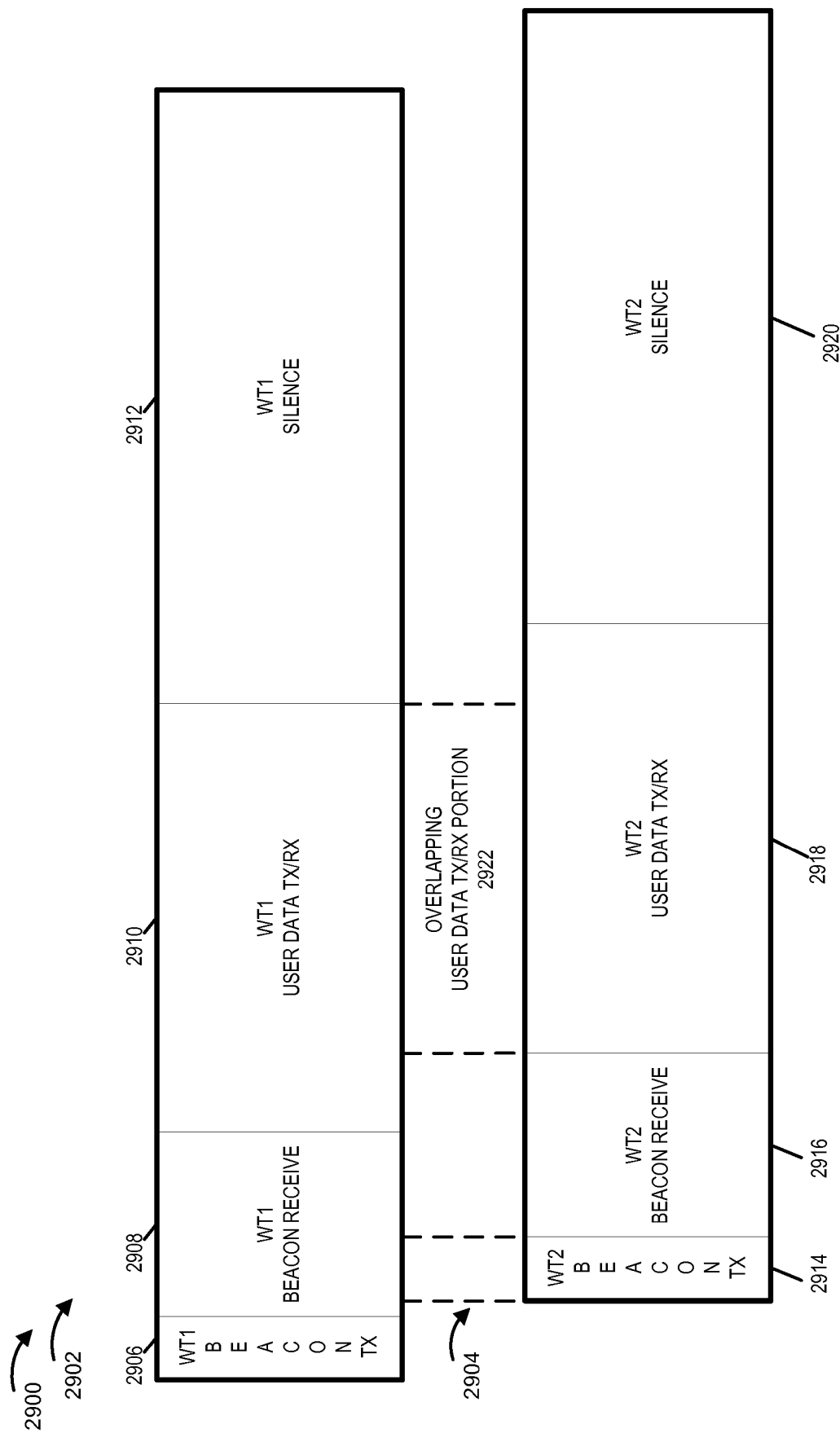
FIG. 29 illustrates exemplary synchronized timing between two wireless terminals based on beacon signals in accordance with an exemplary embodiment.

Drawing 2900 of FIG. 29 illustrates exemplary synchronized timing between two wireless terminals based on beacon signals in accordance with an exemplary embodiment. Drawing 2902 illustrates timing structure information with respect to wireless terminal 1, while drawing 2904 includes timing structure information with respect to wireless terminal 2. Drawing 2900 may correspond to FIG. 28 after the wireless terminals have been timing synchronized, e.g., based on wireless terminal 2 detecting a beacon signal from wireless terminal 1. Drawing 2902 includes a wireless terminal 1 beacon transmission interval 2906, a wireless terminal 1 beacon receive time interval 2908, a wireless terminal 1 user data TX/RX interval 2910 and a WT 1 silence interval 2912. Drawing 2904 includes a wireless terminal 2 beacon transmission interval 2914, a wireless terminal 2 beacon receive time interval 2916, a wireless terminal 2 user data TX/RX interval 2918 and a WT 2 silence interval 2920. It should be observed that wireless terminal 2 has adjusted its timing such that when it transmits a beacon signal burst during WT 2 beacon transmit interval 2914, WT 1 will receive the beacon signal burst during its beacon receive interval 2908. It should also be observed that there is an overlapping portion of the user data TX/RX regions 2922 which can be used for user data signaling. This approach maintains the same basic timing structure for different wireless terminals, and uses a determined timing shift of one of the wireless terminal's timing to achieve synchronization.

Figure 30:
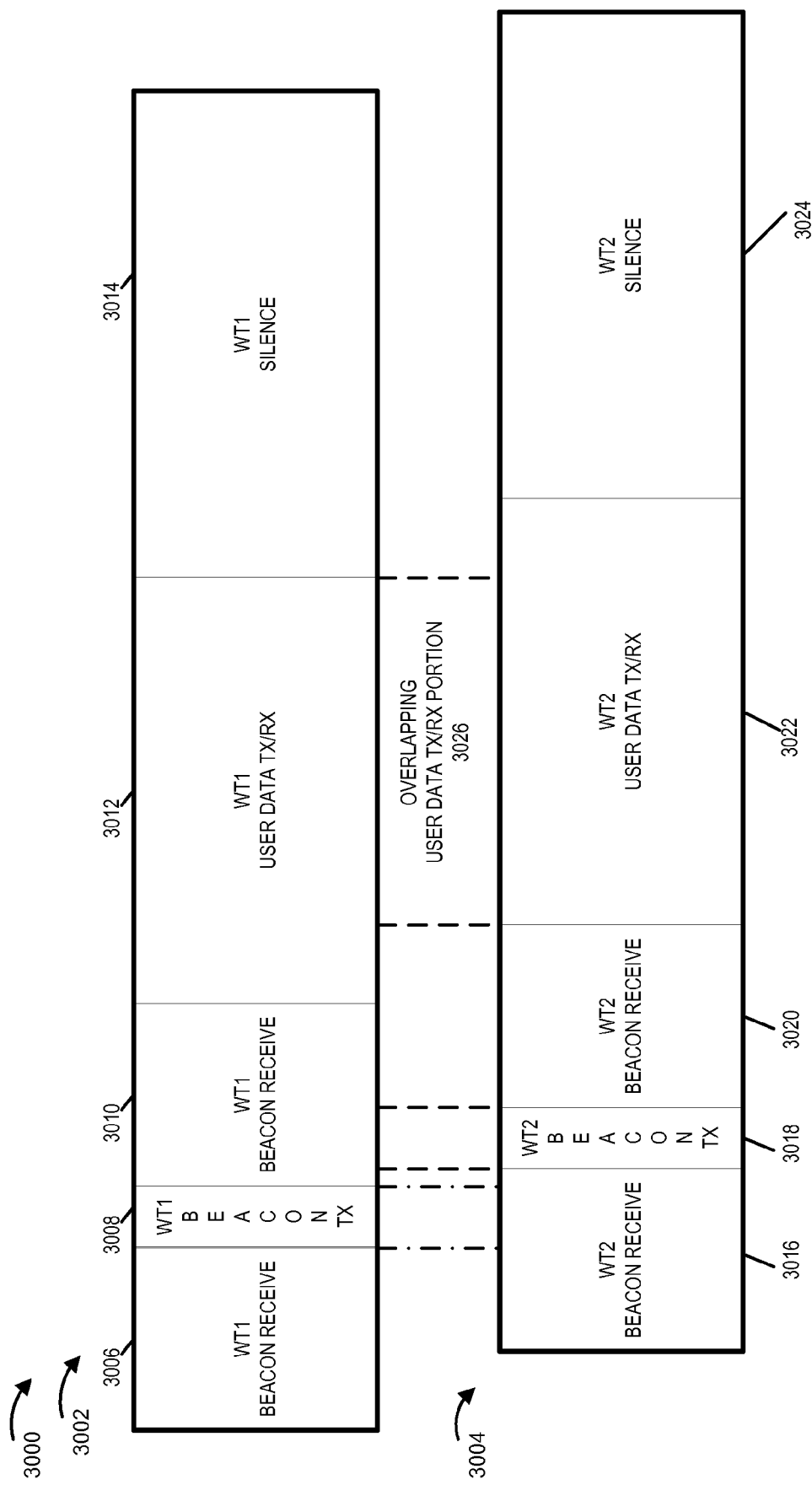
FIG. 30 illustrates exemplary synchronized timing between two wireless terminals based on beacon signals in accordance with another exemplary embodiment.

Drawing 3000 of FIG. 30 illustrates exemplary synchronized timing between two wireless terminals based on beacon signals in accordance with another exemplary embodiment. Drawing 3002 includes timing structure information with respect to wireless terminal 1, while drawing 3004 includes timing structure information with respect to wireless terminal 2. Drawing 3000 may correspond to FIG. 28 after the wireless terminals have been timing synchronized, e.g., based on wireless terminal 2 detecting a beacon signal from wireless terminal 1. Drawing 3002 includes a wireless terminal 1 beacon receive interval 3006, a wireless terminal 1 beacon transmission interval 3008, a wireless terminal 1 beacon receive time interval 3010, a wireless terminal 1 user data TX/RX interval 3012 and a WT 1 silence interval 3014. Drawing 3004 includes, a wireless terminal 2 beacon receive interval 3016, a wireless terminal 2 beacon transmission interval 3018, a wireless terminal 2 beacon receive time interval 3020, a wireless terminal 2 user data TX/RX interval 3022 and a WT 2 silence interval 3024. It should be observed that wireless terminal 2 has adjusted its timing such that when it transmits a beacon signal burst during WT 2 beacon transmit interval 3018, WT 1 will receive the beacon signal burst during its beacon receive interval 3010. It can also be observed that, in this embodiment, following wireless terminal 2's timing adjustment, wireless terminal 2 receives a beacon burst transmitted by wireless terminal 1 during wireless terminal 1 beacon transmission interval 3008 during its beacon receive interval 3016. It should also be observed that there is an overlapping portion of the user data TX/RX regions 3026 which can be used for user data signaling. This approach maintains the same basic timing structure for different wireless terminals, and uses a determined timing shift of one of the wireless terminal's timing to achieve synchronization, and both wireless terminals are able to receive beacon signal bursts from each other, on an ongoing basis following synchronization.

Figure 31:
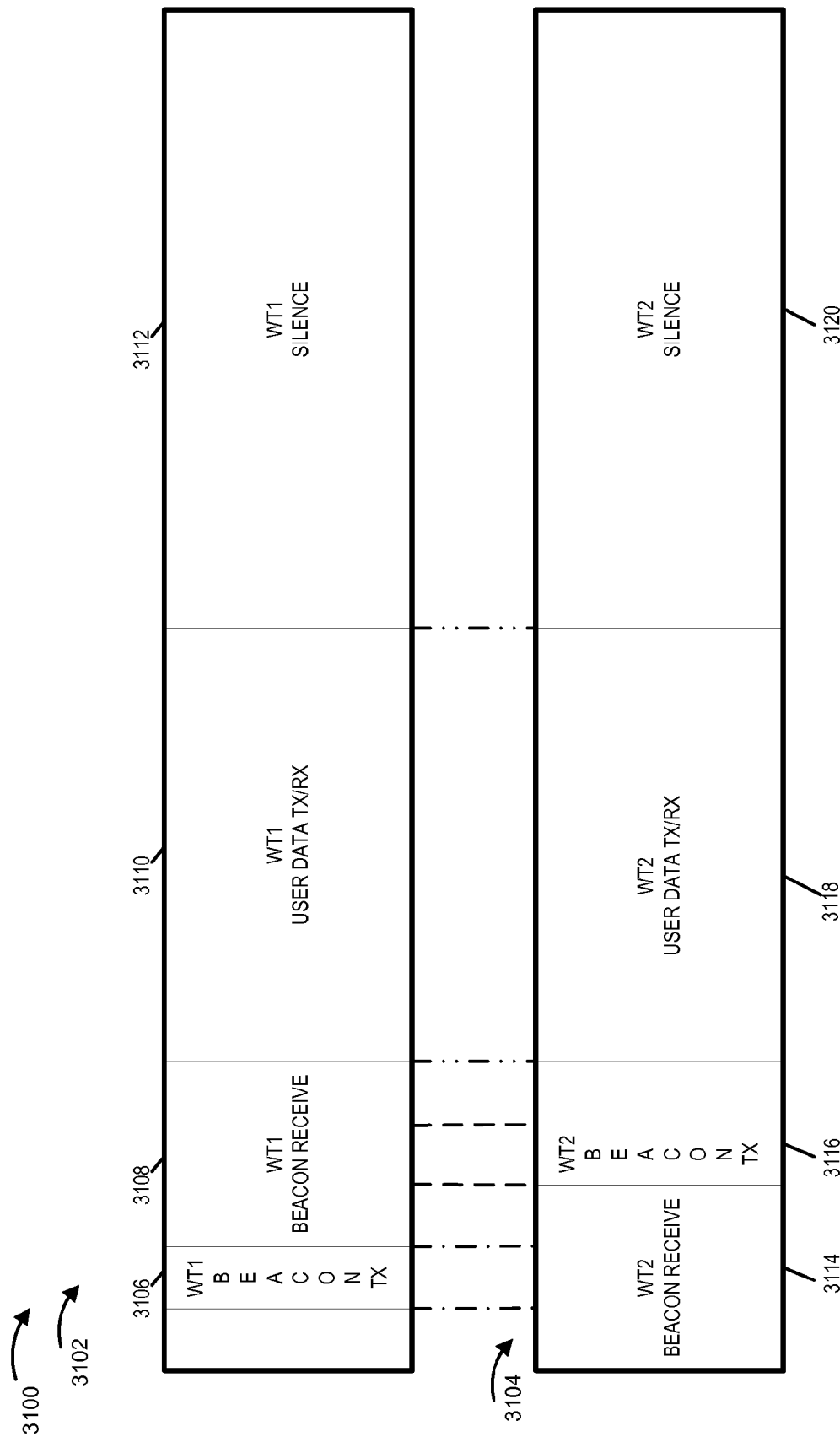
FIG. 31 illustrates exemplary synchronized timing between two wireless terminals based on beacon signals in accordance with another exemplary embodiment.

Drawing 3100 of FIG. 31 illustrates exemplary synchronized timing between two wireless terminals based on beacon signals in accordance with another exemplary embodiment. Drawing 3102 includes timing structure information with respect to wireless terminal 1, while drawing 3104 includes timing structure information with respect to wireless terminal 2. Drawing 3100 may correspond to FIG. 28 after the wireless terminals have been timing synchronized, e.g., based on wireless terminal 2 detecting a beacon signal from wireless terminal 1. Drawing 3102 includes a wireless terminal 1 beacon transmission interval 3106, a wireless terminal 1 beacon receive time interval 3108, a wireless terminal 1 user data TX/RX interval 3110 and a WT 1 silence interval 3112. Drawing 3104 includes a wireless terminal 2 beacon transmission interval 3114, a wireless terminal 2 beacon receive time interval 3116, a wireless terminal 2 user data TX/RX interval 3118 and a WT 2 silence interval 3120. It should be observed that wireless terminal 2 has adjusted its timing such that when it transmits a beacon signal burst during WT 2 beacon transmit interval 3116, WT 1 will receive the beacon signal burst during its beacon receive interval 3108. It can also be observed that, in this embodiment, following wireless terminal 2's timing adjustment, wireless terminal 2 receives a beacon burst transmitted by wireless terminal 1 during wireless terminal 1 beacon transmission interval 3106 during its beacon receive interval 3114. It should also be observed that user data TX/RX intervals 3110, 3118 overlap. This approach uses a different timing structure for the two wireless terminals, e.g., the wireless terminal which performed the first detection of the other beacon and adjusts its internal timing, e.g., WT 2, uses the interval ordering of drawing 3104. In some such cases, upon wireless terminal 2 ending the communications session and entering an inactive state including beacon signal transmission wireless terminal 2 goes to the ordered timing sequence represented by FIG. 3102.

Shared Frequency Spectrum Communication Systems

According to one embodiment, a frequency spectrum or band may be shared between two different types of wireless networks. Sharing of a frequency spectrum by two different wireless networks may allow may permit a more efficient use of limited spectrum resources. For instance, an ad hoc peer-to-peer network may be established over an existing channel allocation for another network, thereby reusing and/or concurrently using a frequency spectrum to efficiently utilize spectrum resources. In one example, a wide area network (WAN) may share the same frequency spectrum or band with an ad-hoc peer-to-peer network. The ad hoc peer-to-peer network features illustrated in FIGS. 1-31 may be implemented on the same frequency spectrum as a wide area network (WAN).

Figure 32:
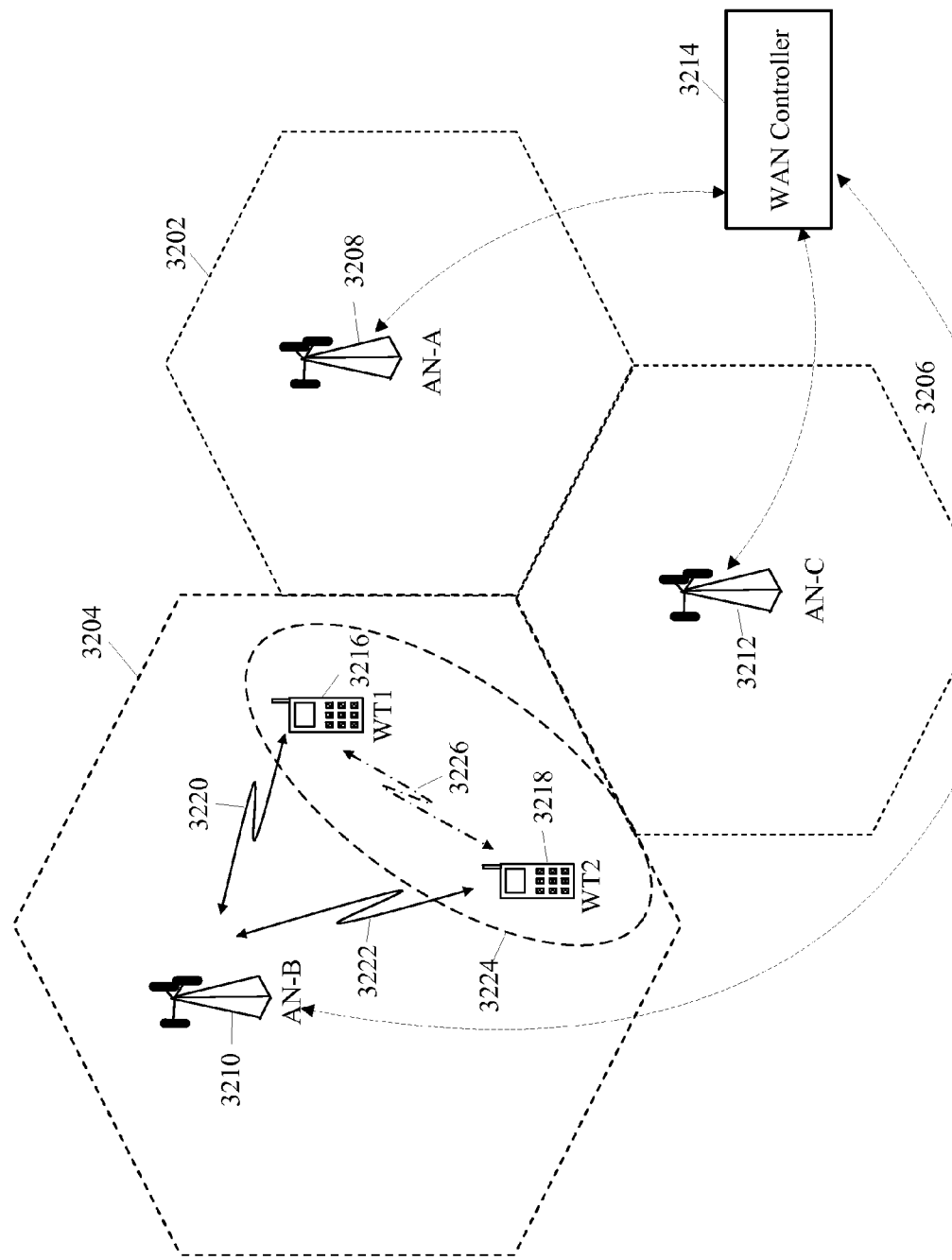
FIG. 32 is a block diagram illustrating the how an ad hoc peer-to-peer network may be implemented within the same frequency spectrum as a wide area network.

FIG. 32 is a block diagram illustrating the how an ad hoc peer-to-peer network may be implemented within the same frequency spectrum as a wide area network. The wide area network (WAN) may include a plurality of cells 3202, 3204, and 3206, in which each cell is serviced by one or more access nodes (e.g., base stations) AN-A 3208, AN-B 3210, and AN-C 3212 that may be distributively managed or centrally managed by a WAN controller 3214. In this example, a first wireless terminal WT1 3216 and/or a second wireless terminal WT2 3218 may capable of communicating with the access node AN-B 3210 of the WAN network via wireless communication links 3220 and 3222. The WAN network may operate on a first frequency spectrum or band.

Wireless terminals WT1 3216 and WT2 3218 may also establish an ad hoc peer-to-peer network 3224 on the same first frequency spectrum used by the WAN network, where a communication link 3226 may be used by the wireless terminals WT1 3216 and WT2 3218 for peer-to-peer communications. For example, the features, systems, techniques, and/or apparatus illustrated in FIGS. 1-31 may be used to establish the ad hoc network 3224 and peer-to-peer communication link 3226.

Figure 33:
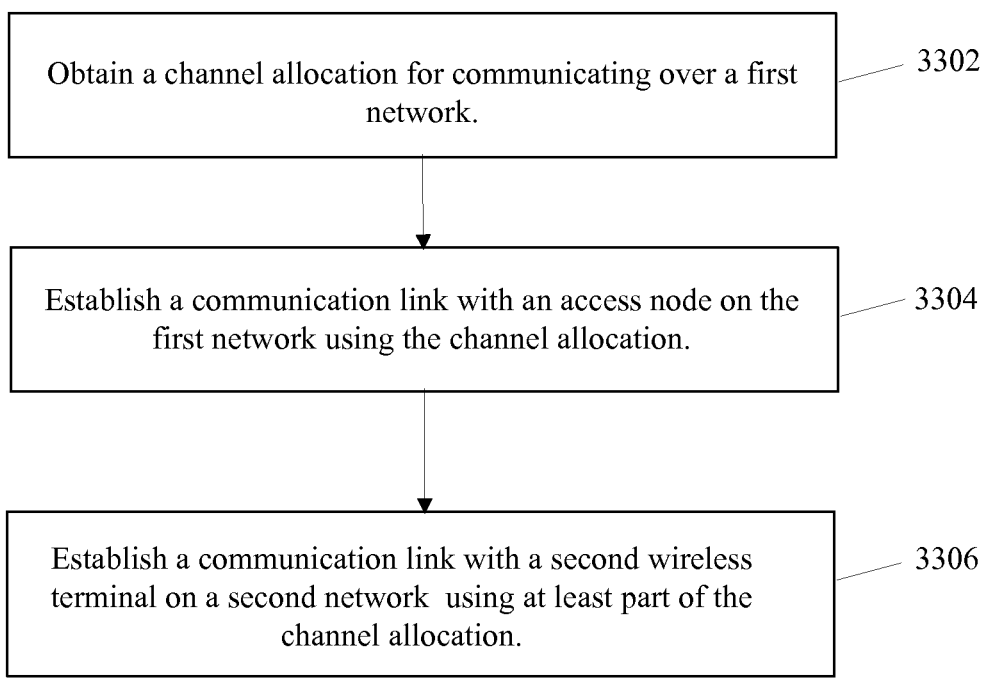
FIG. 33 is a flow diagram illustrating a general method operational in a wireless terminal to facilitate sharing of a frequency spectrum between two different networks.

FIG. 33 is a flow diagram illustrating a general method operational in a wireless terminal to facilitate sharing of a frequency spectrum between two different networks. The wireless terminal may obtain a channel allocation (e.g., forward link and reverse link timeslots, forward link and reverse link frequencies, etc.) for communicating over a first network 3302. The wireless terminal may then establish a communication link with an access node (e.g., base station) on the first network using the channel allocation 3304. The wireless terminal may also establish a communication link with a second wireless terminal on a second network using at least part of the channel allocation 3306.

A problem that may occur when two or more networks share a frequency spectrum (e.g., a channel allocation) is interference between transmissions of the two or more networks. That is, when two networks share a frequency band, there is a chance of interference between their signals. Such interference may be mitigated in various ways, as illustrated in FIGS. 34-38 and FIGS. 39-43 for example.

In some implementations, the wireless terminals may include two antennas to communicate over the two different networks using either the same channel, overlapping channels, or non-overlapping channels. For instance, a wireless terminal may utilize a first antenna with a first polarization to communicate over a first network and a second antenna with a second polarization to communicate over a second network. In other implementations, a wireless terminal may include a single adjustable polarization antenna configurable to communicate over two different networks.

Interference Management of Shared Spectrum—Single Antenna Implementation

FIGS. 34-37 illustrate examples in which interference between networks sharing a frequency spectrum may be mitigated by channel allocation techniques. In some instances where wireless terminals equipped with a single antenna are used, interference mitigation may be achieved by allocating first communication channels to a first network and allocating second communication channels to a second network, wherein the second communication channels are allocated within one or more of the first communication channels. A protocol is then implemented that avoids interference in the use of the first and second communication channels.

Figure 34:
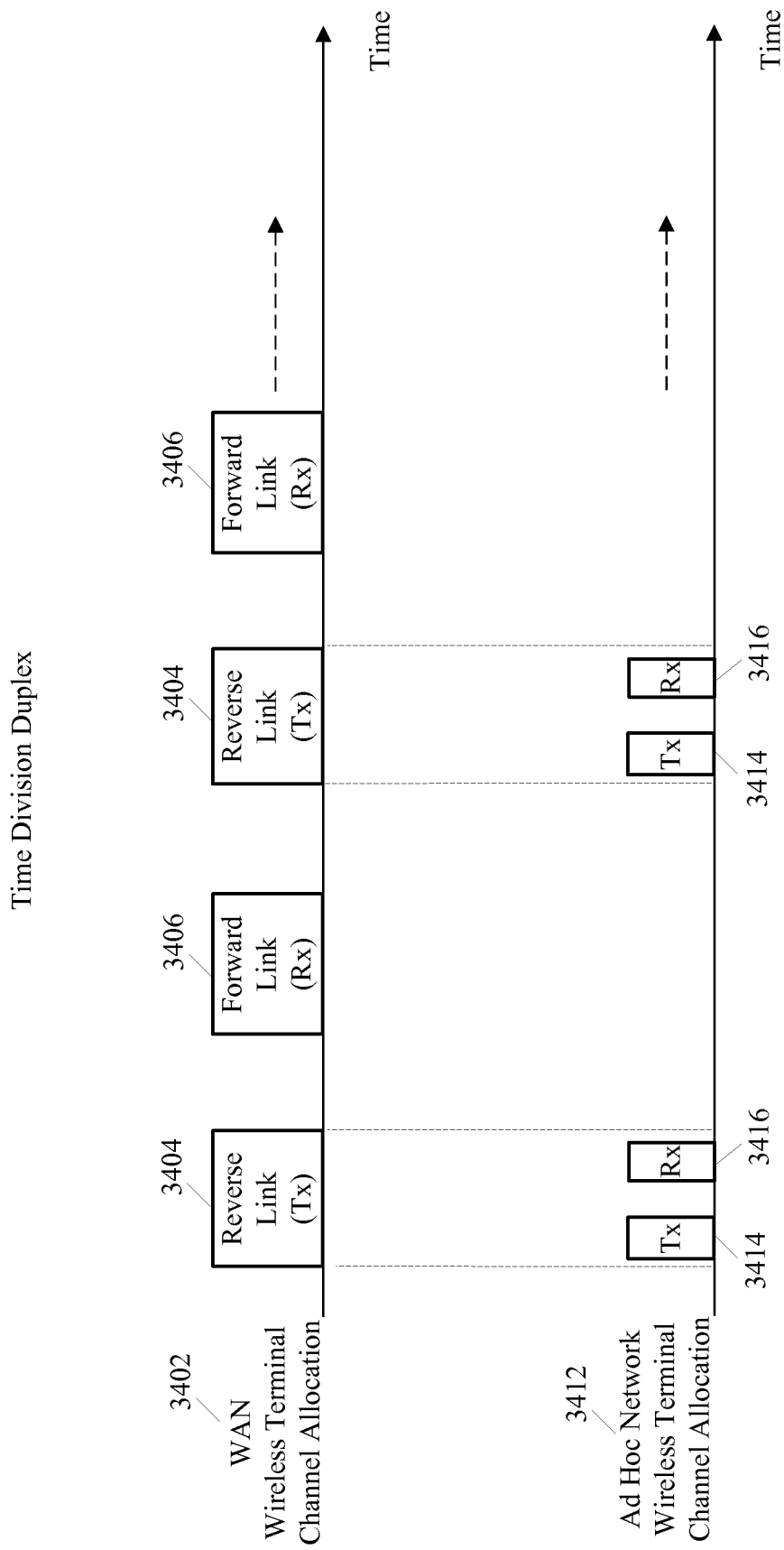
FIG. 34 illustrates one example of how an ad hoc peer-to-peer network may share the same frequency spectrum or band as a wide area network (WAN) implementing Time Division Duplex (TDD) channel allocation.

FIG. 34 illustrates one example of how an ad hoc peer-to-peer network may share the same frequency spectrum or band as a wide area network (WAN) implementing Time Division Duplex (TDD) channel allocation. In TDD, timeslots 3404 and 3406 are allocated or assigned for each wireless terminal communicating within the WAN network 3402. Such timeslots 3404 and 3406 may be channel allocations for the wireless terminal within a WAN network. The wireless terminal transmits Tx on the reverse link timeslot 3404 and receives Rx on the forward link timeslot 3406.

An ad hoc peer-to-peer network 3412 may utilize the same channel allocation as the WAN network. For instance, the wireless terminal in the WAN network 3402 may utilize its reverse link timeslot 3404 for both transmitting and receiving over a peer-to-peer link of the ad hoc network 3412. For example, a transmit timeslot 3414 and a receive timeslot 3416 may be allocated within the reverse link timeslot 3404. The allocation and operation of the peer-to-peer link over timeslots 3414 and 3416 may be performed according to one or more of the implementations illustrated in FIGS. 1-31, for example. For instance, a single antenna wireless terminal may be configured to transmit and/or receive on timeslots 3404 and 3406 when communicating via the WAN network 3402 while it transmits and/or receives on timeslots 3414 and 3416 when communicating via the ad hoc peer-to-peer network 3412.

Figure 35:
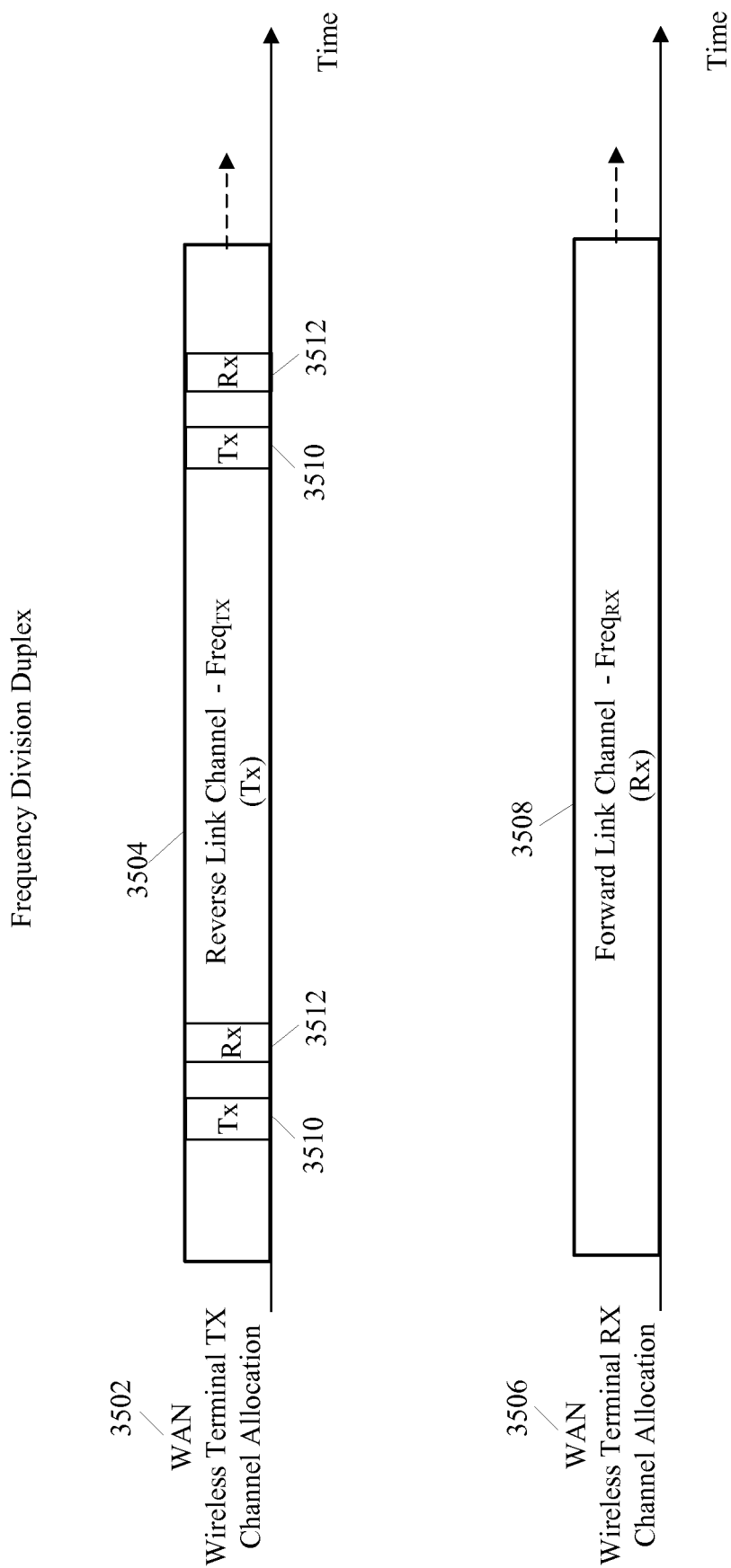
FIG. 35 illustrates one example of how an ad hoc peer-to-peer network may share the same frequency spectrum or band as a wide area network (WAN) implementing Frequency Division Duplex (FDD) channel allocation.

FIG. 35 illustrates one example of how an ad hoc peer-to-peer network may share the same frequency spectrum or band as a wide area network (WAN) implementing Frequency Division Duplex (FDD) channel allocation. In FDD, different frequencies are allocated or assigned for each wireless terminal communicating within the WAN network. A transmit Tx frequency 3502 and a receive Rx frequency 3506 may be allocated to a wireless terminal in a WAN network. For instance, a reverse link channel 3504 for the WAN network may operate on the transmit Tx frequency 3502 and a forward link channel 3508 for the WAN network may operate on the receive frequency 3506. The wireless terminal transmits Tx on the reverse link channel 3504 and receives on the forward link channel 3508.

An ad hoc peer-to-peer network may utilize the same channel allocation as the WAN network. For instance, the wireless terminal in the WAN network may utilize its reverse link channel 3504 for both transmitting and receiving over a peer-to-peer network. For example, a transmit timeslot 3510 and a receive timeslot 3512 may be allocated within the reverse link channel 3504. The allocation and operation of the peer-to-peer network over timeslots 3510 and 3512 may be performed according to one or more of the implementations illustrated in FIGS. 1-31, for example. For instance, a single antenna wireless terminal may be configured to transmit and/or receive on channels 3504 and 3508 when communicating via the WAN network while it transmits and/or receive on timeslots 3510 and 3512 when communicating via the peer-to-peer network.

By defining a second set of channels for the peer-to-peer network within the first set of channels for the first network (as illustrated in FIGS. 34 and 35), a single antenna wireless terminal is capable of using a frequency band for both networks.

Figure 36:
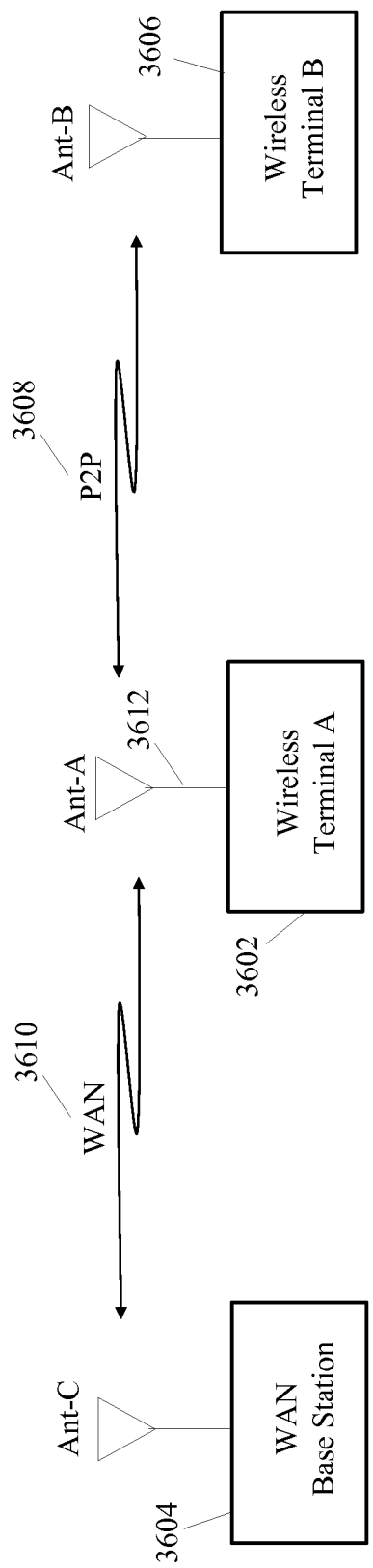
FIG. 36 is a block diagram illustrating how a single-antenna wireless terminal may communicate on a WAN network and peer-to-peer network on a shared frequency spectrum while mitigating interference.

FIG. 36 is a block diagram illustrating how a single-antenna wireless terminal may communicate on a WAN network and peer-to-peer network on a shared frequency spectrum while mitigating interference. In some deployment scenarios, wireless communications between a first wireless terminal A 3602 and a second wireless terminal B 3606 in a P2P network 3608 share the same bandwidth or frequency spectrum with a WAN network link 3610 between the first wireless terminal A 3602 and a WAN base station 3604. Consequently, it is desirable to control the interference between these two networks 3610 and 3608. In this example, the first wireless terminal A 3602 includes a single antennal Ant-A 3612 to communicate with the base station 3604 over a first network and/or with the second wireless terminal 3606 over a second network, where communications with the first and second networks may be performed in an overlapping channels or non-overlapping channels of a channel allocation.

One way for the first wireless terminal A 3602 to communicate over the first and second networks while using a single antenna is to implement a protocol in which the first wireless terminal A 3602 reuses part of its assigned WAN channels for P2P network communications. Two examples of such channel sharing protocol are illustrated in FIGS. 34 and 35. For instance, the first wireless terminal A 3602 may first establish a communication link with the WAN base station 3604, thereby obtaining a channel assignment (e.g., uplink and downlink channels) within the WAN network 3610. The first wireless terminal A 3602 may then establish peer-to-peer communications with the second wireless terminal B 3606 by defining its communication channels for the P2P network 3608 within the reverse link channel for the WAN network 3610. Because the first wireless terminal controls what is sent over its reverse link for the WAN network 3610, it is able to use it to both transmit and receive from the P2P network 3608 without causing interference with transmissions from the WAN base station 3604.

The first wireless terminal A 3602 may constantly, regularly, and/or periodically detect or monitor who is within P2P range by using beacons provided regularly by other wireless terminals. Beacons may be sent in bursts which include a second wireless terminal identifier. Note that in establishing a communication link with the second wireless terminal B 3606, the first wireless terminal A is able to use this identifier to inform the second wireless terminal which timeslots and frequency to use for the P2P network communications.

Figure 37:
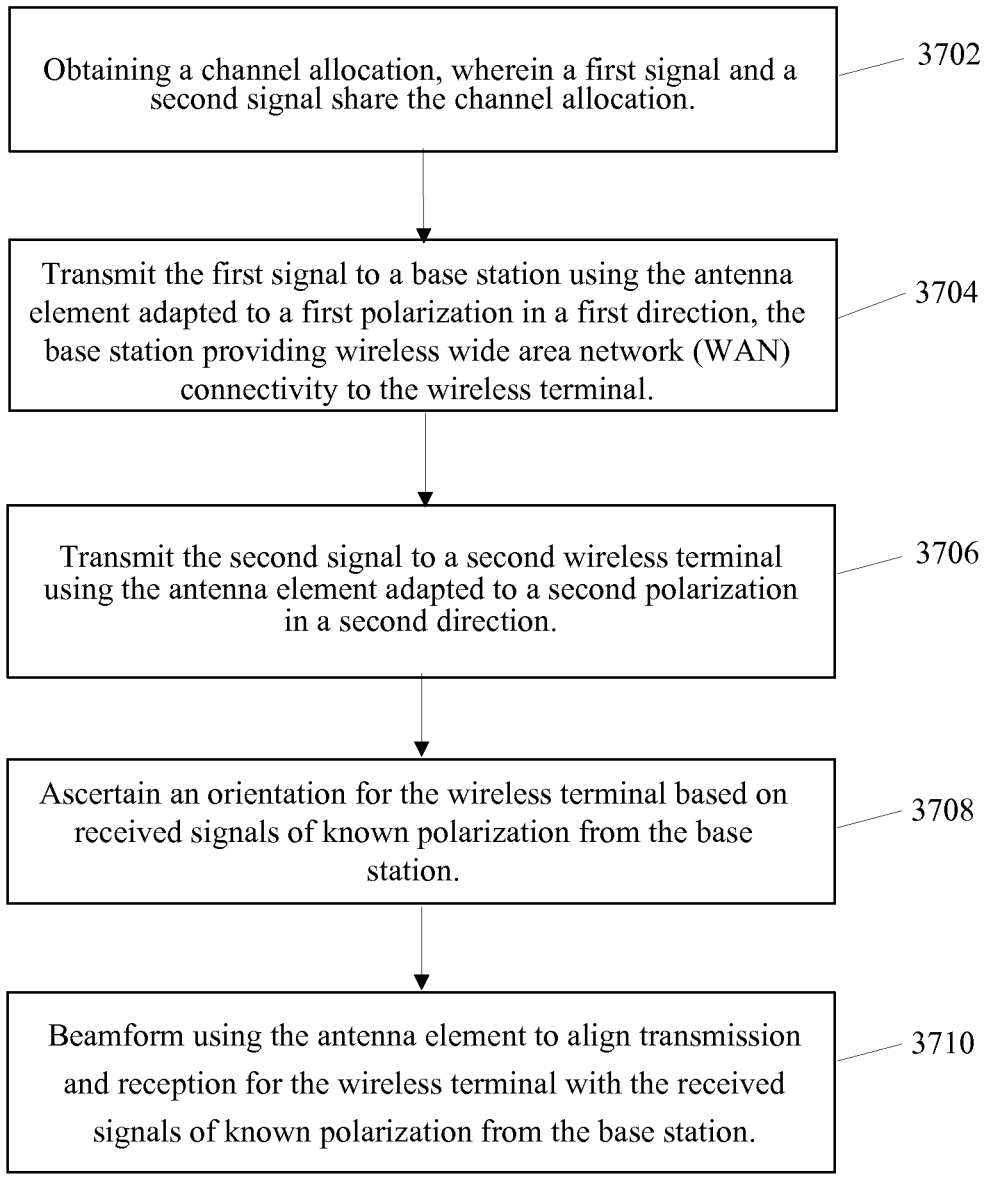
FIG. 37 is a flow diagram illustrating a method operational in a single-antenna wireless terminal to facilitate sharing of a frequency spectrum between two different networks.

FIG. 37 is a flow diagram illustrating a method operational in a single-antenna wireless terminal to facilitate sharing of a frequency spectrum between two different networks. In this example, a wireless terminal may be equipped with an antenna element having adjustable polarizations. The wireless terminal may obtain a channel allocation, wherein a first signal and a second signal for different networks may share the channel allocation 3702. For instance, the wireless terminal may obtain a (wireless) channel allocation for a first network, where the channel allocation may include a reverse link channel for transmission from the wireless terminal. In one example, the channel allocation may include a forward link channel (e.g., timeslot, frequency, etc.) and the reverse link channel (e.g., timeslot, frequency etc.) which can be used to communicate with an access node (e.g., base station) for the first network (e.g., wide area network (WAN)). The wireless terminal may transmit a first signal to a base station using the antenna element adapted to a first polarization in a first direction, wherein the base station may provide wireless wide area network (WAN) connectivity to the wireless terminal 3704. Likewise, the wireless terminal may transmit a second signal to a second wireless terminal using the antenna element adapted to a second polarization in a second direction 3706. In one example, the antenna element may include a first antenna polarized according to the first polarization and the second antenna polarized according to the second polarization, the first signal being transmitted over the first antenna and the second signal being transmitted over the second antenna. In various examples, (a) the first and second polarizations may be orthogonal directions, (b) the first polarization may be a first mix of horizontal and vertical polarizations and the second polarization may be a mix of vertical and horizontal polarizations, and/or (c) the first and second polarizations may be different by at least forty-five (45) degrees.

Additionally, the first and the second signals may be transmitted in either non-overlapping time intervals or overlapping time intervals. For instance, the techniques illustrated in FIG. 1-36 may be employed, alone or in combination, to facilitate establishing a (peer-to-peer) communication link and/or sharing the frequency spectrum with the first network.

The wireless terminal may also ascertain an orientation for the wireless terminal based on received signals of known polarization from the base station 3708. The ascertained orientation may be used to beamform using the antenna element to align transmission and reception for the wireless terminal with the received signals of known polarization from the base station 3710.

Figure 38:
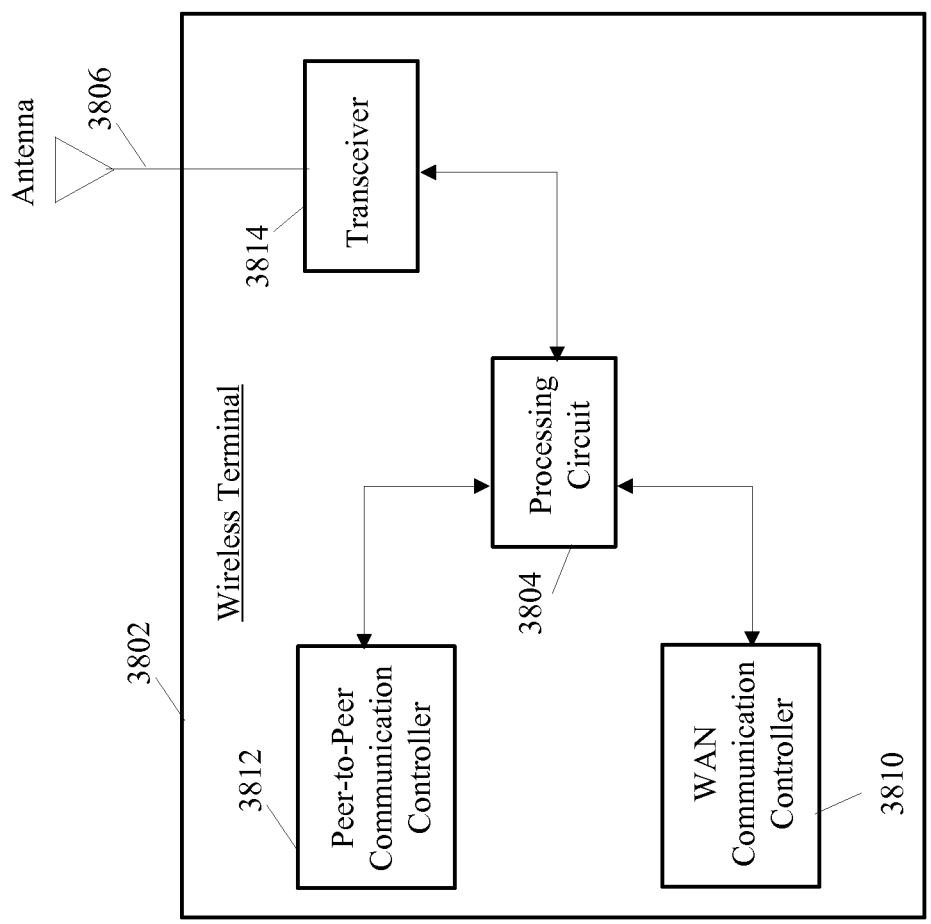
FIG. 38 is a block diagram illustrating a wireless terminal capable of communicating with two different networks with a single antenna over a shared frequency spectrum.

FIG. 38 is a block diagram illustrating a wireless terminal capable of communicating with two different networks with a single antenna over a shared frequency spectrum. The wireless terminal 3802 may include a processing circuit 3804 configured to facilitate communications to and/or from the wireless terminal 3802. The processing circuit 3804 may be coupled to a WAN communication controller 3810 that may facilitate communications via a WAN (e.g., first network) and a peer-to-peer communication controller 3812 that may facilitate communications via an ad hoc peer-to-peer network (e.g., second network).

Because communications via the WAN (e.g., first network) and ad hoc peer-to-peer network (e.g., second network) share the same frequency spectrum (e.g., channel allocation within a band), the wireless terminal 3802 may reuse some or all of transmitter/receiver hardware for communications with both networks. This may avoid having distinct transmitter/receiver hardware for communications with each network. Consequently, using fewer transmitter/receiver hardware components may reduce power consumption and/or extend the operating time of the wireless terminal 3802. In one example, the wireless terminal 3802 may include a transceiver 3814 (e.g., transmitter and/or receiver) coupled to the processing circuit 3804 and an adjustable antenna element 3806 to facilitate communications to and/or from the wireless terminal 3802 (e.g., to/from the WAN and ad hoc peer-to-peer network). The antenna element 3806 may serve to transmit and/or receive signals to and/or from a WAN network (e.g., first network) and a peer-to-peer network (e.g., second network), as may be configured by the wireless terminal 3802.

The antenna element 3806 may have adjustable polarizations. In one example, the antenna element may include a first antenna polarized according to the first polarization and the second antenna polarized according to the second polarization, the first signal being transmitted over the first antenna and the second signal being transmitted over the second antenna. In various examples, (a) the first and second polarizations may be in orthogonal directions, (b) the first polarization may be a first mix of horizontal and vertical polarizations and the second polarization may be a mix of vertical and horizontal polarizations, and/or (c) the first and second polarizations may be different by at least forty-five (45) degrees.

The processing circuit 3804 may be configured to (a) obtain a channel allocation, wherein a first signal and a second signal for different networks may share the channel allocation, (b) transmit the first signal to a base station using the antenna element adapted to a first polarization in a first direction, the base station providing wireless wide area network (WAN) connectivity to the wireless terminal, and/or (c) transmit the second signal to a second wireless terminal using the antenna element adapted to a second polarization in a second direction.

The processing circuit may be further configured to (a) ascertain an orientation for the wireless terminal based on received signals of known polarization from the base station; and/or (b) beamform using the antenna element to align transmission and reception for the wireless terminal with the received signals of known polarization from the base station.

According to one feature, the processing circuit 3804 may also be configured to adjust transmission power over the transceiver 3814 depending to which network it is currently transmitting. For instance, the transceiver 3814 may use more power to communicate over the WAN (e.g., higher power, longer range communications) while it may use less power to communicate over the ad hoc peer-to-peer network (e.g., lower power, shorter range communications).

A circuit may also be provided to allow a wireless terminal to use a single antenna element in communicating with two or more different networks either concurrently and/or in an overlapping, shared, or non-overlapping communication channel. The circuit may be adapted to transmit a first signal to a base station using the antenna element adapted to a first polarization in a first direction, wherein the base station provides wireless wide area network (WAN) connectivity to the wireless terminal. The same circuit, a different circuit, or a second section of the same or different circuit may be adapted to transmit a second signal to a second wireless terminal using the antenna element adapted to a second polarization in a second direction. The same circuit, a different circuit, or a third section of the same or different circuit may be adapted to obtain a channel allocation for communicating with the base station, wherein the first signal is transmitted within the channel allocation and the second signal is transmitted using at least part of the channel allocation. The first and second polarizations may be different by at least forty-five (45) degrees. The same circuit, a different circuit, or a fourth section of the same or different circuit may be adapted to ascertain an orientation for the wireless terminal based on received signals of known polarization from the first wireless network to establish the first and second polarizations. The same circuit, a different circuit, or a fifth section of the same or different circuit may be adapted to perform beamforming using the antenna element to align transmission and reception for the wireless terminal with the received signals of known polarization from the base station.

Interference Management of Shared Spectrum—Orthogonally Polarized Antennas

FIGS. 39-43 illustrate an example in which interference between networks sharing a frequency spectrum may be mitigated by channel allocation techniques in combination with two polarized antennas. In contrast to the single antenna implementation of FIGS. 34-38, where fast switching may be used to communicate over two networks sequentially, adapting mobile devices with two polarized antennas may enable simultaneous communications over the two networks while mitigating interference between the two networks sharing a frequency spectrum or band. The simultaneous transmission and/or reception on the same frequency band by two polarized antennas of the wireless terminal assumes that the wireless terminal is able to drive both antennas simultaneously.

Figure 39:
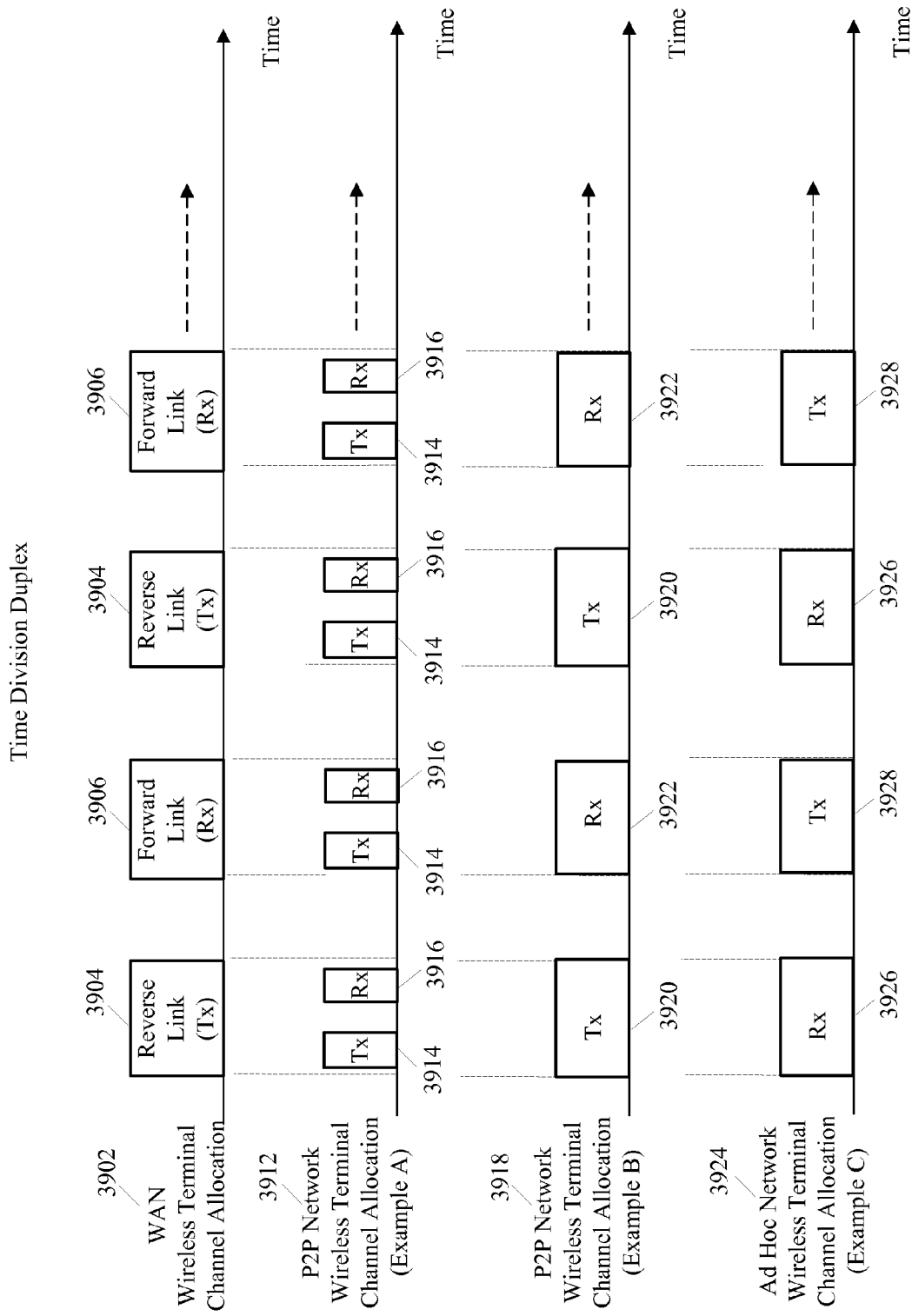
FIG. 39 illustrates various examples of how an ad hoc peer-to-peer network may simultaneously share the same frequency spectrum or band as a wide area network (WAN) implementing Time Division Duplex (TDD) channel allocation.

FIG. 39 illustrates various examples of how an ad hoc peer-to-peer network may simultaneously share the same frequency spectrum or band as a wide area network (WAN) implementing Time Division Duplex (TDD) channel allocation. In TDD, timeslots 3904 and 3906 are allocated or assigned for each wireless terminal communicating within the WAN network 3902. Such timeslots 3904 and 3906 may be channel allocations for the wireless terminal within a WAN network. For communications over the WAN, the wireless terminal transmits Tx on the reverse link timeslot 3904 and receives Rx on the forward link timeslot 3906.

According to a first example, an ad hoc peer-to-peer network 3912 may utilize the same channel allocation as the WAN network 3902. For instance, the wireless terminal in the WAN network 3902 may utilize both its reverse link timeslot 3904 and forward link timeslot 3906 for both transmitting and receiving over a peer-to-peer link of the P2P network 3912. For example, a transmit timeslot 3914 and a receive timeslot 3916 may be allocated within the reverse link timeslot 3904 and the forward link timeslot 3906. The allocation and operation of the peer-to-peer link over timeslots 3914 and 3916 may be performed according to one or more of the implementations illustrated in FIGS. 1-31, for example. Such simultaneous use of the same frequency spectrum by two or more networks is facilitated by having wireless devices that include two or more polarized antennas. For instance, the wireless terminal may include a first antenna having a first polarization to transmit and/or receive on timeslots 3904 and 3906 when communicating via the WAN network 3902. Meanwhile the wireless terminal may also include a second antenna having a second polarization to transmits and/or receive on timeslots 3914 and 3916 when communicating via the ad hoc peer-to-peer network 3912.

According to a second example of a peer-to-peer network 3918, the wireless terminal may include a first antenna having a first polarization to transmit and/or receive on timeslots 3904 and 3906 when communicating via the WAN network 3902. The wireless terminal may also include a second antenna having a second polarization to transmits and/or receive on timeslots 3920 and 3922 when communicating via the ad hoc peer-to-peer network 3918. That is, the wireless terminal transmits 3920 to the peer-to-peer network 3918 on the same timeslot as it transmits 3904 on the WAN network 3902. Likewise, the wireless terminal receives 3922 from the peer-to-peer network 3918 on the same timeslot as it receives 3906 from the WAN network 3902. Interference mitigation is achieved by having the first antenna polarization be orthogonal to the second antenna polarization.

According to a third example of a peer-to-peer network 3924, the wireless terminal may include a first antenna having a first polarization to transmit and/or receive on timeslots 3904 and 3906 when communicating via the WAN network 3902. The wireless terminal may also include a second antenna having a second polarization to receive and/or transmit on timeslots 3926 and 3928 when communicating via the ad hoc peer-to-peer network 3924. That is, the wireless terminal receives 3926 from the peer-to-peer network 3924 on the same timeslot as it transmits 3904 on the WAN network 3902. Likewise, the wireless terminal transmits 3922 to the peer-to-peer network 3924 on the same timeslot as it receives 3906 from the WAN network 3902. Interference mitigation is again achieved by having the first antenna polarization be orthogonal to the second antenna polarization.

Figure 40:
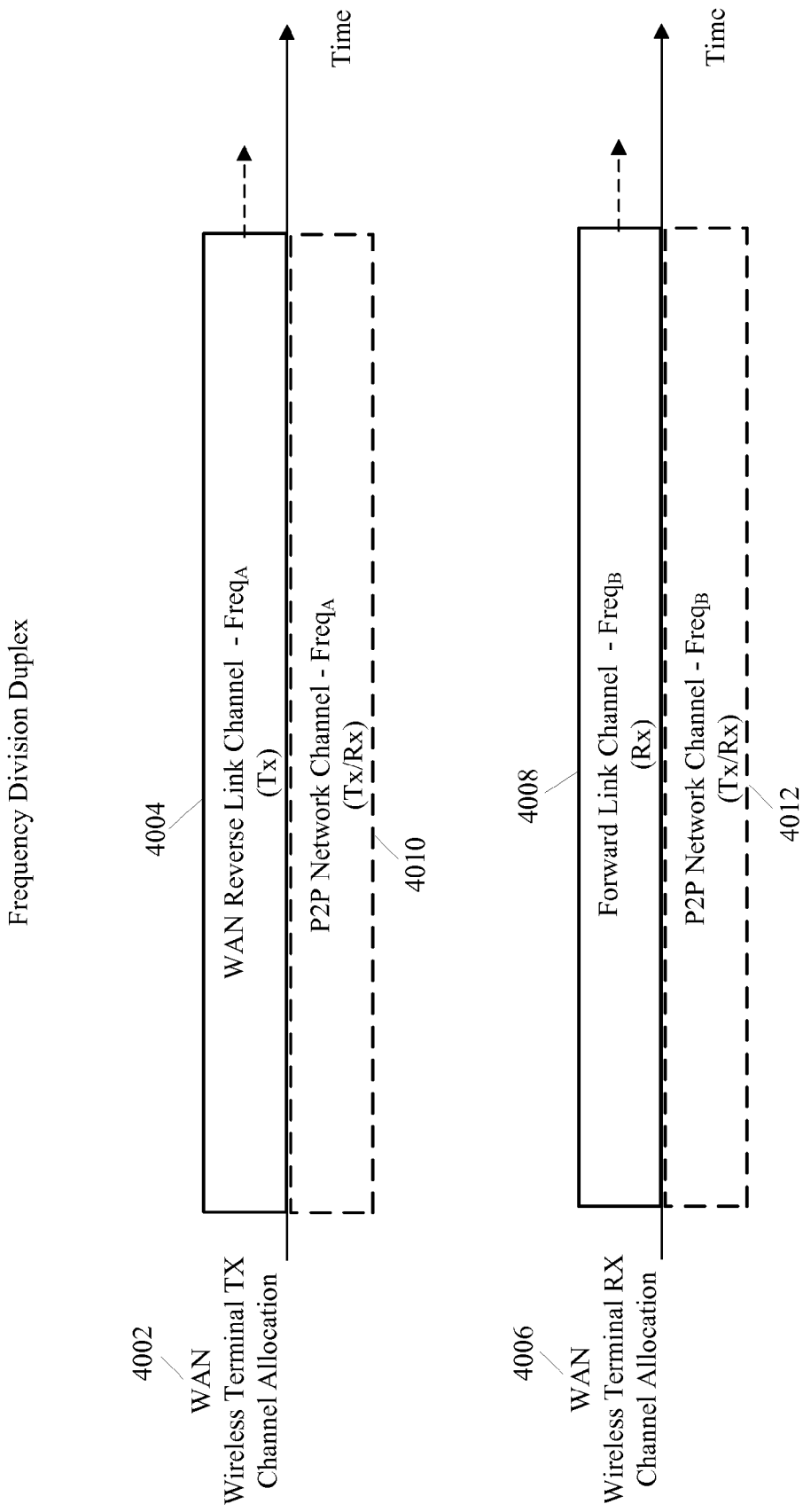
FIG. 40 illustrates one example of how an ad hoc peer-to-peer network may simultaneously share the same frequency spectrum or band as a wide area network (WAN) implementing Frequency Division Duplex (FDD) channel allocation.

FIG. 40 illustrates one example of how an ad hoc peer-to-peer network may simultaneously share the same frequency spectrum or band as a wide area network (WAN) implementing Frequency Division Duplex (FDD) channel allocation. In FDD, different frequencies are allocated or assigned for each wireless terminal communicating within the WAN network. A transmit Tx frequency $Freq_A$ 4002 and a receive Rx frequency $Freq_B$ 4006 may be allocated to a wireless terminal in a WAN network. For instance, a reverse link channel 4004 for the WAN network may operate on the transmit Tx frequency $Freq_A$ and a forward link channel 4008 for the WAN network may operate on the receive frequency $Freq_B$. The wireless terminal transmits Tx on the reverse link channel 4004 and receives on the forward link channel 4008 using a first antenna having a first polarization.

An ad hoc peer-to-peer network may utilize the same channel allocation as the WAN network but using a second antenna having a second polarization. For instance, the wireless terminal in the WAN network may utilize its reverse link channel 4004 and/or forward link channel 4008 for both transmitting and receiving over a peer-to-peer network but using a different (orthogonal) polarization than that used for the WAN network. For example, the peer-to-peer network may establish its transmit Tx and/or receive Rx communication channels 4010 and 4012 on one or both of the same frequencies $Freq_A$ and $Freq_B$ allocated by the WAN network. The allocation and operation of the peer-to-peer network over P2P network channels 4010 and 4012 may be performed according to one or more of the implementations illustrated in FIGS. 1-31, for example. Consequently, a wireless device may include a first antenna having a first polarization to transmit and/or receive on channels 4004 and 4008 when communicating via the WAN network while it transmits and/or receive on channels 4010 and 4012 (on the same frequencies $Freq_A$ and $Freq_B$) when communicating via the peer-to-peer network.

In an embodiment, interference management between an infrastructure cellular network, such as a wide area network (WAN), for example, and a local peer-to-peer (P2P) network is performed. The wireless terminal operating in the cellular and ad hoc peer-to-peer network may use different polarization antennas to communicate with peers or WAN base stations to avoid or mitigate the interference between the two networks.

Figure 41:
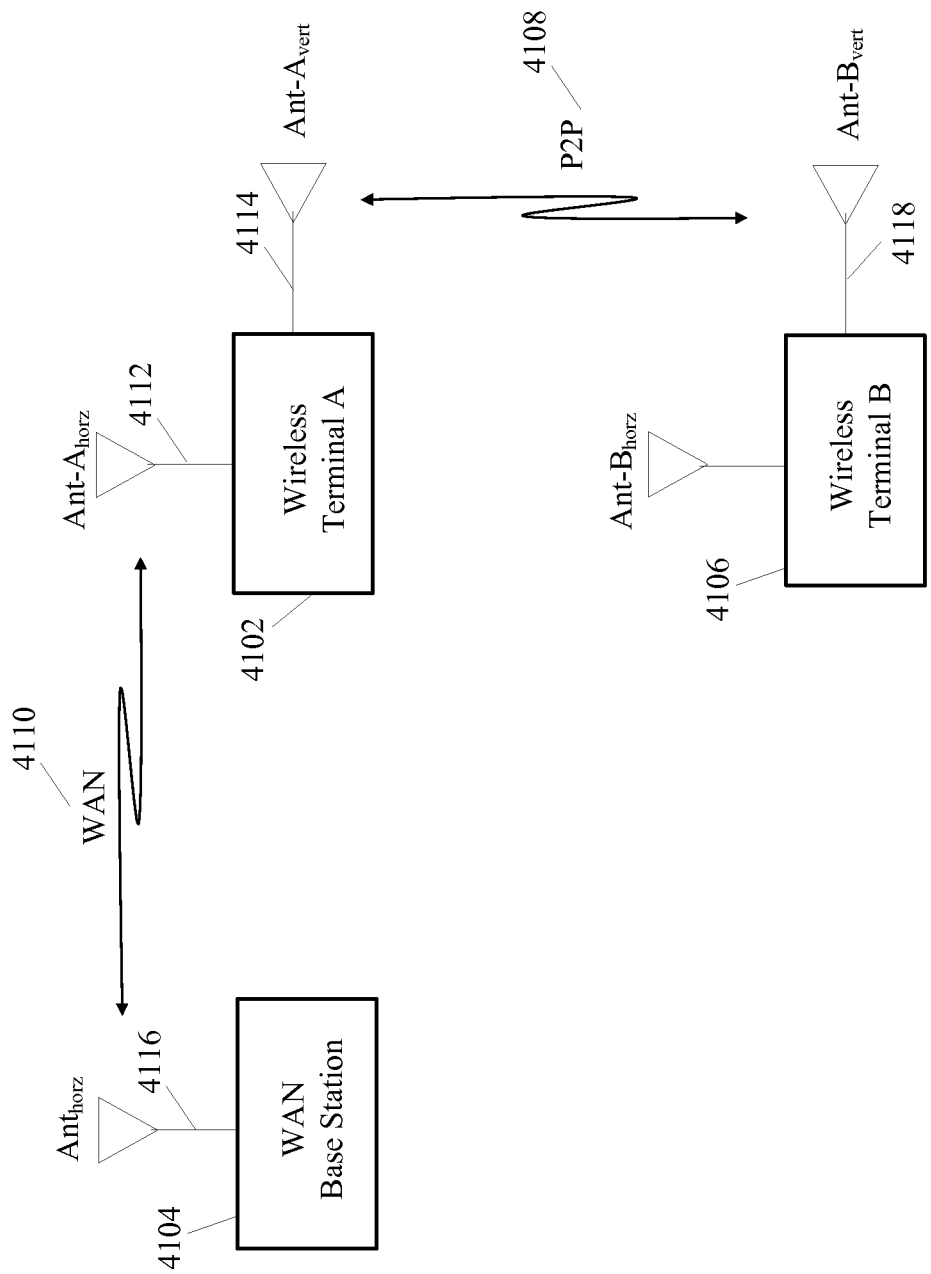
FIG. 41 is a block diagram illustrating how a wireless terminal with two antennas may communicate on a WAN network and peer-to-peer network on a shared frequency spectrum while mitigating interference.

FIG. 41 is a block diagram illustrating how a wireless terminal with two antennas may communicate on a WAN network and peer-to-peer network on a shared frequency spectrum while mitigating interference. In some deployment scenarios, wireless communications between a first wireless terminal A 4102 and a second wireless terminal B 4106 in a ad hoc P2P network 4108 may share the same bandwidth or frequency spectrum with a WAN network link 4110 between the first wireless terminal A 4102 and a WAN base station 4104. Such spectrum sharing may be concurrent, in overlapping time periods or in non-overlapping time periods. Consequently, it is desirable to control the interference between these two networks 4110 and 4108.

One way to mitigate interference in such interference is to equip the wireless terminals A 4102 and B 4106 with both vertically and horizontally polarized antennas. For example, wireless terminal A 4102 may include a horizontally polarized antenna 4112 and a vertically polarized antenna 4114. The wireless terminal A 4102 may use its horizontally polarized antenna 4112 to communicate with a corresponding antenna 4116 of the WAN base station 4104 and it may use its vertically polarized antenna 4114 to communicate with a corresponding antenna 4118 of a peer wireless terminal B 4106. Specifically, if the WAN communication is performed using the horizontally polarized antennas, the wireless terminals A 4102 and B 4106 may use a horizontal polarized antenna to communicate within the P2P network 4108, and vice versa. In one embodiment, the WAN base station 4104 may broadcast its polarization choice to the wireless terminals A 4102 and/or B 4106. In one aspect, different base stations of the WAN might choose different polarizations for communications of the WAN network. In this case, a wireless terminal trying to perform P2P communications may select its P2P antenna polarization according to the strongest base station message/pilot it receives.

Figure 42:
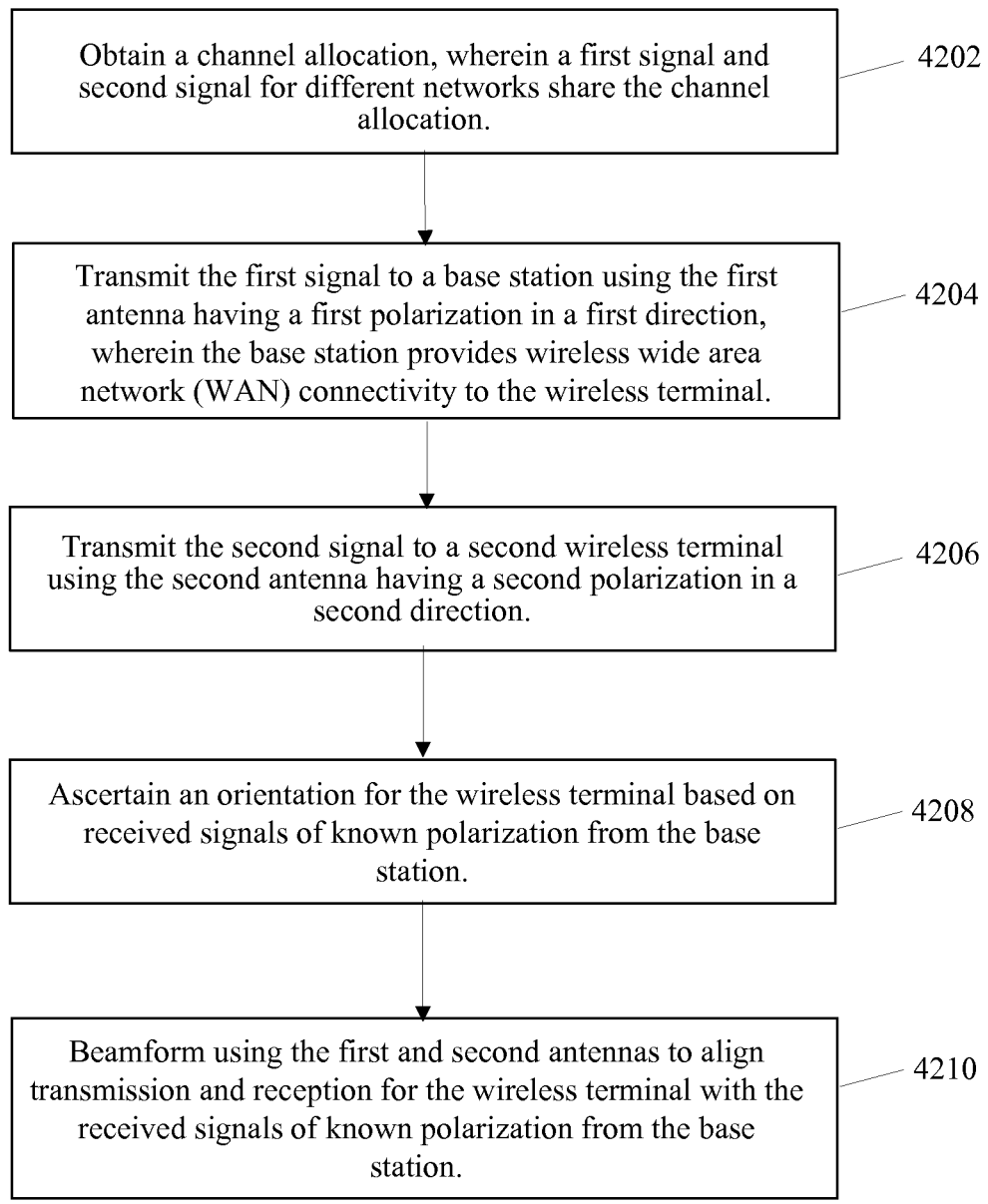
FIG. 42 is a flow diagram illustrating a method operational in a wireless terminal having two antennas to facilitate sharing of a frequency spectrum between two different networks.

FIG. 42 is a flow diagram illustrating a method operational in a wireless terminal having two antennas to facilitate sharing of a frequency spectrum between two different networks. A wireless terminal may obtain a (wireless) channel allocation, wherein the first signal and second signal for different networks may share the channel allocation 4202. In one example, this may include obtaining a channel allocation for communicating with the base station, wherein the first signal is transmitted within the channel allocation and the second signal is transmitted using at least part of the channel allocation. The channel allocation may include a reverse link channel for transmission from the wireless terminal and a forward link channel for transmission to the wireless terminal. For example, the channel allocation may include a forward link channel (e.g., timeslot, frequency, etc.) and the reverse link channel (e.g., timeslot, frequency etc.) which can be used to communicate with an access node (e.g., base station) for the first network (e.g., wide area network (WAN)).

The wireless terminal may transmit the first signal to a base station using the first antenna having a first polarization in a first direction, wherein the base station provides wireless wide area network (WAN) connectivity to the wireless terminal 4204. Similarly, the wireless terminal may transmit the second signal to a second wireless terminal using the second antenna having a second polarization in a second direction 4206. In one implementation, the first signal is a wireless WAN signal and the second signal is a peer-to-peer signal. In some examples, the first and the second signals may be transmitted in either overlapping or non-overlapping time intervals. According to various examples, (a) the first and second polarizations are orthogonal directions, (b) wherein the first and second polarizations are different by at least forty-five (45) degrees, (c) the first polarization is a horizontal polarization and the second polarization is a vertical polarization, and/or (d) the first polarization is a first mix of horizontal and vertical polarizations and the second polarization is a mix of vertical and horizontal polarizations.

In some instances, a wireless terminal (e.g., wireless terminal A 3602 in FIG. 36) may not be in an optimal vertical/horizontal position even though the received signal waveforms may be perfectly horizontally polarized or vertically polarized. That is, the operator using the mobile device may change its position or orientation during use. Consequently, a vertically polarized antenna of the mobile device may end up in a horizontal position, thereby changing its intended polarization relative to a receiving device. According to another feature, the wireless terminal may adapt its polarization by (a) ascertaining an orientation for the wireless terminal based on received signals of known polarization from the base station 4208 and/or (b) beamforming using the first and second antennas to align transmission and reception for the wireless terminal with the received signals of known polarization from the base station 4210. That is, the wireless terminal may discover a polarization for first network communications by, for example, sensing signal strength for the first network signals on two or more polarizations. Alternatively, the wireless terminal may receive a message (e.g., from an access node for the first network) indicating the polarization to use. The wireless terminal may then configure the first antenna to the first polarization for communications with the first network using the channel allocation. The wireless terminal may also configure the second antenna with a second polarization for communications over the peer-to-peer communication link, where the first polarization is orthogonal to the second polarization The techniques illustrated in FIG. 1-41 may be employed, alone or in combination, to facilitate a wireless terminal having two antennas in establishing communication links with different networks and/or sharing the frequency spectrum between two or more networks.

Figure 43:
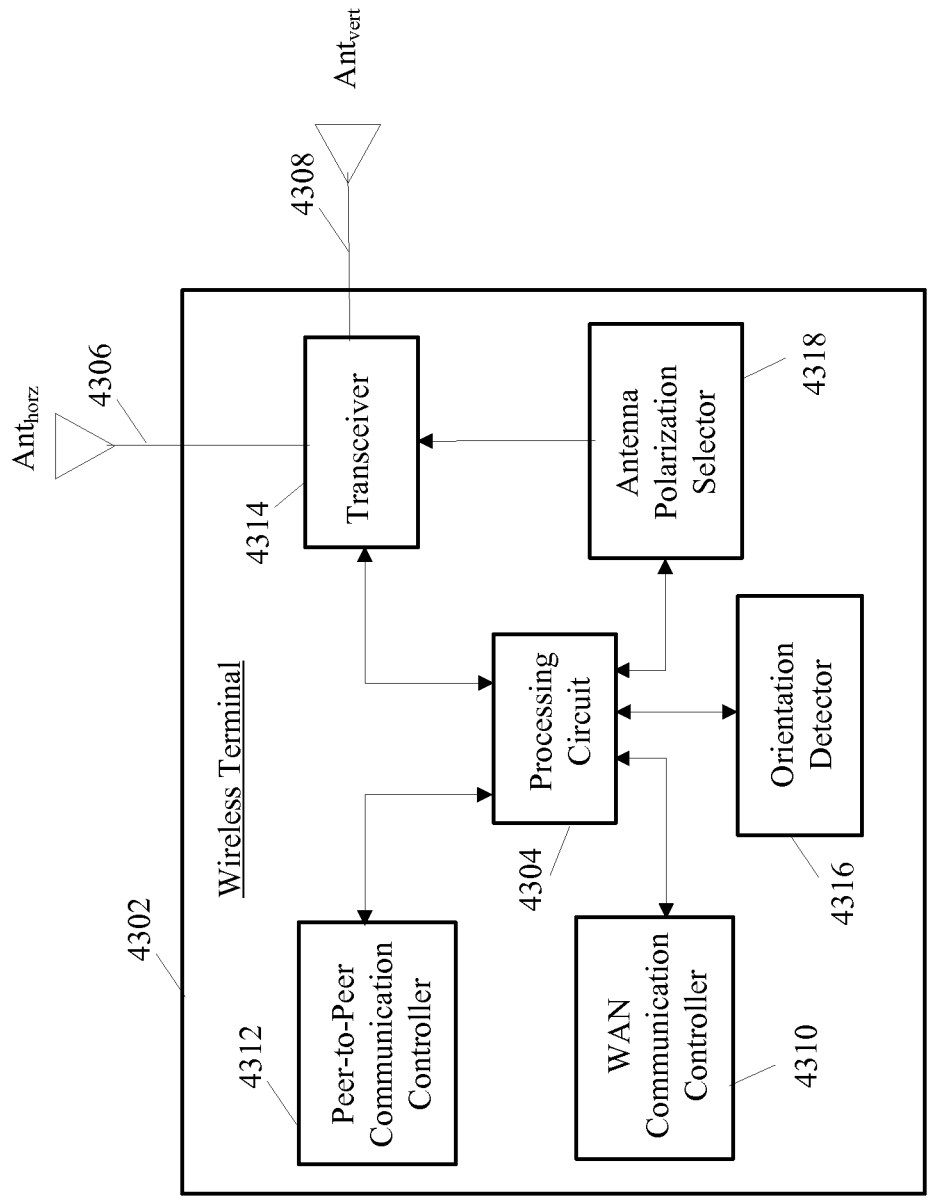
FIG. 43 is a block diagram illustrating a wireless terminal having two antennas to communicate with two different networks over a shared frequency spectrum.

FIG. 43 is a block diagram illustrating a wireless terminal having two antennas to communicate with two different networks over a shared frequency spectrum. The wireless terminal 4302 may include a processing circuit 4304 configured to facilitate communications to and/or from the wireless terminal 4302. The processing circuit 4304 may be coupled to a WAN communication controller 4310 that may facilitate communications via a WAN (e.g., first network) and a peer-to-peer communication controller 4312 that may facilitate communications via a peer-to-peer network (e.g., second network).

The processing circuit 4304 may be configured to obtain a channel allocation, wherein a first signal and a second signal for different networks may share the channel allocation. For instance, the channel allocation may be obtained for communicating with a base station, wherein the first signal is transmitted within the channel allocation and the second signal is transmitted using at least part of the channel allocation. The channel allocation may include at least one of forward and reverse link timeslots, and/or forward and reverse link frequencies.

Because communications via the WAN (e.g., first network) and ad hoc peer-to-peer network (e.g., second network) share the same frequency spectrum (e.g., channel allocation within a band), the wireless terminal 4302 may reuse some or all of transmitter/receiver hardware for communications with both networks. This may avoid having distinct transmitter/receiver hardware for communications with each network. Consequently, using fewer transmitter/receiver hardware components may reduce power consumption and/or extend the operating time of the wireless terminal 4302. In one example, the wireless terminal 4302 may include a transceiver 4314 (e.g., transmitter and/or receiver) coupled to the processing circuit 4304 and antennas 4306 and 4308 to facilitate communications to and/or from the wireless terminal 4302 (e.g., to/from the WAN and ad hoc peer-to-peer network). The first antenna may have a first polarization in a first direction while the second antenna may have a second polarization in a second direction. The processing circuit may be configured to (a) transmit a first signal to a base station using the first antenna 4306, wherein the base station provides wireless wide area network (WAN) connectivity to the wireless terminal 4302; and (b) transmit a second signal to a second wireless terminal using the second antenna 4308. In one implementation, the first signal may be a wireless WAN signal and the second signal may be a peer-to-peer signal. In various examples, first and the second signals may be transmitted in either overlapping or non-overlapping time intervals.

According to some example, (a) the first and second polarizations may be orthogonal directions; (b) the first and second polarizations may be different by at least forty-five (45) degrees; (c) the first polarization may be a horizontal polarization and the second polarization may be a vertical polarization; (d) the first polarization may be a first mix of horizontal and vertical polarizations and the second polarization may be a mix of vertical and horizontal polarizations.

According to one feature, the processing circuit 4304 may also be configured to adjust transmission power over the transceiver 4314 depending to which network it is currently transmitting. For instance, the transceiver 4314 may use more power to communicate over the WAN (e.g., higher power, longer range communications) while it may use less power to communicate over the ad hoc peer-to-peer network (e.g., lower power, shorter range communications).

Additionally, the wireless terminal 4302 and/or processing circuit my be configured to (a) ascertain an orientation for the wireless terminal 4302 based on received signals of known polarization from the base station; and/or (b) beamform using the first and second antennas to align transmission and reception for the wireless terminal 4302 with the received signals of known polarization from the base station. In order to ascertain its, current orientation, the wireless terminal 4302 may include an orientation detector 4316 to monitor and/or obtain a current orientation for the wireless terminal 4302 (e.g., in terms of the elevation angle, etc.). For example, the orientation detector 4316 may be configured to detect the absolute or relative strength of polarized pilot signals from an access node on two orthogonally polarized antennas 4306 and 4308 of the wireless terminal 4302. The polarized antenna on which the strongest pilot signals may be detected is associated with WAN (e.g., first network). Thus, the wireless terminal 4302 can choose the other polarized antenna for peer-to-peer communications (over a second network) in order to cause less interference with the WAN. Consequently, the processing circuit 4304 may be coupled to an antenna polarization selector 4318 that selects either the first antenna 4306 or the second antenna 4308 depending on which network the wireless terminal 4302 wishes to use and/or communicate through.

In another example, the polarization of a received signal, as perceived by a receiving antenna, may be a mix of horizontal and vertical polarization. This allows the wireless terminal 4302 to determine an angle, e.g., relative to horizontal or vertical, at which the signals are received. In order to receive and/or transmit at a mixed polarization vector, the orthogonally polarized antennas 4306 and 4308 may be configured to beamform along a desired polarization vector. For example, a first polarization may be 0.8 horizontal polarization and 0.2 vertical polarization while a second orthogonal polarization may be 0.2 horizontal polarization and 0.8 vertical polarization. Consequently, a first virtually orthogonal antenna may be formed (polarized) for use with a first network (e.g., WAN) waveforms while a second virtually orthogonal antenna may be formed (polarized) for use with a second network (e.g., peer-to-peer) waveforms. In such cases, wireless terminal 4302 may be capable of driving the two transmit antennas 4306 and 4308 simultaneously.

Since both the WAN network and P2P network may operate simultaneously on the same channels, although using orthogonal waveforms, some cross-over or interference may occur. According to one example, the wireless terminal 4302 may utilize a decorrolator or a minimum mean-square error (MMSE) receiver to further mitigate interference from the WAN. Such decorollator may be used, for example, for the Peer-to-Peer communication controller 4312 to remove or mitigate interference from the WAN network. For instance, where a peer-to-peer network shares the reverse link with a WAN (as illustrated in FIGS. 39 and 40) the peer-to-peer communications may be affected by interference from transmissions on the WAN network (e.g., on the same reverse link). A wireless terminal might not be in a perfect position either and, thus, a received WAN waveform may not be perfectly vertical or horizontal. In such cases, the wireless terminals may monitor the WAN network interference in their antennas and use this information to decide which polarization, physically or virtually, to use to for P2P network communications.

A circuit may also be provided to allow a wireless terminal to use two antennas in communicating with two or more different networks either concurrently and/or in an overlapping, shared, or non-overlapping communication channel. The circuit may be adapted to transmit a first signal to a base station using a first antenna having a first polarization in a first direction, wherein the base station provides wireless wide area network (WAN) connectivity to the wireless terminal. The same circuit, a different circuit, or a second section of the same or different circuit may be adapted to transmit a second signal to a second wireless terminal using the second antenna having a second polarization in a second direction. The same circuit, a different circuit, or a third section of the same or different circuit may be adapted to obtain a channel allocation for communicating with the base station, wherein the first signal is transmitted within the channel allocation and the second signal is transmitted using at least part of the channel allocation. The first and second polarizations may be different by at least forty-five (45) degrees. The same circuit, a different circuit, or a fourth section of the same or different circuit may be adapted to ascertain an orientation for the wireless terminal based on received signals of known polarization from the first wireless network to establish the first and second polarizations. The same circuit, a different circuit, or a fifth section of the same or different circuit may be adapted to perform beamforming using the first and second antennas to align transmission and reception for the wireless terminal with the received signals of known polarization from the base station.

One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Call Rerouting from WAN Network to Peer-To-Peer Network

According to another feature, frequency spectrum sharing between two networks (illustrated in FIGS. 32-43) may also be used to reduce traffic over a first network (e.g., WAN network) by having a wireless terminal redirect some communications through a second network (e.g., peer-to-peer network). That is, if a call or communication is initiated from a first wireless terminal, the first wireless terminal may first ascertain whether such communication may be carried out via the second network to avoid communicating via the first network. For example, if a user of the first wireless terminal dials a phone call to a second wireless terminal, rather than setting up the call via a conventional WAN network (e.g., via a base station or public land mobile network), the first wireless terminal may determine if the second wireless terminal is within P2P range. If the second wireless terminal is within P2P range, the first wireless terminal may setup the call directly with the second wireless terminal via a P2P network. This feature may be transparent to a user of the first wireless terminal as the wireless terminal automatically determines whether a particular call may be rerouted, for example, from a WAN network to a peer-to-peer network.

Figure 44:
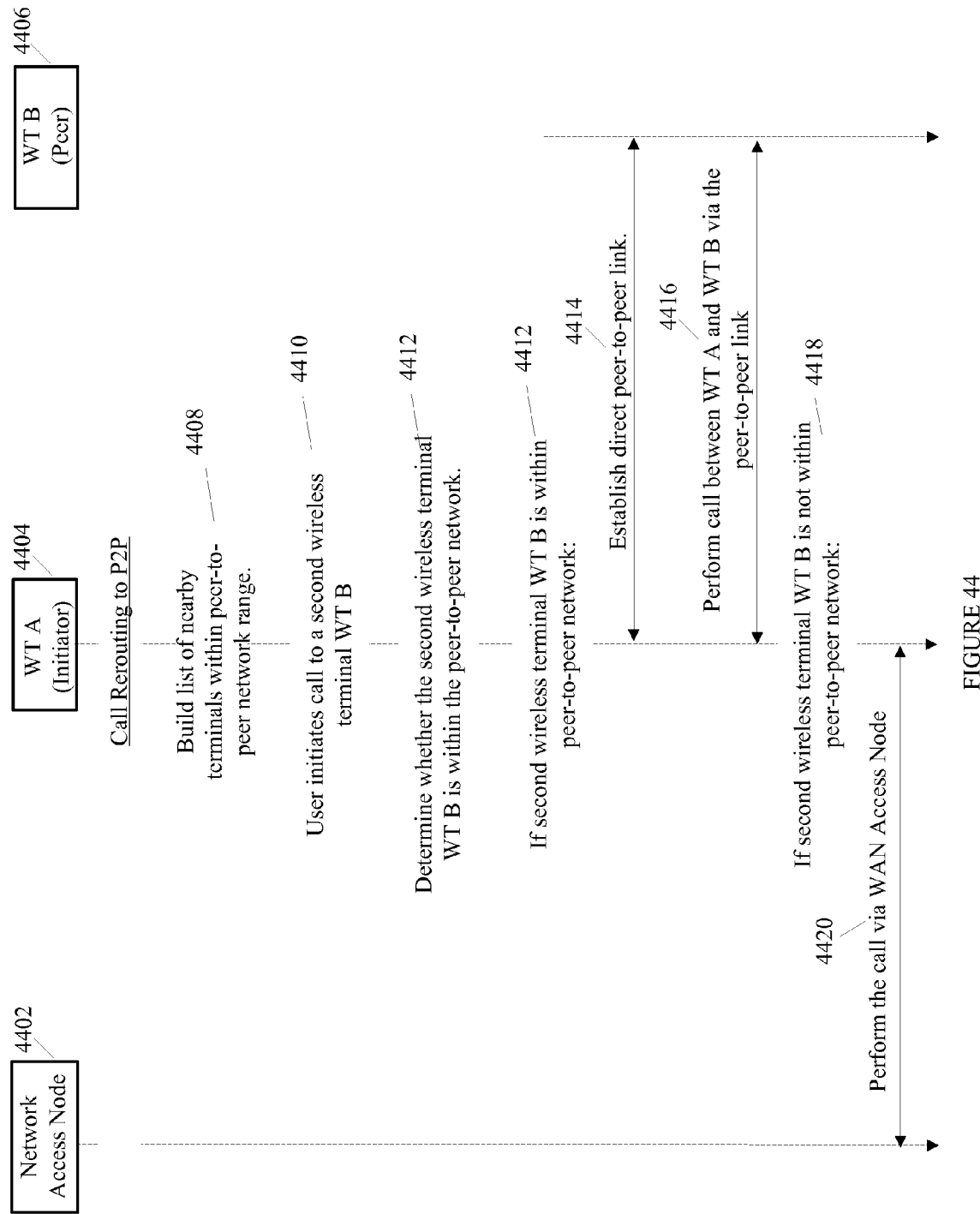
FIG. 44 is a flow diagram illustrating a method to reroute traffic from a first network (e.g., wide area network) to a second network (peer-to-peer network) when a first wireless terminal initiates a call a second wireless device.

FIG. 44 is a flow diagram illustrating a method to reroute traffic from a first network (e.g., wide area network) to a second network (peer-to-peer network) when a first wireless terminal initiates a call a second wireless device. For instance, a first wireless terminal 4404 (e.g., mobile phone) may operate within a cell-based network (e.g., wide area network, ultra mobile broadband, etc.) via infrastructure access nodes 4402 (e.g., base stations, etc.). In some instances, the first wireless terminal 4404 may wish to initiate a call with a second wireless terminal 4406. In conventional communication systems, the call would simply be routed via the cell-based network via access node 4402 to the second wireless terminal 4406. However, if the second wireless terminal is near the first wireless terminal, it may be more efficient to perform the call via a direct peer-to-peer link. This assumes that the first wireless terminal 4404 is capable of communicating over at least two different networks (e.g., wide area network and peer-to-peer network).

The first wireless terminal may build or maintain a list of nearby terminals within peer-to-peer network range 4408. This may be done as part of typical monitoring of a shared frequency space within which the wireless terminal operates. The user of the first wireless terminal WT A 4404 may initiate call to a second wireless terminal WT B 4410. The first wireless terminal may determine whether the second wireless terminal WT B 4406 is within peer-to-peer network 4412. For instance, the first wireless terminal 4404 may check its list of nearby peers to determine whether the second wireless terminal is within range. If the second wireless terminal 4406 is within peer-to-peer network range, then the first wireless terminal 4404 may (a) establish a direct peer-to-peer link 4414 with the second wireless terminal, and (b) perform the call between via the peer-to-peer link 4416. This allows the first wireless terminal to make a call with a nearby peer while bypassing the wide area network. Otherwise, if the second wireless terminal 4406 is not within peer-to-peer network range 4418, the first wireless terminal performs the call via the WAN Access Node 4420. Note that, in one example, the peer-to-peer network may operate in a shared or overlapping frequency spectrum with the wide area network. Also, in some embodiments, the first wireless terminal 4404 may communicate via the cell-based network via a high-power or long range first communication interface but communicates via the peer-to-peer network over a low-power or short range second communication interface. Therefore, establishing a call via the peer-to-peer network (e.g., an ad hoc network) may be more power efficient than using a cell-based network (e.g., wide area network).

Figure 45:
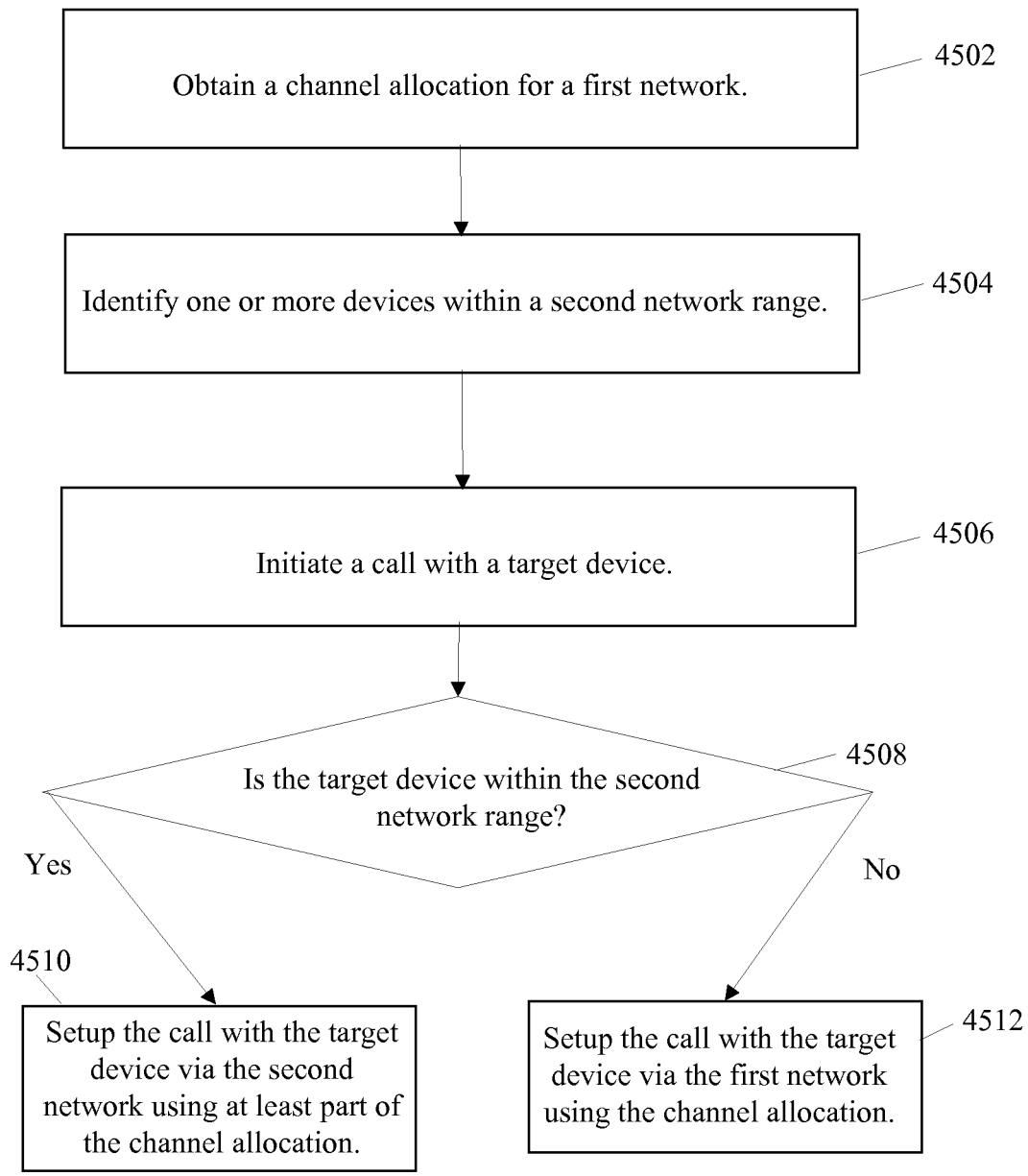
FIG. 45 is a flow diagram illustrating a method operational on a first wireless terminal to reroute traffic from a first network to a second network when establishing a communication link with a second wireless device.

FIG. 45 is a flow diagram illustrating a method operational on a first wireless terminal to reroute traffic from a first network to a second network when establishing a communication link with a second wireless device. A first wireless terminal may obtain a channel allocation for a first network (e.g., WAN network) 4502. That is, the first wireless terminal may obtain a forward channel and a reverse channel for communications with the first network. Optionally, the first wireless terminal may identify one or more devices within a second network range (e.g., peer-to-peer range) 4504. That is, the first wireless terminal may monitor for beacons to identify nearby devices within range of a second network.

When a user of the first wireless terminal attempts to initiate a call with a target device 4506, the first wireless terminal may (transparently) determine whether the target device is within the second network range 4508. If the target device is within (P2P) range, the call is setup directly with the target device via the second network using at least part of the channel allocation 4510. Otherwise, the call is setup with the target device via the first network using the channel allocation 4512. This feature can be used to avoid or reduce traffic over a network infrastructure (e.g., WAN network) and allow a wireless terminal to communicate directly with a target device. Additionally, such feature may also allow a wireless terminal to communicate with other nearby devices even when a first network (e.g., WAN network) is unavailable.

Power Conservation By Rerouting Via a Low Power Network

Another feature provides for power conservation of a wireless terminal by rerouting communications from a first longer-range, higher-power network to a second lower-range, lower-power network. For example, a first wireless terminal may be configured to communicate over a first longer-range, higher-power network (e.g., WAN network, public land mobile network, etc.) as well as a second shorter-range, lower-power network (e.g., peer-to-peer network, Bluetooth-compliant network, etc.) over a shared frequency spectrum as illustrated, for example, in FIGS. 1-45. Because the wireless terminal may direct a call, that would conventionally be routed through the first network (WAN network), via the second network (e.g., peer-to-peer network), it is able to reduce power consumption by virtue of the lower power utilized for communications over the second network in comparison to communications over the first network.

While some of the examples may have been described in the context of an OFDM TDD system, the methods and apparatus of various embodiments are applicable to a wide range of communications systems including many non-OFDM, many non-TDD systems, and/or many non-cellular systems.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

One or more of the components, steps, and/or functions illustrated in FIGS. 1-44 may be rearranged and/or combined into a single component, step, or function or embodied in several components, steps, or functions. Additional elements, components, steps, and/or functions may also be added. The apparatus, devices, and/or components illustrated in FIGS. 1, 9, 25, 27, 32, 36, 38, 41 and/or 43 may be configured or adapted to perform one or more of the methods, features, or steps described in FIGS. 2, 3-8, 10-24, 26, 28-31, 33, 34-35, 37, 39-40, 42, 44, and/or 45. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method for operating a wireless terminal equipped with at least a first antenna and a second antenna, the method comprising:
   sensing signal strengths of a received signal on at least two polarizations;
   discovering the polarization for the received signal based on the sensed signal strengths of the received signal on the at least two polarizations;
   transmitting a first signal to a base station using the first antenna having a first polarization in a first direction, the first polarization based on the discovered polarization, wherein the base station provides wireless wide area network (WAN) connectivity to the wireless terminal;
   transmitting a second signal to a second wireless terminal using the second antenna having a second polarization in a second direction, wherein the wireless terminal provides ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
   obtaining a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

2. The method of claim 1, wherein the first and the second signals are transmitted in non-overlapping time intervals.

3. The method of claim 1, wherein the first signal is a wireless WAN signal and the second signal is a peer-to-peer signal.

4. The method of claim 1, wherein the first and second polarizations are orthogonal with respect to each other.

5. The method of claim 1, wherein the first and second polarizations are different by at least forty-five (45) degrees.

6. The method of claim 1, wherein the first polarization is a horizontal polarization and the second polarization is a vertical polarization.

7. The method of claim 1, wherein the first polarization is a first mix of horizontal and vertical polarizations and the second polarization is a second mix of vertical and horizontal polarizations.

8. The method of claim 1, further comprising:
   obtaining the channel allocation, wherein the first signal and second signal share the channel allocation.

9. The method claim 8, wherein the channel allocation includes at least one of forward and reverse link timeslots, and forward and reverse link frequencies.

10. The method of claim 1, further comprising:
    obtaining the channel allocation for communicating with the base station, wherein the first signal is transmitted within the channel allocation and the second signal is transmitted using at least part of the channel allocation.

11. The method of claim 1, further comprising:
    ascertaining an orientation for the wireless terminal based on received signals of known polarization from the base station.

12. The method of claim 11, further comprising:
beamforming using the first and second antennas to align transmission and reception for the wireless terminal with the received signals of known polarization from the base station.

13. The method of claim 1, further comprising:
initiating a call with the second wireless terminal via the ad hoc peer-to-peer connectivity;
determining whether the second wireless terminal is within range of the wireless terminal; and
establishing the call with the second wireless terminal via the second antenna.

14. The method of claim 13, wherein the call is established directly between the wireless terminal and the second wireless terminal via the ad hoc peer-to-peer connectivity free of call set-up via any base station.

15. The method of claim 1, wherein transmissions via the first antenna have a higher power relative to lower power transmissions via the second antenna.

16. The method of claim 1, wherein transmissions via the first antenna have a longer range relative to shorter range transmissions via the second antenna.

17. The method of claim 1, wherein said ad hoc peer-to-peer connectivity occurs without routing communication via any base station.

18. The method of claim 1, wherein said ad hoc peer-to-peer connectivity occurs without routing communication via any other transmitter.

19. The method of claim 1, wherein said ad hoc peer-to-peer connectivity occurs directly between the wireless terminal and the second wireless terminal free of retransmission by any base station.

20. The method of claim 1, wherein said ad hoc peer-to-peer connectivity is established directly between the wireless terminal and the second wireless terminal free of call set-up via any base station.

21. The method of claim 1, further comprising:
receiving communication transmitted by the second wireless terminal via the ad hoc peer-to-peer connectivity.

22. The method of claim 21, wherein the communication is received directly from the second wireless terminal.

23. The method of claim 1, wherein the wireless terminal and the second wireless terminal do not have a common timing reference.

24. A wireless terminal, comprising:
a first antenna having a first polarization in a first direction;
a second antenna having a second polarization in a second direction;
a processing circuit coupled to the first and second antennas, the processing circuit further configured to:
sense signal strengths of a received signal on at least two polarizations;
discover the polarization for the received signal based on the sensed signal strengths of the received signal on the at least two polarizations;
transmit a first signal to a base station using the first antenna, the first polarization based on the discovered polarization, wherein the base station provides wireless wide area network (WAN) connectivity to the wireless terminal;
transmit a second signal to a second wireless terminal using the second antenna, wherein the wireless terminal provides ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
obtain a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

25. The terminal of claim 24, wherein the first and the second signals are transmitted in non-overlapping time intervals.

26. The terminal of claim 24, wherein the first signal is a wireless WAN signal and the second signal is a peer-to-peer signal.

27. The terminal of claim 24, wherein the first and second polarizations are orthogonal with respect to each other.

28. The terminal of claim 24, wherein the first and second polarizations are different by at least forty-five (45) degrees.

29. The terminal of claim 24, wherein the first polarization is a horizontal polarization and the second polarization is a vertical polarization.

30. The terminal of claim 24, wherein the first polarization is a first mix of horizontal and vertical polarizations and the second polarization is a second mix of vertical and horizontal polarizations.

31. The terminal of claim 24, wherein the processing circuit is further configured to
obtain the channel allocation, wherein the first signal and second signal share the channel allocation.

32. The terminal of claim 24, wherein the processing circuit is further configured to
obtain the channel allocation for communicating with the base station, wherein the first signal is transmitted within the channel allocation and the second signal is transmitted using at least part of the channel allocation.

33. The terminal of claim 32, wherein the channel allocation includes at least one of forward and reverse link timeslots, and forward and reverse link frequencies.

34. The terminal of claim 24, wherein the processing circuit is further configured to
ascertain an orientation for the wireless terminal based on received signals of known polarization from the base station; and
beamform using the first and second antennas to align transmission and reception for the wireless terminal with the received signals of known polarization from the base station.

35. The terminal of claim 24, wherein the processing circuit is further configured to
initiate a call with the second wireless terminal via the ad hoc peer-to-peer connectivity;
determine whether the second wireless terminal is within range of the wireless terminal; and
establish the call with the second wireless terminal via the second antenna.

36. The terminal of claim 24, wherein transmissions via the first antenna have a higher power relative to lower power transmissions via the second antenna.

37. The terminal of claim 24, wherein transmissions via the first antenna have a longer range relative to shorter range transmissions via the second antenna.

38. A wireless terminal comprising:
- means for sensing signal strengths of a received signal on at least two polarizations;
- means for discovering the polarization for the received signal based on the sensed signal strengths of the received signal on the at least two polarizations;
- means for transmitting a first signal to a base station using a first antenna having a first polarization in a first direction, the first polarization based on the discovered polarization, wherein the base station provides wireless wide area network (WAN) connectivity to the wireless terminal;
- means for transmitting a second signal to a second wireless terminal using a second antenna having a second polarization in a second direction, wherein the wireless terminal provides ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
- means for obtaining a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

39. The terminal of claim 38, wherein the first and second polarizations are different by at least forty-five (45) degrees.

40. The terminal of claim 38, further comprising:
- means for obtaining the channel allocation for communicating with the base station, wherein the first signal is transmitted within the channel allocation and the second signal is transmitted using at least part of the channel allocation.

41. The terminal of claim 38, further comprising:
- means for ascertaining an orientation for the wireless terminal based on received signals of known polarization from the base station; and
- means for beamforming using the first and second antennas to align transmission and reception for the wireless terminal with the received signals of known polarization from the base station.

42. A circuit to allow a wireless terminal to use two antennas, wherein the circuit is adapted to:
- sense signal strengths of a received signal on at least two polarizations;
- discover the polarization for the received signal based on the sensed signal strengths of the received signal on the at least two polarizations;
- transmit a first signal to a base station using a first antenna having a first polarization in a first direction, the first polarization based on the discovered polarization, wherein the base station provides wireless wide area network (WAN) connectivity to the wireless terminal;
- transmit a second signal to a second wireless terminal using a second antenna having a second polarization in a second direction, wherein the wireless terminal provides ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
- obtain a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

43. The circuit of claim 42, wherein the first and second polarizations are different by at least forty-five (45) degrees.

44. The circuit of claim 42, wherein the circuit is further adapted to
- obtain the channel allocation for communicating with the base station, wherein the first signal is transmitted within the channel allocation and the second signal is transmitted using at least part of the channel allocation.

45. A non-transitory machine-readable medium comprising instructions for allowing a wireless terminal to use two antennas, which when executed by a processor causes the processor to:
- sense signal strengths of a received signal on at least two polarizations;
- discover the polarization for the received signal based on the sensed signal strengths of the received signal on the at least two polarizations;
- send a first signal to a base station using a first antenna having a first polarization in a first direction, the first polarization based on the discovered polarization, wherein the base station provides wireless wide area network (WAN) connectivity to the wireless terminal;
- send a second signal to a second wireless terminal using a second antenna having a second polarization in a second direction, wherein the wireless terminal provides ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
- obtain a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

46. The machine-readable medium of claim 45, wherein the first and second polarizations are different by at least forty-five (45) degrees.

47. The machine-readable medium of claim 45, further comprising instructions to
- obtain the channel allocation for communicating with the base station, wherein the first signal is transmitted within the channel allocation and the second signal is transmitted using at least part of the channel allocation.

48. A method for operating a wireless terminal equipped with an antenna element having adjustable polarizations, the method comprising:
  sensing signal strengths of a received signal on at least two polarizations;
  discovering the polarization for the received signal based on the sensed signal strengths of the received signal on the at least two polarizations;
  transmitting a first signal to a base station using the antenna element adapted to a first polarization in a first direction, the first polarization based on the discovered polarization, the base station providing wireless wide area network (WAN) connectivity to the wireless terminal;
  transmitting a second signal to a second wireless terminal using the antenna element adapted to a second polarization in a second direction, the wireless terminal providing ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
  obtaining a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

49. The method of claim 48, wherein the antenna element includes a first antenna polarized according to the first polarization and a second antenna polarized according to the second polarization, the first signal being transmitted over the first antenna and the second signal being transmitted over the second antenna.

50. The method of claim 48, wherein the first and second polarizations are orthogonal with respect to each other.

51. The method of claim 48, wherein the first polarization is a first mix of horizontal and vertical polarizations and the second polarization is a second mix of vertical and horizontal.

52. The method of claim 48, wherein the first and second polarizations are different by at least forty-five (45) degrees.

53. The method of claim 48, further comprising:
  obtaining the channel allocation, wherein the first signal and second signal share the channel allocation.

54. The method of claim 48, further comprising:
  ascertaining an orientation for the wireless terminal based on received signals of known polarization from the base station; and
  beamforming using the antenna element to align transmission and reception for the wireless terminal with the received signals of known polarization from the base station.

55. A wireless terminal, comprising:
  an antenna element having adjustable polarizations; and
  a processing circuit coupled to the antenna element, the processing circuit configured to:
    sense signal strengths of a received signal on at least two polarizations;
    discover the polarization for the received signal based on the sensed signal strengths of the received signal on the at least two polarizations;
    transmit a first signal to a base station using the antenna element adapted to a first polarization in a first direction, the first polarization based on the discovered polarization, the base station providing wireless wide area network (WAN) connectivity to the wireless terminal;
    transmit a second signal to a second wireless terminal using the antenna element adapted to a second polarization in a second direction, the wireless terminal providing ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
    obtain a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

56. The terminal of claim 55, wherein the antenna element includes a first antenna polarized according to the first polarization and a second antenna polarized according to the second polarization, the first signal being transmitted over the first antenna and the second signal being transmitted over the second antenna.

57. The terminal of claim 55, wherein the first and second polarizations are orthogonal with respect to each other.

58. The terminal of claim 55, wherein the first and second polarizations are different by at least forty-five (45) degrees.

59. The terminal of claim 55, wherein the processing circuit is further configured to
  obtain the channel allocation, wherein the first signal and second signal share the channel allocation.

60. The terminal of claim 55, wherein the processing circuit is further configured to
  ascertain an orientation for the wireless terminal based on received signals of known polarization from the base station; and
  beamform using the antenna element to align transmission and reception for the wireless terminal with the received signals of known polarization from the base station.

61. A wireless terminal, comprising:
  means for sensing signal strengths of a received signal on at least two polarizations;
  means for discovering the polarization for the received signal based on the sensed signal strengths of the received signal on the at least two polarizations;
  means for transmitting a first signal to a base station using an antenna element adapted to a first polarization in a first direction, the first polarization based on the discovered polarization, the base station providing wireless wide area network (WAN) connectivity to the wireless terminal;
  means for transmitting a second signal to a second wireless terminal using the antenna element adapted to a second polarization in a second direction, the wireless terminal providing ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and means for obtaining a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

62. The terminal of claim 61, wherein the antenna element includes a first antenna polarized according to the first polarization and a second antenna polarized according to the second polarization, the first signal being transmitted over the first antenna and the second signal being transmitted over the second antenna.

63. The terminal of claim 61, wherein the first and second polarizations are different by at least forty-five (45) degrees.

64. The terminal of claim 61, further comprising:
means for obtaining the channel allocation, wherein the first signal and second signal concurrently share the channel allocation.

65. The terminal of claim 61, further comprising:
means for ascertaining an orientation for the wireless terminal based on received signals of ascertainable polarization from the base station; and
means for beamforming using the antenna element to align transmission and reception for the wireless terminal with the received signals of ascertainable polarization from the base station.

66. A circuit for facilitating dual use of an antenna element by a wireless terminal, wherein the circuit is adapted to:
sense signal strengths of a received signal on at least two polarizations;
discover the polarization for the received signal based on the sensed signal strengths of the received signal on the at least two polarizations;
transmit a first signal to a base station using the antenna element adapted to a first polarization in a first direction, the first polarization based on the discovered polarization, the base station providing wireless wide area network (WAN) connectivity to the wireless terminal;
transmit a second signal to a second wireless terminal using the antenna element adapted to a second polarization in a second direction, the wireless terminal providing ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
obtain a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

67. The circuit of claim 66, wherein the circuit is further adapted to
obtain the channel allocation, wherein the first signal and second signal concurrently share the channel allocation, and wherein the first and second polarizations are different by at least forty-five (45) degrees.

68. The circuit of claim 66, wherein the circuit is further adapted to
ascertain an orientation for the wireless terminal based on received signals of ascertainable polarization from the base station; and
beamform using the antenna element to align transmission and reception for the wireless terminal with the received signals of ascertainable polarization from the base station.

69. A non-transitory machine-readable medium comprising instructions for facilitating dual use of an antenna element by a wireless terminal, which when executed by a processor causes the processor to:
sense signal strengths of a received signal on at least two polarizations;
discover the polarization for the received signal based on the sensed signal strengths of the received signal on the at least two polarizations;
transmit a first signal to a base station using the antenna element adapted to a first polarization in a first direction, the first polarization based on the discovered polarization, the base station providing wireless wide area network (WAN) connectivity to the wireless terminal;
transmit a second signal to a second wireless terminal using the antenna element adapted to a second polarization in a second direction, the wireless terminal providing ad hoc peer-to-peer connectivity to the second wireless terminal, wherein said ad hoc peer-to-peer connectivity is established directly between the wireless terminal and the second wireless terminal free of call set-up via any network managing entity, and wherein said ad hoc peer-to-peer connectivity is established without routing a call via the base station; and
obtain a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

70. The machine-readable medium of claim 69, further comprising instructions to
obtain the channel allocation, wherein the first signal and second signal concurrently share the channel allocation, and wherein the first and second polarizations are different by at least forty-five (45) degrees.

71. The machine-readable medium of claim 69, further comprising instructions to
ascertain an orientation for the wireless terminal based on received signals of ascertainable polarization from the base station; and beamform using the antenna element to align transmission and reception for the wireless terminal with the received signals of ascertainable polarization from the base station.

72. A method of operating a wireless communication system including at least first and second wireless terminals, the first wireless terminal equipped with at least a first antenna having a first polarization in a first direction, and a second antenna having a second polarization in a second direction, the method comprising:
  sensing signal strengths of a received signal on at least two polarizations;
  discovering the polarization for the received signal based on the sensed signal strengths of the received signal on the at least two polarizations;
  operating the first wireless terminal to transmit a first signal to a base station using the first antenna, the first polarization based on the discovered polarization, the base station providing wireless wide area network (WAN) connectivity to the first wireless terminal;
  operating the first wireless terminal to transmit a second signal using the second antenna to the second wireless terminal to provide ad hoc peer-to-peer connectivity to the second wireless terminal, wherein said ad hoc peer-to-peer connectivity is established directly between the first wireless terminal and the second wireless terminal free of call set-up via any network managing entity, wherein said ad hoc peer-to-peer connectivity is established without routing a call via the base station, and wherein the first and second polarizations are different by at least forty-five (45) degrees; and
  obtaining a channel allocation for communicating with the base station, wherein the channel allocation allocates at least one of a forward link timeslot and a reverse link timeslot for the wireless terminal and the second wireless terminal, wherein the first signal and the second signal are transmitted in a same frequency spectrum, wherein the first signal and the second signal are transmitted in overlapping time intervals, and wherein the second signal is transmitted within the allocated at least one of the forward link timeslot and the reverse link timeslot.

73. The method of claim 72, wherein the second wireless terminal is equipped with a third antenna having a polarization in the second direction, and wherein the second signal is sent to the third antenna.

74. The method of claim 72, further comprising:
  operating the base station to receive the first signal using a third antenna having a polarization in the first direction.

75. The method of claim 72, further comprising:
  obtaining the channel allocation for the first wireless terminal, wherein the first signal and second signal share the channel allocation.

76. The method of claim 72, wherein the first and the second signals are transmitted in overlapping time intervals.

77. The method of claim 72, wherein the first and the second signals are transmitted in non-overlapping time intervals.

* * * * *